US010880118B2

(12) United States Patent
Stolfus

(10) Patent No.: US 10,880,118 B2
(45) Date of Patent: Dec. 29, 2020

(54) PROVIDING DYNAMIC ROUTING ALTERNATIVES BASED ON DETERMINED TRAFFIC CONDITIONS

(71) Applicant: Elizabeth B. Stolfus, Denver, CO (US)

(72) Inventor: Elizabeth B. Stolfus, Denver, CO (US)

( * ) Notice: Subject to any disclaimer, the term of this patent is extended or adjusted under 35 U.S.C. 154(b) by 224 days.

(21) Appl. No.: 16/022,343

(22) Filed: Jun. 28, 2018

(65) Prior Publication Data

US 2018/0309592 A1 Oct. 25, 2018

Related U.S. Application Data

(63) Continuation-in-part of application No. 15/669,402, filed on Aug. 4, 2017, now Pat. No. 10,581,634,
(Continued)

(51) Int. Cl.
*H04L 12/43* (2006.01)
*G08G 1/0968* (2006.01)
(Continued)

(52) U.S. Cl.
CPC .......... *H04L 12/43* (2013.01); *G01C 21/3415* (2013.01); *G08G 1/0112* (2013.01);
(Continued)

(58) Field of Classification Search
CPC . H04L 12/43; H04L 12/4625; H04L 12/6418; H04L 43/062; H04L 43/0876;
(Continued)

(56) References Cited

U.S. PATENT DOCUMENTS 6,418,371 B1 7/2002 Arnold
8,116,723 B2 * 2/2012 Kaltsukis ............... G08B 25/08
455/404.2
(Continued)

FOREIGN PATENT DOCUMENTS

WO WO 2013/093780 6/2013

OTHER PUBLICATIONS

Official Action for U.S. Appl. No. 14/698,127, dated Dec. 1, 2016, 22 pages.
(Continued)

*Primary Examiner* — Thomas E Worden
(74) *Attorney, Agent, or Firm* — Sheridan Ross P.C.

(57) ABSTRACT

Methods, devices, and systems are provided to reduce instances of accidents along a path and mitigate accidents that occur. Upon detecting an incident, the traffic system can be controlled to operate in a partially-adapted state providing safer recovery from the occurrence of one or more incidents along a path. The partially-adapted state of the traffic system may provide routing of certain vehicular traffic away from detected turbulence or incident while routing other vehicular traffic toward the detected turbulence or incident. The methods and systems provided herein may determine to move an incident from a particular area, or point, along a path to a different zone to control the negative effect on traffic flow and/or reduce the likelihood of secondary incidents or harm from occurring at, or near, the point of the incident.

20 Claims, 21 Drawing Sheets

Related U.S. Application Data which is a continuation of application No. 14/698,127, filed on Apr. 28, 2015, now Pat. No. 9,755,850.

(60) Provisional application No. 62/032,750, filed on Aug. 4, 2014, provisional application No. 61/987,060, filed on May 1, 2014.

(51) Int. Cl.

| | |
|---|---|
| H04L 12/64 | (2006.01) |
| G01C 21/34 | (2006.01) |
| G08G 1/01 | (2006.01) |
| H04L 12/803 | (2013.01) |
| H04L 12/26 | (2006.01) |
| H04L 12/46 | (2006.01) |
| G08G 1/0965 | (2006.01) |
| G08G 1/0969 | (2006.01) |
| G08G 1/00 | (2006.01) |
| H04L 12/707 | (2013.01) |

(52) U.S. Cl.
CPC ......... *G08G 1/0116* (2013.01); *G08G 1/0133* (2013.01); *G08G 1/0141* (2013.01); *G08G 1/0965* (2013.01); *G08G 1/0969* (2013.01); *G08G 1/096816* (2013.01); *G08G 1/096844* (2013.01); *G08G 1/202* (2013.01); *H04L 12/4625* (2013.01); *H04L 12/6418* (2013.01); *H04L 43/062* (2013.01); *H04L 43/0876* (2013.01); *H04L 47/122* (2013.01); *H04L 45/22* (2013.01)

(58) Field of Classification Search
CPC ... H04L 47/112; H04L 45/22; G01C 21/3415; G08G 1/0112; G08G 1/0116; G08G 1/0133; G08G 1/0141; G08G 1/0965; G08G 1/096816; G08G 1/096844; G08G 1/0969; G08G 1/202
See application file for complete search history.

(56) References Cited

U.S. PATENT DOCUMENTS

| | | | |
|---|---|---|---|
| 8,612,136 B2 | 12/2013 | Levine et al. | |
| 8,712,675 B2 | 4/2014 | Grigsby et al. | |
| 8,718,910 B2 | 5/2014 | Gueziec | |
| 8,762,035 B2 | 6/2014 | Levine et al. | |
| 9,092,978 B2 | 7/2015 | Joglekar | |
| 9,105,185 B2 | 8/2015 | Joglekar | |
| 9,142,127 B1* | 9/2015 | McDevitt-Pimbley | ...................... H04W 4/90 |
| 9,224,293 B2 | 12/2015 | Taylor | |
| 9,453,736 B2 | 9/2016 | Grigsby et al. | |
| 9,755,850 B2 | 9/2017 | Stolfus | |
| 10,185,327 B1* | 1/2019 | Konrardy | ............ G05D 1/0231 |
| 2003/0096621 A1 | 5/2003 | Jana et al. | |
| 2005/0209770 A1* | 9/2005 | O'Neill | .............. G01C 21/3407 701/117 |
| 2006/0092043 A1* | 5/2006 | Lagassey | ............ G07C 5/0891 340/907 |
| 2006/0168592 A1 | 7/2006 | Andrews et al. | |
| 2007/0135990 A1 | 6/2007 | Seymour et al. | |
| 2008/0215202 A1 | 9/2008 | Breed | |
| 2009/0063205 A1 | 3/2009 | Shibasaki | |
| 2009/0252033 A1 | 10/2009 | Ramakrishnan et al. | |
| 2011/0098915 A1 | 4/2011 | Disatnik et al. | |
| 2011/0111728 A1* | 5/2011 | Ferguson | .......... H04M 1/72541 455/404.2 |
| 2013/0021945 A1 | 1/2013 | Yura et al. | |
| 2014/0091949 A1* | 4/2014 | Tickoo | ................... G08G 1/161 340/905 |
| 2014/0195146 A1 | 7/2014 | Grigsby et al. | |
| 2014/0207626 A1 | 7/2014 | Braxton | |
| 2014/0249735 A1 | 9/2014 | Levine et al. | |
| 2015/0051822 A1 | 2/2015 | Joglekar | |
| 2015/0051823 A1 | 2/2015 | Joglekar | |
| 2015/0219468 A1 | 8/2015 | Ziezold et al. | |
| 2015/0339686 A1 | 11/2015 | Garcia et al. | |
| 2016/0035221 A1* | 2/2016 | McDevitt-Pimbley | ...................... H04W 4/90 701/119 |
| 2016/0069695 A1 | 3/2016 | Broadben et al. | |
| 2016/0071418 A1* | 3/2016 | Oshida | ................ B60W 30/165 701/23 |
| 2016/0097649 A1 | 4/2016 | Broadbent et al. | |
| 2016/0189544 A1 | 6/2016 | Ricci | |
| 2016/0223348 A1 | 8/2016 | Witte et al. | |
| 2016/0223351 A1 | 8/2016 | Sasse et al. | |
| 2016/0353266 A1* | 12/2016 | Winkler | ............... G08B 25/016 |
| 2016/0358466 A1* | 12/2016 | Youngblood | ........... H04W 4/90 |
| 2017/0025000 A1* | 1/2017 | Lagassey | ............... G08G 1/094 |
| 2017/0048107 A1 | 2/2017 | Dosovitsky et al. | |
| 2017/0292845 A1* | 10/2017 | Yamasaki | .......... G01C 21/3691 |
| 2017/0337810 A1 | 11/2017 | Abe et al. | |
| 2017/0345309 A1* | 11/2017 | Bostick | ................... G08G 1/166 |
| 2017/0359197 A1 | 12/2017 | Stolfus | |
| 2018/0091439 A1 | 3/2018 | Zhang et al. | |
| 2018/0181091 A1* | 6/2018 | Funk | ....................... H04L 67/12 |
| 2018/0309592 A1* | 10/2018 | Stolfus | ................. G08G 1/0965 |
| 2019/0164418 A1 | 5/2019 | Neukart et al. | |

OTHER PUBLICATIONS

Notice of Allowance for U.S. Appl. No. 14/698,127, dated Dec. 1, 2016, 8 pages.
Official Action for U.S. Appl. No. 15/669,402, dated May 3, 2019, 28 pages.
Notice of Allowance for U.S. Appl. No. 15/669,402, dated Oct. 24, 2019, 10 pages.

* cited by examiner

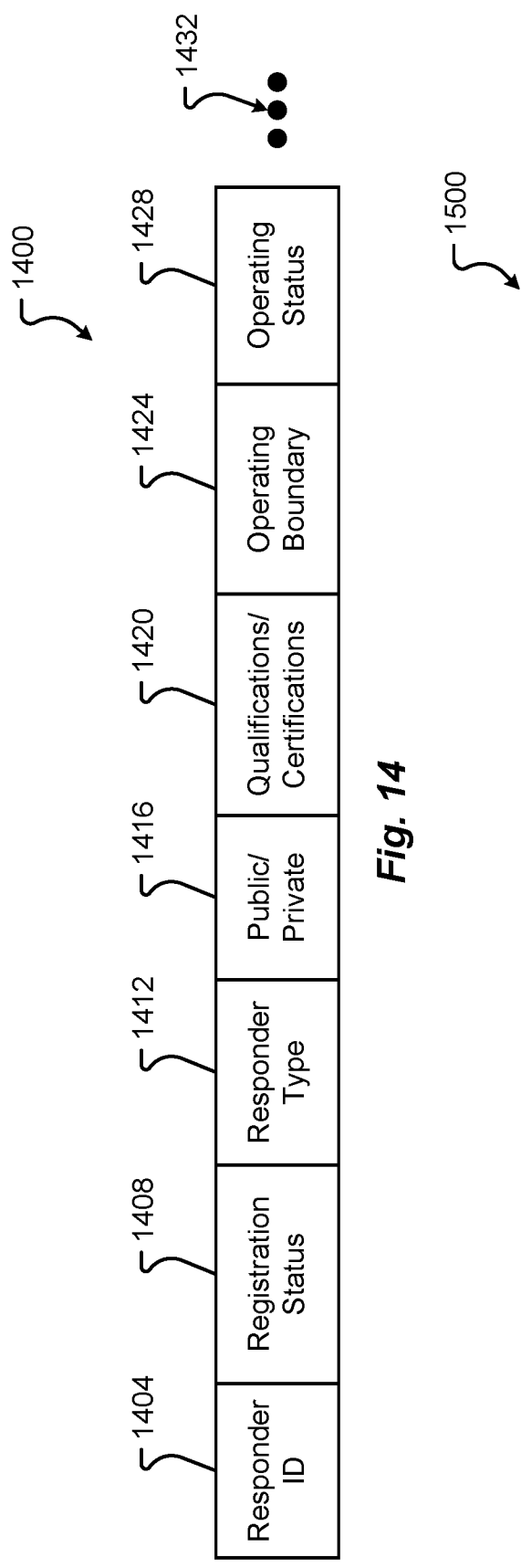

PROVIDING DYNAMIC ROUTING ALTERNATIVES BASED ON DETERMINED TRAFFIC CONDITIONS

CROSS REFERENCE TO RELATED APPLICATIONS

The present application is a continuation-in-part of U.S. patent application Ser. No. 15/669,402, filed on Aug. 4, 2017, which is a continuation application of U.S. patent application Ser. No. 14/698,127, filed on Apr. 28, 2015, now U.S. Pat. No. 9,755,850, which issued on Sep. 5, 2017, which claims the benefit of and priority, under 35 U.S.C. § 119(e), to U.S. Provisional Application Ser. No. 61/987,060, filed May 1, 2014, entitled "Providing Dynamic Routing Alternatives Based on Determined Traffic Conditions"; and 62/032,750, filed Aug. 4, 2014, entitled "Providing Dynamic Routing Alternatives Based on Determined Traffic Conditions." The entire disclosures of the applications listed above are hereby incorporated by reference, in their entirety, for all that they teach and for all purposes.

BACKGROUND

Traffic, in a transportation sense, generally refers to the movement of entities (e.g., people, etc.) by foot and/or by a conveyance. Typically, conveyances can include vehicles, such as, bicycles, cars, trucks, busses, and other travel aids. As can be appreciated, the entities may travel as individuals, groups, etc., and/or combinations thereof. At times, the flow of traffic may be interrupted by at least one of delays, congestion, travel path design (e.g., intersections and conjunctions of streets, roads, bike paths, highways, etc.), accidents, traffic flow control systems, and other traffic conditions. Other conditions can also contribute to decreases in traffic flow. Examples of these conditions may include, but are in no way limited to, weather (e.g., rain, snow, ice, fog, etc.), time of day (e.g., rush hour, etc.), speed traps, careless/distracted driving, travel path conditions (e.g., potholes, cracks, surface debris, spills, etc.), and the like.

Two major causes of traffic congestion can be attributed to accidents and construction. In general, traffic can be managed in advance of a planned construction project. This management may include route detours (e.g., an alternate route around the construction), lane closures, road closures, warnings of the detours in the form of signs posted about the construction condition, etc. In most cases, the management of traffic is static, or preplanned, and lasts for the length of a construction project or phase of a construction project. In other words, the management of traffic surrounding a construction area does not substantially change over time, even when traffic congestion increases or decreases over that time. As can be appreciated there is no intelligent management of traffic in this situation.

Unfortunately, the management of traffic in response to an accident is not usually planned, and as such, can cause even more problems with congestion, delays, and interruptions in traffic flow. As streets, lanes, roads, and other travel paths are closed, traffic is diverted by one or more signs, officials, and forced alternate routes. Among other things, these traffic management techniques result in an increase in congestion in the areas adjacent to the traffic condition and along the forced alternate routes. Moreover, with respect to accident conditions, the management of traffic occurs only after a period of time has passed since the accident occurred. These techniques typically only shift the traffic congestion and/or result in new accidents.

SUMMARY

It is with respect to the above issues and other problems that the embodiments presented herein were contemplated. In general, embodiments of the present disclosure provide methods, devices, and systems by which dynamic traffic route alternatives are presented to one or more entities based on determined traffic conditions. In some embodiments, a traffic management module may be configured to receive traffic information from one or more traffic information monitors. Upon detecting that a traffic condition (e.g., accident, crash, disruption, congestion, road work, maintenance, construction, or other change in traffic flow rate, etc.) has occurred, the traffic management module may be configured to analyze a traffic situation and provide alternative routing suggestions based on the analysis. The traffic management module may be configured to determine alternate, or alternative, routes in cases of recurring (e.g., rush hours, scheduled events, etc.) and/or non-recurring (e.g., accidents, crashes, construction, maintenance, emergency situations, etc.) delays. In some cases, the analysis may include calculating optimized traffic flow based on at least one of, a number of entities in the interrupted traffic path, distances between nodes along the traffic path, distances between nodes along alternative routes, costs associated with alternative routes, number of available alternative route nodes to the entities of the interrupted traffic path, destinations of the entities, speed of travel, location of the entities, direction of travel, and the like. The optimized traffic flow may include providing alternative routes to a number of entities to improve traffic flow for the entire traffic system. In some embodiments, the optimized traffic flow may provide routing alternatives that are determined to be optimal for the entire traffic system and individual users. In one embodiment, the traffic in a traffic system may be optimized on a system-wide basis for participants in the system (e.g., entities in the system receiving routing alternatives, etc.) as well as nonparticipants (e.g., entities in the system that do not receive routing alternatives, etc.) The various alternative routes may be provided to entities at the same time, substantially the same time, and/or at different times. The alternative routes may differ between one or more entities and may be the result of an applied transportation theory algorithm. In some embodiments, the traffic flow for the entire traffic system may be optimized at the sacrifice of one or more entities in the traffic system. For example, a number of entities may be routed via a number of alternative routes such that the traffic flow in the traffic system is substantially evenly distributed. The traffic flow distribution may include reducing the number of congestion areas, minimizing congestion in a particular area, and/or distributing congestion or traffic flow along multiple routes in the traffic system. Distributing traffic congestion in a traffic system can provide a benefit to the entire system and the entities therein rather than only providing a benefit to a select group of subscribers, or entities (e.g., those receiving routing alternatives, etc.).

Alternative routes may be provided to one or more entities via a presentation to a user interface of a communication device (e.g., smart phone, tablet, computer, etc.). The presentation may include an audio and/or video presentation via the communication device. Additionally or alternatively, the presentation may be made in conjunction with an application running via the communication device. Additionally or alternatively, the presentation may be made in conjunction with one or more other applications and/or application interfaces running via the communication device. For example, the communication device may be running a traffic application having a map and/or turn-by-turn directions. The traffic application may be a custom application installed onto the communication device and configured to perform at least one of the methods provided herein. In some cases, the traffic application may be an existing traffic and/or map application installed on a communication device. The existing traffic and/or map application may receive information from the traffic management module and/or other components in the traffic management system disclosed herein. In any event, when an alternative route is presented to the entity, the traffic application may display and/or sound an alert. The alert may notify the entity of the detected traffic condition and provide an alternative route via the communication device. This alternative route may be accepted or rejected by the entity. In one embodiment, acceptance may include interacting with a selection box presented to the communication device. In another embodiment, acceptance by the entity may include following the alternative route provided. Similarly, a rejection of the alternative route presented may include an entity interacting with a selection box presented to the communication device. In some embodiments, the entity may reject the presentation of the alternative route by not following the alternative route provided.

In one embodiment, the acceptance or rejection of an alternative route provided to an entity may affect subsequent traffic system and/or alternative route calculations. For example, a user in a first vehicle may accept an alternative route provided by the traffic management module. The acceptance of the alternative route by the user may be relayed or sent to the traffic management module, for example, automatically in response to accepting the alternative route. Continuing this example, the traffic management module may assign the user in the first vehicle to the alternative route for any subsequent traffic management calculations. As another example, the user in the first vehicle may reject the alternative route provided. In this example, the traffic management module may determine why the user rejected the alternative route provided and/or track the movements of the user in the traffic system for algorithmic refinement information. In any event, this information may be used to refine the at least one algorithm used by the traffic management module in determining alternative routes. Additionally or alternatively, the user may be considered an entity in the original route selected by the user or a user-determined alternative route, which can be monitored by the traffic management module.

In some embodiments one or more alternative routes presented to an entity may be accepted automatically. For instance, an entity controlled by a traffic management system may be configured to automatically accept provided alternative routes. This automatic acceptance may be made by one or more autonomous vehicles in a traffic system and/or made via an automatic traffic control system for one or more of the autonomous vehicles. Additionally or alternatively, the automatic acceptance of a provided alternative route may be based on preferences associated with a user or entity in the traffic system.

In any event, the information associated with the acceptance and/or rejection of entities may be recorded in a traffic data memory. Among other things, this information may be used by the traffic management module in tracking entity behavior, determining an effectiveness of the presentation, comparing alternative routes provided with other routes travelled by entities, refining alternative route selection, and more.

It should be appreciated that the routing alternatives provided by the traffic management module do not require an entity in the system to provide a destination in a travel application. For example, the present disclosure does not require an origin and destination information (e.g., the definite planned aspect of travel, etc.) typically associated with general driving direction applications. The alternative routes as disclosed herein may be provided dynamically and in response to detecting any disruption in a travel path for any entity travelling along the travel path. In some embodiments, travel directions may be provided to an entity only when a disruption along the entity's travel path is detected. As such, the methods, devices, and systems disclosed herein may be configured to provide direction only when it is needed in the case of a detected disruption.

In some embodiments, the alternative routes determined by the traffic management module may be different for one or more groups of entities. For instance, a first group of entities may be closer to a detected traffic condition than a second group of entities. In this example, the alternative routes provided to the first group may be limited based on the available number of alternative routes. As such, the traffic management module may determine to route the first group of entities before determining routing for the second group which may have more available alternative routes. In some embodiments, the determination may include calculating all routes simultaneously for all groups of entities. As can be appreciated, one set of alternative routes may be provided to entities in a first group, while a second different set of alternative routes may be provided to the entities in the second group, and so on. The groups of entities may comprise one or more entity and communication device.

The alternative routes may be provided to a number of entities to improve traffic flow for the entire traffic system. In other words, optimized traffic flow may provide routing alternatives that are determined to be optimal for the entire traffic system and individual users considered together. In some embodiments, the routing alternatives may direct various entities, or groups of entities, to achieve an optimal traffic flow for traffic system at the sacrifice of the entities, or groups of entities, in the traffic system. For example, a disruption may be detected on a travel path of the traffic system, in response a first set of entities may be routed (i.e., provided with alternative routing instructions/direction) along a first path around the disruption, while a second set of entities may be routed along a second path around the disruption. Although the alternative routing provided to the first and second set of entities may provide an optimal solution for traffic flow in the traffic system, the alternative routing may not be optimal for at least one of the first and second set of entities. For instance, the second set of entities may be provided with at least one alternative route that increases a travel time for the second set of entities. As can be appreciated, the increased travel time for the second set of entities in this example would not be considered an optimal solution for the second set of entities, but it may result in an optimal solution for the entire traffic system.

Data (e.g., traffic information, etc.) used by the traffic management module may be collected via a number of sources, as provided herein. For instance, data may be collected from one or more of governmental entities, traffic management group, sensors, vehicles, cameras, motion detectors, traffic information systems, users, communication devices, etc., and the like. In some embodiments, the data may be collected, at least partially, from a traffic control operations center, central management system, traffic management system, operating traffic monitor, traffic controller, or other group. Aspects of the disclosure provided herein may be used to improve the traffic control operations center. As can be appreciated, the traffic management module and/or information provided by the traffic management module may be shared with the traffic control operations center or other group. This cooperative sharing of information may serve to provide improved traffic control techniques, management, design, and/or other traffic control strategies to the traffic control operations center or other group. In some cases, the dynamic routing alternatives disclosed herein may operate as a traffic control operations center in the cloud. The services offered by this traffic control operations center in the cloud may be made available to a number of entities.

It is an aspect of the present disclosure that the information collected, analyzed, and/or used in traffic management system may be stored and/or distributed to one or more parties. One example of information distribution may include reporting results of the traffic management system to one or more parties. These one or more parties may include, but are not limited to third parties, governmental agencies, regulatory agencies, groups, institutions, companies, private organizations and/or groups, public groups, individuals, emergency services, etc., and/or combinations thereof. In some cases, the distribution and/or reporting may be restricted and/or associated with a cost. For instance, a company may wish to collect all of the data relating to traffic passing along a specific travel path in a geographical location. This data may be collected by the various devices and systems described herein. In any event, the data may be associated with a cost, such that more detailed data (e.g., specific information, quantities of information, etc.) has a higher cost than less detailed data (e.g., general information, low quantities of information, etc.). As another example, a private organization may pay for information that the private organization does not wish to share with one or more of the other parties. In this case, the information may be made available only to the private organization. In other words, the information may include restricted access and/or security requirements to access the memory having the information. These security requirements may be sold to the private organization and/or members thereof for a cost.

In some embodiments, the routing alternatives may be provided to one or more users, such as, entities, end users, companies, groups, etc., based on a subscription service model. For example, routing alternatives, data, traffic information, and/or other analyses (e.g., provided by the traffic management module, etc.) may be provided to users in exchange for users agreeing to various terms and conditions associated with a subscription. In one embodiment, the subscription may be structured as a tiered-subscription model. The subscription, and/or various tiers of the subscription, may be associated with a cost. For instance, various services and/or costs may be configured for a user based at least partially on which subscription tier the user is classified with. The tiered-subscription model can include, but is not limited to, two or more of, a first tier, a second tier, a third tier, a custom tier, and the like.

The first tier may be associated with an entry-level or "free" information subscription tier. In some embodiments, a user in the first tier may be required to agree to specific terms and conditions related to the tier in order to receive any information (e.g., traffic data, alternative routes, feedback, etc.) associated with the traffic management module and/or system. Specific terms and conditions may include the user providing at least one of the following non-limiting examples, user information, user identification, user traffic information (e.g., allowing the traffic management module to collect traffic information from at least one communication device associated with the user, etc.), communication device control authorization, data usage authorization, times associated with travel, etc. In one embodiment, a user in the first tier may receive general information regarding traffic conditions (e.g., from the traffic management module, etc.) in exchange for user data. General information may include notifying the user of disruptions detected in a traffic system.

The second tier may be associated with a first "paid for" subscription tier. In some embodiments, the second tier may include one or more aspects of the first tier, as described herein. In exchange for at least the payment made by the second tier user, the user may have access to enhanced traffic information (e.g., including traffic conditions, alternative routing preferences, etc.). Additionally or alternatively, the second-tier user may have access to alternative routing alerts. The alternative routing alerts may be sent to the user via the traffic management module communicating with at least one of the user's communication devices. In some cases, the alerts may be retrieved by a user, pushed automatically (e.g., in response to the detection of a disruption, etc.), and/or retrieved on a timed basis.

The third tier may be associated, with a second "paid for" subscription tier. In some embodiments, the third tier may include one or more aspects of the first and/or second tier, as described herein. In exchange for at least the payment made by the third tier user, which may be greater than the payment of the second tier, the user may have access to one or more of the following features: enhanced traffic information (e.g., including traffic conditions, alternative routing preferences, etc.), alternative routing alerts, priority routing alternatives (e.g., third tier users are given cost/time saving routes over other users, etc.), priority alerts (e.g., alerts made to third tier users are made before alerts are made to other lower tiered users, etc.), stealth mode (e.g., the third tier user may not be required to provide traffic information—at least when compared to the extent of information provided by other users, etc.—to receive any information from the traffic management module as provided herein.

A custom tier may be provided to organizations, fleets, governmental entities, and/or other groups. The custom tier can include any of the features associated with any other tier disclosed. Additionally or alternatively, the custom tier may include information specific to the users associated with organizations, fleets, governmental entities, and/or other groups. For example, restricted paths may be provided to a carrier organization that transports goods from point to point. The restricted paths may be based on vehicle load (e.g., weight, size, height, length, number of cars, number of axles, etc.), cargo (e.g., hazardous, flammable, toxic, edible, perishable, etc.), driver rating (e.g., driver-in-training, international driver, etc.), and the like. The custom tier may be provided in exchange for an enhanced data collection and traffic information from certain members of the organizations, fleets, governmental entities, and/or other groups. The enhanced data collection may include at least one of, start/stop times, time of travel, routes taken, routes expected, route deviations, personal user information, vehicle identification, etc., and more associated with a user.

In some embodiments, information gathered by the traffic management system and/or the traffic management module, as provided herein may be monetized. For example, the information may be sold to traffic control entities, organizations, companies, government agencies, governmental entities, groups, individuals, and the like. For example, the information may provide one or more of, general system information, traffic reconfiguration, recommended control strategies, statistics, traffic improvement recommendations, etc. In some cases, the traffic control entities, organizations, companies, government agencies, governmental entities, groups, individuals, and the like may be provided with a "veto power" authority to reject, override, and/or adjust alternative routing provided by the traffic management module. The traffic control entities, organizations, companies, government agencies, governmental entities, groups, individuals, and the like in this case may suggest other alternative routing or force the traffic management module to recalculate alternative routing based on specifically provided criteria. In one embodiment, one or more of the above can be provided to traffic control entities, organizations, companies, government agencies, governmental entities, groups, individuals, and the like, in exchange for money. Additionally or alternatively, the above can be provided to traffic control entities in exchange for data collected by one or more of the traffic control entities' systems.

Aspects of the present disclosure are directed to maintaining a user pool via providing feedback to one or more users of the system. Feedback may be generated based on at least one of detected system settings, user behavior, user preferences, costs of travel, times of travel, routing alternatives followed, routing alternatives ignored, travel improvements, lack of using routing alternatives, etc.

Feedback may be provided to users based on their use and/or non-use of the system and/or routing alternatives. The feedback may be provided to a user in a written, audible, and/or visual presentation form. Examples of presentations may include, but are in no way limited to, email messages, instant messages, push messages, alerts, notifications, and/or other presentation. The presentations disclosed herein may be provided to a communication device associated with a user. By way of example, a first user may be presented with the following feedback via the user's smart-phone: "You could have saved 15 minutes on your journey today had you used the routing alternatives provided by the system." This feedback may be presented when the user did not use the routing alternatives generated by the traffic management module. As another example, a user may be presented with the following feedback: "You saved 5 minutes each day this week on your routes by following the routing information provided by the system." As yet another example, a user may be presented with the following feedback: "You have saved 12 gallons of gasoline this month by following the routing alternatives system guidance."

Feedback may be provided based on the behavior and/or information of others. For instance, a user may be provided with the following feedback: "Non-users spent an extra 10 minutes in traffic yesterday." In this example, the user may know that the system is working, even though the benefit to the user was not readily detectable without comparison to non-users.

The feedback may be used to present suggestions based on past behavior. For example, a user may be provided with the following feedback: "We noticed you take route 'A' every day, you could save time/money/gas if you took route 'B' or left earlier or later." This suggestion may be made by analyzing collected traffic data and calculating, via the traffic management module, optimal routing alternatives for the user alone, regardless of overall traffic system optimization.

In some embodiments, feedback may be provided to fleets, such as, organizations (e.g., law enforcement, fire department, etc.), companies (e.g., carrier, shipper, cable, telephone, power, water, food delivery, and/or other companies having multi-vehicle fleets), and/or governmental agencies (e.g., U.S. Mail, Federal Prisons, etc.), as an incentive to participate with and adopt the traffic management system. The feedback may include providing information related to each vehicle in a fleet in exchange for collecting traffic information from the fleet. The information may include, but is not limited to, standard routes followed, deviations from standard routes, average times, speeds traveled, start times, stop times, routes followed, etc. In some cases, fleets may be provided with feedback relating to restricted paths traveled, regulation violations, and/or legal violations committed by a user in the fleet. In some cases, other information may be provided to the fleet as an incentive to participate with and adopt the traffic management system.

It is an aspect of the present disclosure that a number of theories may be combined and/or employed by the traffic management module in determining disruptions, traffic incidents, alternative routing, traffic flow, etc. In one embodiment, traffic incidents or disruptions may be determined based on an evaluation of data received from one or more entities in the traffic system. For example, a first entity may be detected as travelling at 55 miles per hour (mph) at a first time (T1) and at a first location (L1) and at 45 mph at a second time (T2) and a second location (L2). This decrease in travel speed from T1 to T2 may be used by the traffic management module to predict a slowing of traffic, disruption, or a traffic incident, in an area associated with one or more of T1 and T2 (e.g., areas adjacent to and/or including L1, L2, etc.). Similar, if not identical, predictions may be made by the traffic management module based on data detected and received from a group of two or more entities in a traffic system. In some embodiments, entities travelling at substantially similar speeds, within a predetermined distance of one another, and/or along a particular path may form a group of entities. Grouping one or more entities together can provide for faster processing by the traffic management module. By using only non-redundant data provided by the group (e.g., by using only one instance of any redundant or analogous data and/or unique data, etc.) the traffic management module may make fast calculations on a reduced data set. This reduced data set may be used to provide alternative routing to one or more entities in the group or to all of the entities of the group.

In some embodiments, a user may be provided with an alternative route notification and/or message at a communication device. The notification and/or message may include an option for receiving an alternative route map. For example, a user may choose to receive an alternative route (e.g., in the form of a map and/or instructions, etc.) by interacting with the notification and/or message. Interaction may include selecting a link, hyperlink, uniform resource locator (URL), button, and/or the like. In any event, the selection may be configured to present the alternative route to the user via a graphical user interface (GUI) of a communication device. In some embodiments, alternative routes and/or communications may be provided to a user via a direct individualized messaging system. Additionally or alternatively, the alternative routes and/or communications may be provided to a number of users generically.

Adjustments to the traffic management and/or settings can be based on a planned change to the system, a planned event, and/or real-time data. In one embodiment, when real-time data is received, the traffic management module can anticipate disruptions, traffic incidents, and/or changes to traffic flow, and in response change the operation of the traffic system. Changing the operation of the traffic system may include providing alternative routes to one or more entities before a disruption occurs. For instance, a major football game may end in the evening at a particular time. Continuing this example, the traffic management module may determine to route entities away from a common pathway that will be used by those leaving the football game. While this alternative routing may be inconvenient for one or more entities travelling along the common pathway, the rerouting of those one or more entities provides a benefit for the flow of traffic in the system.

Determinations may be made in considering whether it is reasonable to provide an alternate route for a particular entity or group of entities. These determinations may include entity and/or user preferences, user input, number of occupants associated with a vehicle and/or entity, information about the occupants associated with a vehicle and/or entity, severity of a traffic incident or disruption, and/or the like.

In some embodiments, a user may be presented with routing options for alternative routes. This presentation may be made via a GUI of a communication device. In any event, the options may include alternative route preferences (e.g., continually moving, fuel conservation, time conservation, side roads, highway roads, etc.), emergency override of alternative routing, requesting an emergency route to a destination, accepting provided alternative route, rejecting provided alternative route, etc., and/or combinations thereof. In one embodiment, the options may be selected automatically (e.g., via a communication device, server, and/or the traffic management module, etc.) and based on preferences associated with a user. The preferences may be stored locally to a user (e.g., in the memory of a communication device) and/or remotely from a user (e.g., on a server, in the cloud, and/or in a memory associated with the traffic management module, etc.).

Users may be rewarded for enrolling to automatically accept alternative routes that increase the time of travel and/or the travel distance. This increase may be measured against an average alternative route provided to users in the traffic system, based on a comparison of other alternative routes provided to users in the traffic system, and/or other method. In one embodiment, a user may be awarded with emergency override credits that can be used by a user to reject an alternative route provided and/or request a preferred alternative route. The preferred alternative route may decrease the travel time and/or the travel distance (e.g., when compared to other alternative routes or an average alternative route, etc.) of an alternative route provided to the user.

In some embodiments, traffic density may be used to predict traffic flow incidents, disruptions, and/or other traffic system information. For instance, a group of entities may be determined to be in spatial proximity to one another and travelling at a particular speed and in a particular direction along a path. As the density of entities increases (e.g., the number of entities in the group increases, etc.) the higher the risk of possible traffic disruptions in locations associated with that group. Additionally or alternatively, as a density of traffic increases a number of traffic monitors and/or sensors may sample at an increased rate of speed (e.g., from measuring every X times per second to measuring every 2X times per second, etc.).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, can be used interchangeably and can include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein can refer to any known or later developed hardware, software, firmware, artificial intelligence, fuzzy logic, or combination of hardware and software that is capable of performing the functionality associated with that element.

The terms, "optimal routing," "optimal route," and "optimal solution," as used herein can be used interchangeably and can refer to one or more routes generated via one or more of the methods and systems provided herein that increase a flow of traffic in response to detecting a congestion of traffic in a traffic system. The optimal solution can provide a number of routing alternatives to entities in the traffic system to maintain at least some level of traffic flow in the traffic system, on a system-wide basis. For example, the optimal route may provide one or more routes that are determined via at least one transportation theory algorithm stored in memory and executed by a traffic management module, where a number of entities, a number of paths, and a number of traffic conditions that define the traffic system and a first operating condition at a first time, are input into the at least one transportation theory algorithm. The one or more routes can be provided to various entities in the system to increase traffic flow in the traffic system. It should be understood that the optimal routing may include providing different alternative routes to first, second, and/or third sets of entities, and so on, that may not be optimal for at least one set of the entities, but may be optimal for the traffic system.

"Queueing theory" refers to algorithms for characterizing or defining the behavior of queues. Queueing theory is generally considered a branch of operations research because the results are often used when making business decisions about the resources needed to provide services. A queueing model based on the Poisson process and its companion exponential probability distribution often meets these two requirements. A Poisson process models random events (such as a customer arrival, a request for action from a web server, or the completion of the actions requested of a web server) as emanating from a memoryless process. That is, the length of the time interval from the current time to the occurrence of the next event does not depend upon the time of occurrence of the last event. In the Poisson probability distribution, the observer records the number of events that occur in a time interval of fixed length. In the (negative) exponential probability distribution, the observer records the length of the time interval between consecutive events. In both, the underlying physical process is memoryless. Examples of queueing theory functions or principals include, but are in no way limited to, BCMP network, Buzen's algorithm, Ehrenfest model, fork-join queue, Gordon-Newell network, Jackson network, Little's law, Markovian arrival processes, Pollaczek-Khinchine formula, quasireversibility, random early detection, renewal theory, the Poisson process, and the like. Models based on the Poisson process often respond to inputs from the environment in a manner that mimics the response of the system being modeled to those same inputs. The analytically tractable models that result yield both information about the system being modeled and the form of their solution. Even a queueing model based on the Poisson process that may do a relatively poor job of mimicking detailed system performance can be useful. The fact that such models often give "worst-case" scenario evaluations appeals to system designers who prefer to include a safety factor in their designs. The form of the solution of models based on the Poisson process often provide insight into the form of the solution to a queueing problem whose detailed behavior is poorly mimicked. As a result, queueing models are frequently modeled as Poisson processes through the use of the exponential distribution.

"Transportation theory" refers to the study of optimal transportation and allocation of resources. The transportation problem as it is stated in modern or more technical literature looks somewhat different because of the development of Riemannian geometry and measure theory. Examples of transportation theory functions or principals include, but are in no way limited to, Wassertein metric, transport function, and the Hungarian algorithm.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 14 is a diagram of a data structure for a responder in a traffic management system in accordance with embodiments of the present disclosure;

FIG. 15 is a diagram of a data structure for storing information about registered responders in accordance with embodiments of the present disclosure;

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
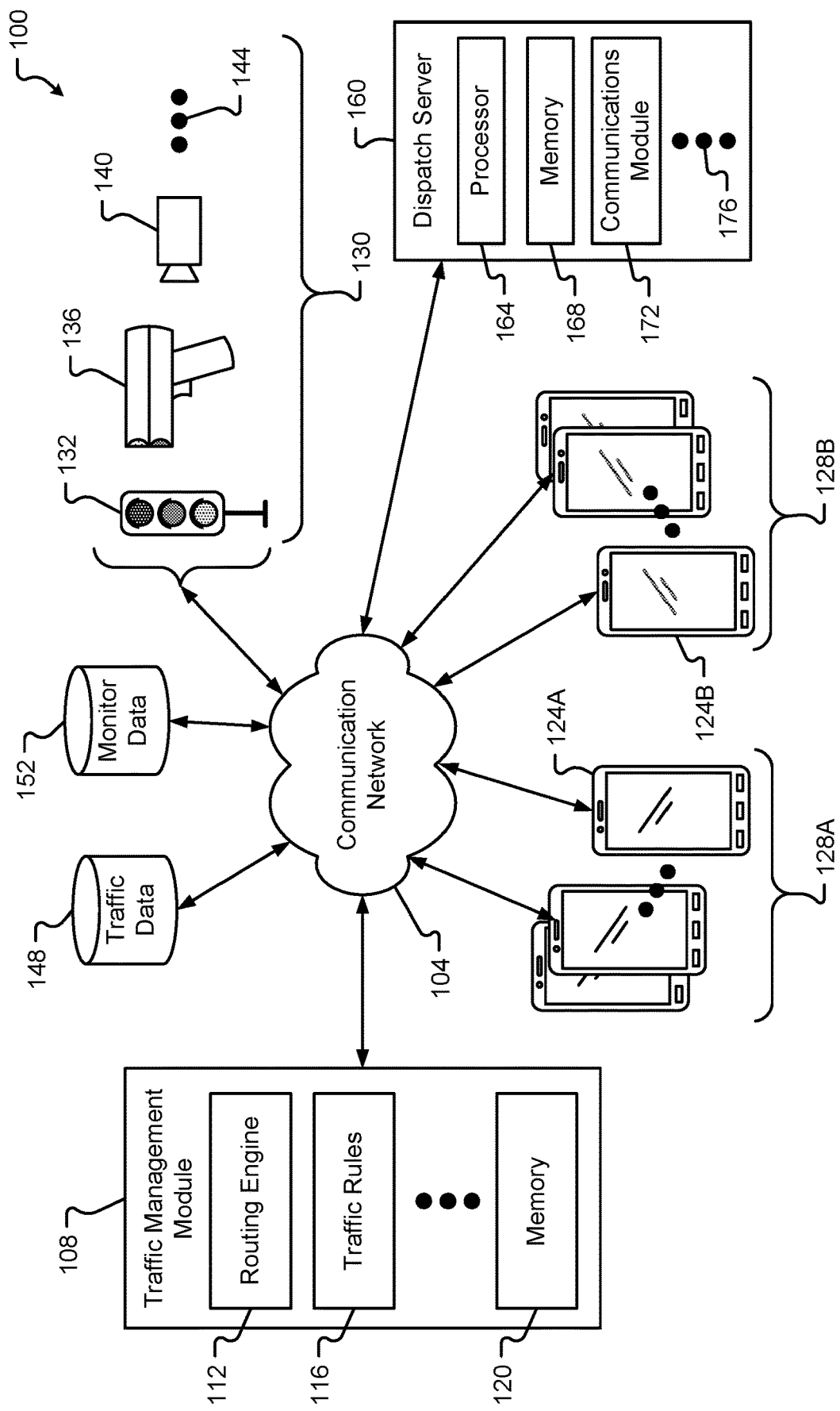
FIG. 1 is a block diagram depicting a traffic management system in accordance with an embodiment of the present disclosure.

FIG. 1 shows a block diagram of a traffic management system 100 in accordance with embodiments of the present disclosure. The traffic management system 100 may be a distributed system and, in some embodiments, comprises a communication network 104 connecting one or more communication devices 124 associated with one or more entities, with a traffic management module 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, wireless network, and any other type of packet-switched or circuit-switched or time-switched network known in the art. In addition, it can be appreciated that the communication network 104 need not be limited to any one network type, and instead may be comprised of a number of different networks and/or network types.

The communication devices 124 may comprise any type of known communication equipment or collection of communication equipment. Examples of a suitable communication device 124 include, but are not limited to, a personal computer, laptop, Personal Digital Assistant (PDA), vehicle computer, navigation system, cellular phone, smart phone, telephone, mobile computer, or combinations thereof. In general each communication device 124 may be adapted to support video, audio, text, and/or data communications with other communication devices 124 as well as the traffic management module 108. The type of medium used by the communication device 124 to communicate with other communication devices 124 or traffic management module 108 may depend upon the communication applications available on the communication device 124. In some cases, communication devices 124 may be associated with a group of communication devices 128. The groups 128 may be formed dynamically and may be based on location, identification, and the like.

The traffic management module 108 may include a routing engine 112, traffic rules 116, and a memory 120. The memory 120 may be used connection with the execution of application programming or instructions by the routing engine 112, and for the temporary or long term storage of program instructions and/or data. As examples, the memory 120 may comprise RAM, DRAM, SDRAM, or other solid state memory. In some cases, the traffic management module 108 may be contained in a memory and executed by a processor of a server. The server, in this case, may be separate from the communication devices 124. In any event, the traffic management module 108 may be configured to receive traffic information from one or more sources, determine alternate routes, and provide alternate routes to one or more communication devices 124. For example, the traffic management module 108 may receive traffic information from one or more traffic monitors 130, communication devices 124, and/or other information source.

Traffic monitors 130 can include, but are not limited to, traffic control devices 132 (e.g., traffic lights, adaptive traffic signals, variable speed limit signs, etc.), speed detectors 136 (e.g., radar, lidar, etc.), cameras 140 (e.g., intersection cameras, traffic path cameras, license plate cameras, etc.), and other devices 144 (e.g., tube-counters, GPS locators, controllers, control systems, control centers, etc.). The traffic monitors 130 can provide information about one or more entities (e.g., people, vehicles, conveyances, etc.) along a traffic path (e.g., street, road, highway, toll way, path, bike path, etc.). By way of example, the traffic monitors 130 information can include entity speeds, entity counts, entity identification, traffic flow, entity location, entity position, traffic monitor position, and more.

In some embodiments, the traffic information may be stored in one or more memory 148, 152. The memory 148, 152 may comprise a solid state device or devices. Additionally or alternatively, the memory 148, 152 may comprise a hard disk drive or other random access memory. In one embodiment, the traffic monitors 130 may store collected traffic information in monitor data memory 152. The monitor data memory 152 may be accessed by the traffic management module 108.

As the traffic management module 108 determines alternative routes, data related to the alternative routes may be stored in the traffic data memory 148. This data can be used to determine an effectiveness of alternate routes provided to the one or more entities. For example, the traffic management module 108 may provide a specific alternate route to one or more communication devices 124. In some cases, an entity associated with a communication device 124 may decide not to follow the alternate route. This decision by the entity may be stored in the traffic data memory 148. The traffic management module 108 may refer to the traffic data memory 148 to determine whether other entities are following the provided alternate routes. If not, the traffic management module 108 may determine to adjust the alternate route provided to the one or more entities, via the communication device 124. For instance, the traffic management module 108 may monitor which route, or routes, the entity follows in response to deciding not to follow the alternate route provided. As can be appreciated, the traffic management module 108 may alter subsequent alternate routes provided to entities based on this information. In fact, the traffic management module 108 may determine that the route, or routes, used by the entities (who chose not to follow the alternate route provided) are better (e.g., more efficient in time and/or cost, etc.). These "better" routes may be used in other alternate route presentations. Additionally or alternatively, these "better" routes may be used by the traffic management module 108 in refining subsequent determinations and/or presentations of alternative routes via the traffic management module 108.

In some embodiments, effectiveness of alternate routes provided may be measured based on system recovery. For example, an effectiveness of alternate routes may be determined based on how quickly a traffic system recovers after experiencing a traffic incident and/or condition. The traffic system may pass through several states during recovery. A typical recovery cycle may include a normal operating state, an impacted operating state, a mitigated operating state, a recovery state, and a return to a normal operating state. As can be appreciated, the quicker a system recovers, the better (or more effective) the alternative routes may be determined to be.

In one embodiment, the traffic management system 100 may include a dispatch server 160 comprising a processor 164, a memory 168, a communications module 172, and/or other components 176. In some embodiments, the dispatch server 160 may be part of the traffic management module 108, or vice versa. The processor 164 may comprise a general purpose programmable processor or controller for executing application programming or instructions related to the traffic management system 100 and/or dispatching responders (e.g., first responder vehicles, etc.) to a detected incident. Furthermore, the processor 164 can perform operations for configuring and transmitting/receiving information as described herein. The processor 164 may include multiple processor cores, and/or implement multiple virtual processors. Optionally, the processor 164 may include multiple physical processors. By way of example, the processor 164 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

Examples of the processor 164 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

In some embodiments, the processor 164 of the dispatch server 160 may interact with the memory 168 in performing one or more dispatch functions. The memory 168 may store information and operations necessary for configuring and transmitting or receiving the information described herein. The memory 168 may also be used in connection with the execution of application programming or instructions by processor 164, and for temporary or long term storage of program instructions and/or data. The memory 168 may correspond to one or more computer-readable memory storage devices, disk drives, optical storage devices, solid-state storage devices such as a random access memory ("RAM") and/or a read-only memory ("ROM"), DRAM, SDRAM, and/or other storage device(s) and media, which may be programmable, flash-updateable, and/or the like.

The communications module 172 may comprise one or more physical devices configured to provide communications between the various components of the dispatch server 160 and/or the traffic management system 100. For example, the communications module 172 may comprise communications circuitry including one or more wired or wireless devices, such as a transceivers and/or modems, that allow communications not only between the various systems disclosed herein but also with other devices, such as devices on a network, and/or on a distributed network such as the Internet and/or in the cloud and/or associated with registered responders.

Figure 2:
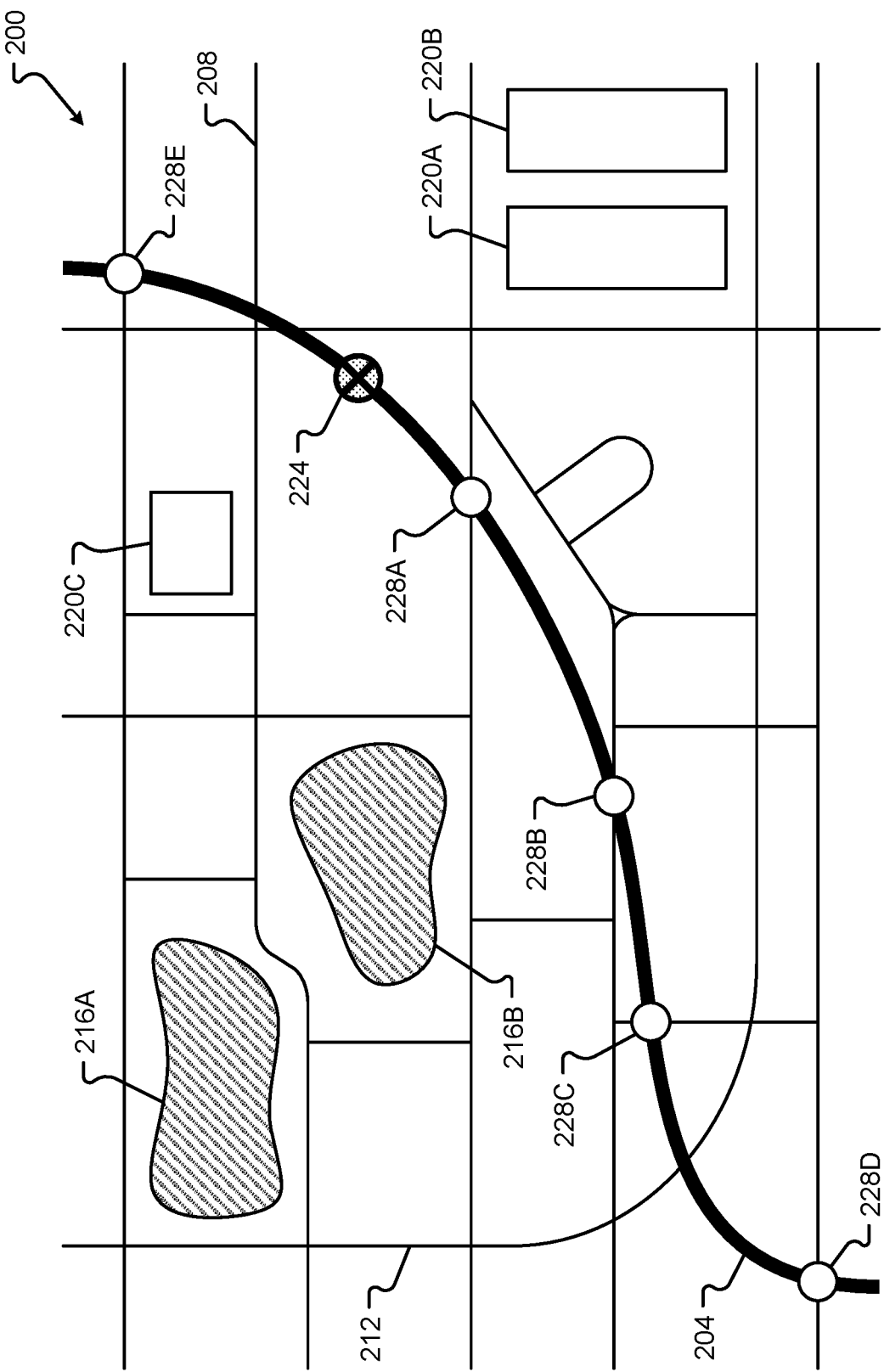
FIG. 2 shows a map of a traffic area having a travel path and alternative routes in accordance with embodiments of the present disclosure.

Referring now to FIG. 2, a map of a traffic area 200 is shown having a travel, or traffic, path 204 and various streets, roads, and other travel paths 208, 212 in accordance with embodiments of the present disclosure. The traffic area 200 shown includes geographical features, such as, lakes 216A, 216B, an industrial area 220A, a retail area 220B, a park 220C, and more. The travel path 204 shows a location of a traffic condition 224 between two exits 228A, 228E of the travel path 204. In one example, the traffic condition 224 may prevent traffic from flowing along the path 204 in a direction from the fourth exit 228D toward the first exit 228A from the traffic condition 224.

Each of the exits 228A-E may intersect with at least one off-path way, or alternate path, 208, 212. Based on the travel path 204, the direction of travel of the traffic, and the location of the traffic condition 224, post exit 228 may be used as a destination to reroute traffic. Although this destination may not be the intended, or final, destination of one or more of the entities along the travel path 204, the destination 228E may be used to reroute at least a portion of the entities on the travel path 204 to reach the destination 228E.

In some embodiments, the destination 228E may be an assumed destination, or temporary destination, based at least partially on travel information associated with an entity (e.g., travel path 204, speed of travel, direction of travel, exit nodes along the path of travel, etc., and/or combinations thereof). In one embodiment, the temporary destination may be verified by responding to a confirmation message presented via a communication device. For example, a user may be presented with a message on a communication device listing the temporary destination and asking the user for input verifying (accepting) or rejecting the temporary destination. Input can be presented by selecting a box, actuating a button, providing a voice command, upon reaching a predetermined time (e.g., countdown, count-up, and/or other timer, etc.) and/or combinations thereof. In the event the user accepts the temporary destination, the temporary destination can be used in calculating the alternative routes as provided herein. If the user rejects the temporary destination, another temporary destination may be determined by the traffic management module 108.

Figure 3:
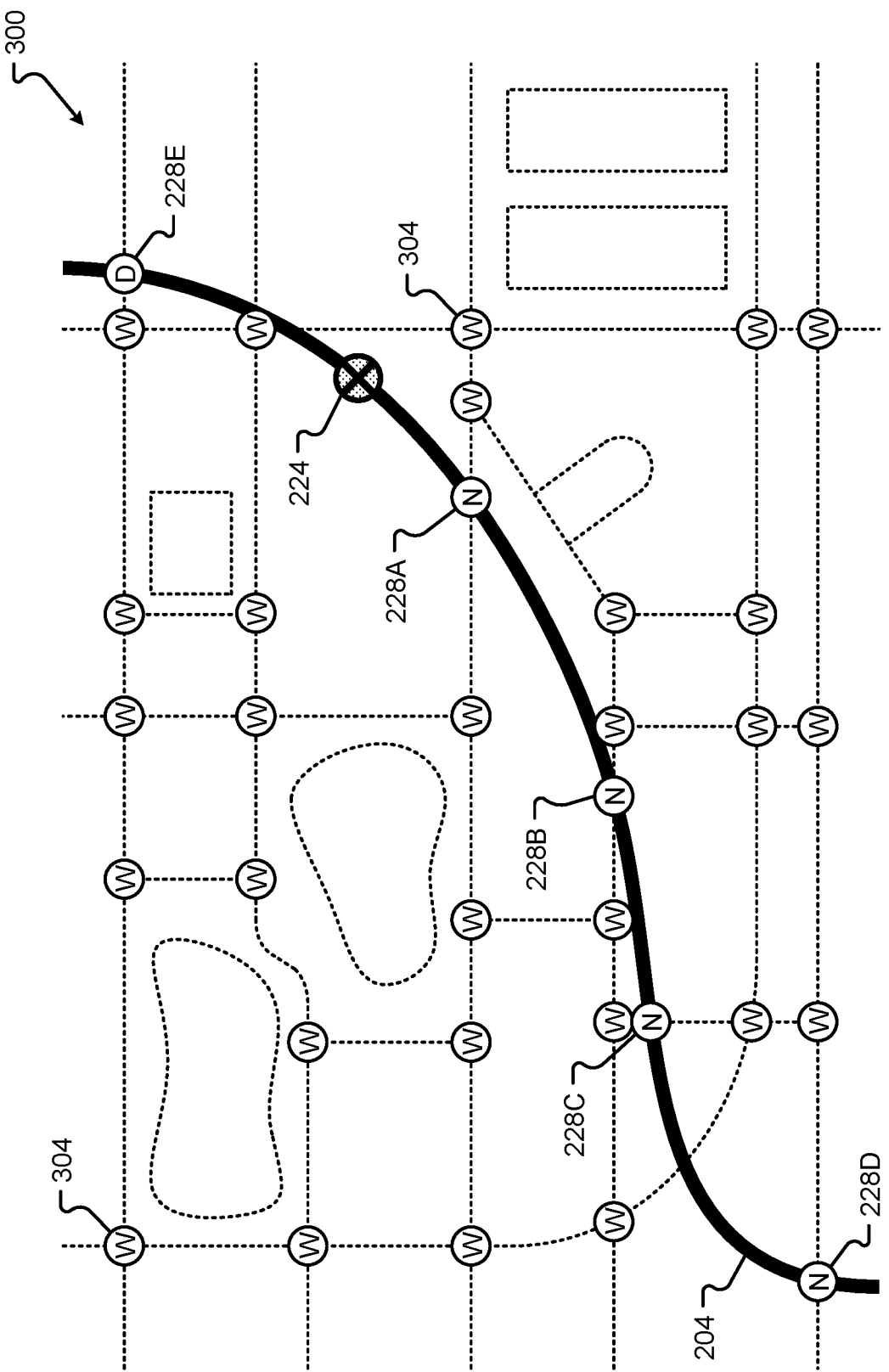
FIG. 3 shows a map of a traffic area having multiple travel nodes for alternative routes in accordance with embodiments of the present disclosure.

FIG. 3 shows a travel node map of the traffic area 300 having multiple travel nodes 304, labelled "W," which may be used for alternative routes in accordance with embodiments of the present disclosure. These travel nodes may represent at least one point through which entities can pass to reach a destination 228E. Also shown in FIG. 3 are multiple travel path or exit nodes 228A-E along the travel path 204. As can be appreciated, the number of travel nodes 304 and/or travel path nodes 228A-E available to an entity may change depending on the location of the entity along the travel path 204.

Figure 4:
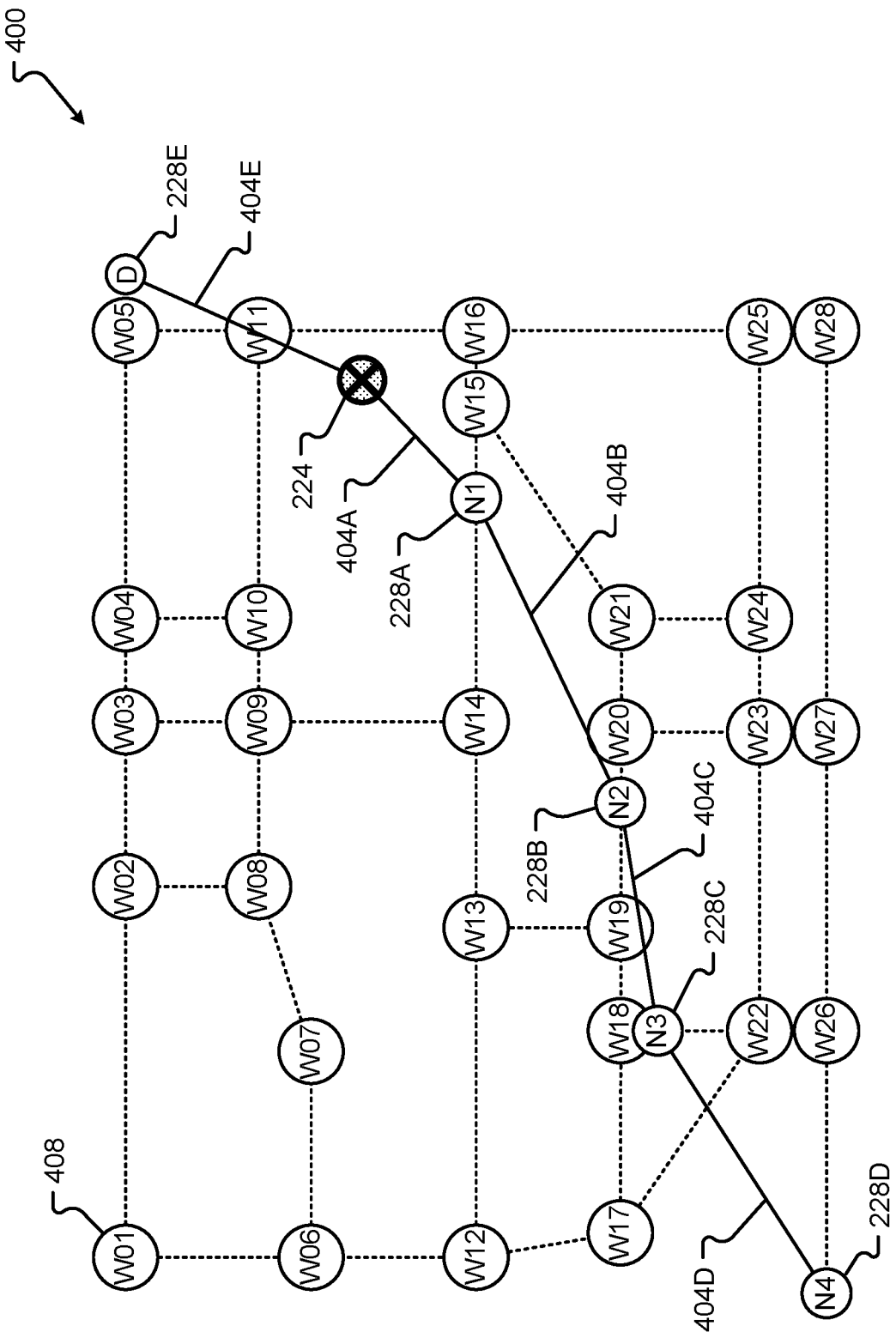
FIG. 4 shows a link-node diagram of a map of a traffic area in accordance with embodiments of the present disclosure.

FIG. 4 shows a link-node diagram 400 of the maps of the traffic areas 200, 300, depicted in FIGS. 2 and 3, in accordance with embodiments of the present disclosure. The link-node diagram 400 shows a graphical representation of the travel path nodes 228A-D, labeled "N1-N4," and the destination 228E, labeled "D," in relation to each other and the alternate path nodes, labeled "W01-W28." In some embodiments, this link-node diagram 400 may be generated by the traffic management module 108. As can be appreciated, the link-node diagram can aid the traffic management module 108 in applying one or more transportation theory algorithms to the problem of rerouting traffic from the travel path 204 to the destination 228E. Examples of transportation theory algorithms may include, but are not limited to, shortest-path, spanning tree, maximum flow, transshipment, and/or other transportation problem algorithms. It should be appreciated that other mathematical modeling, may be used alone, in lieu of, or in combination with the transportation theory and/or queuing theory algorithms, in constructing simulation models and/or in analyzing traffic information. In some embodiments, the simulation models may be generated to at least one of control traffic management, generate alternate routes, determine traffic flow patterns, anticipate traffic incidents, interpret entity information, and the like.

In some embodiments, the travel path 204 may be separated into two or more sections 404A-E. These sections 404A-E may correspond to node-to-node distances and/or evaluation zones. In FIG. 4, the traffic condition 224 is treated as a node, and the section of the travel path 204 closest to the traffic condition 224 is called the first section 404A. In some cases, entities in this first section 404A may not be able to reroute from the travel path 204. Entities in the second section 404B may be rerouted via the first exit 228A (node N1). The entities in the third section 404C may be rerouted via the first exit 228A (node N1) and/or the second exit 228B (node N2). Entities in the fourth section 404D, may be rerouted via the first exit 228A (node N1), the second exit 228B (node N2), and/or the third exit 228C (node N3). In rerouting, the entities may be provided with one or more routes following an exit 228A-D and at least one alternate path node W01-W25.

Figure 5:
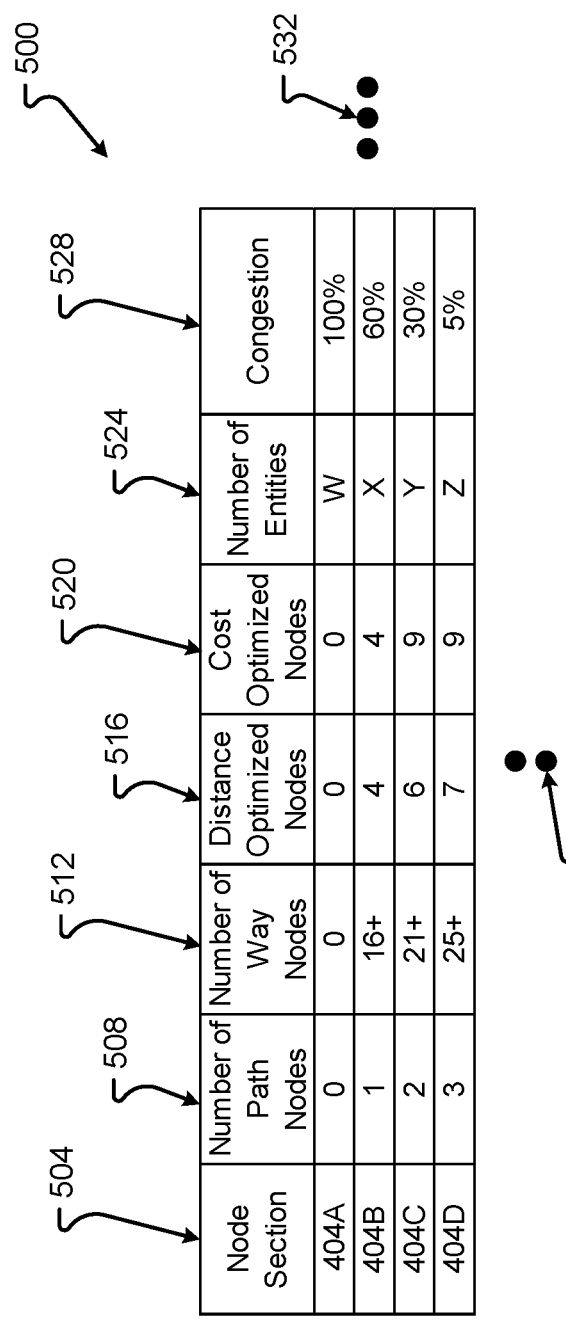
FIG. 5 is a diagram of a data structure for storing information about nodes of a link-node diagram in accordance with embodiments of the present disclosure.

FIG. 5 is a diagram of a data structure 500 for storing information about nodes of a link-node diagram 400 in accordance with embodiments of the present disclosure. As shown, the data structure 500 includes various columns 504-528 associated with each node section 404A-D provided. The columns 504-528 represent fields of the data structure, including a node section field 504 for each node section in the link-node diagram, a number of travel path nodes field 508, a number of alternate route, or way, nodes field 512, a distance optimized nodes field 516, a cost optimized nodes field 520, a number of entities field 524 corresponding to the number of entities on the travel path 204 of each node section 404A-D, a percentage of congestion field 528 representing a percentage of congestion along each node section 404A-D, and more 532, 536.

The node section field 504 may include an identifier for each node section 404A-D in the travel path 204 adjacent to a detected traffic condition 224. In some embodiments, the each node section 404A-D in the field 504 may represent edges, or connections, between two or more nodes in the travel path 204. These edges may correspond to individual paths between possible exit nodes in a travel path. In one embodiment, entities that are located in a particular edge, or node section 404A-D, may be treated as a group of entities. It is an aspect of the present disclosure that the group of entities may be similarly routed or provided with alternative routing. However, it should be appreciated, that one or more entities in the group may be provided with alternative routing that is unique to the one or more entities. In some embodiments, entities in a traffic system 100 may be grouped into one or more platoons. Among other things, the platoons may be used to increase a capacity of one or more travel paths 204. In one embodiment, the platoons may be treated similarly in the traffic system 100. For example, the traffic management module 108 may provide the same alternative routing to each entity in a platoon. In this example, the platoon may be maintained, monitored, and/or controlled in an efficient manner. Moreover, platooning may be employed to reduce the number of unique entities included in a rerouting, or alternative route, determination, saving processing resources and increasing the speed of calculation.

The number of path nodes field 508 can include a number of possible exit nodes or routing start points along a travel path 204 that are available to one or more entities in a node section 404A-D. For instance, entities in the fourth node section 404D have three possible exit nodes or routing start points from which a deviation, departure, or routing alternative from the travel path 204 may begin.

The number of alternate route nodes field 512 can include a number of possible routing or way nodes through which an alternative routing path may pass. These way nodes may represent intersections, path connection points, or other points along an alternative route travel path that are available to one or more entities in a given node section 404A-D.

The distance optimized nodes field 516 may include a number of nodes that provide an optimized distance between the entity and the destination 228E, that travels around, or bypasses, a location or portion of the traffic condition 224.

The cost optimized nodes field 520 may include a number of nodes that provide an optimized cost of travel from a location of an entity in a node section to the destination 228E that travels around, or bypasses, a location or portion of the traffic condition 224.

The number of entities field can include the number of individuals, groups, vehicles, etc., that may be located at a point in time in a given node section 404A-D along the travel path 204. Although shown having a different number of entities for each node section, it should be appreciated that one or more node sections 404A-D may have the same amount of entities in a particular node section 404A-D. The traffic management module 108 may determine to provide alternate routes to node sections 404A-D based on the number of entities in each section at a given time. For instance, the traffic management module may route entities in node sections 404A-D having the fewest amount of entities in a particular section 404A-D, or vice versa.

By way of example, the data structure 500 shows that the first section 404A is completely congested (e.g., 100%) due to a traffic condition 224. In the example provided for the first section 404A, there are no available path nodes or way nodes. The second section 404B shows one path node and more than 16 possible way nodes from which combinations of routes may be selected to reach destination 228E. The distance optimized nodes field may include a number of nodes that provide an optimized distance between the path node and the destination 228E, around the traffic condition 224. Similarly, the cost optimized nodes field may include a number of nodes that provide an optimized cost of travel from the path node and the destination 228E, around the traffic condition 224. The number of entities may represent the number of individuals, groups, vehicles, etc., that are found in a given section 404A-D. In some cases, this field, as well as the other fields, may change as the various numbers and/or conditions change. For example, the information in the data structure 500 may change over time and as such, alternative routes calculated at a first time and a second time may provide different routes for each node section 404A-D.

Figure 6:
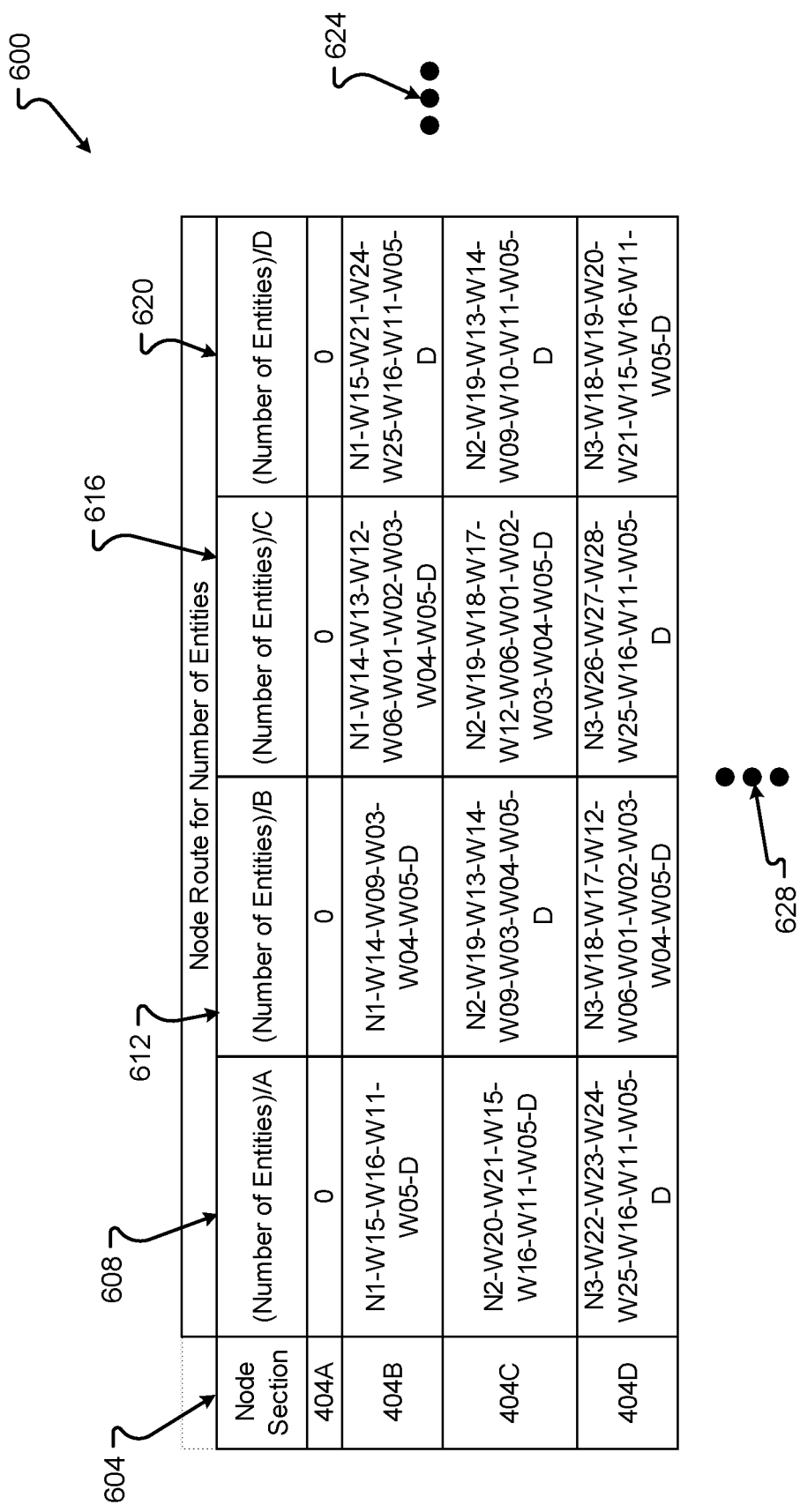
FIG. 6 is a diagram of a data structure for storing information about node routes for entities in a traffic path in accordance with embodiments of the present disclosure.

FIG. 6 is a diagram of a data structure 600 for storing information about node routes for entities in a traffic path 204 in accordance with embodiments of the present disclosure. The data structure 600 includes a node section field 604, a first routing group field 608, a second routing group field 612, a third routing group field 616, a fourth routing group field 620, and more 624, 628. Each node section 404A-D may include one or more entities and the one or more entities may be provided with different routing instructions based on a percentage of entities routed and/or other methods. For instance, one or more of the entities in each node section 404A-D may be routed differently to distribute possible congestion due to rerouting, or providing alternative routing.

In some embodiments, the traffic management module 108 may determine to provide alternate routes to one entity and/or groups of entities based on an optimization of traffic flow, cost, time, combinations thereof, and the like. Among other things, the one or more entities in the various sections 404A-D may be separated into one or more groups 128. Each group 128 may include one or more communication device 124. Various groups 128 can be provided with different and/or the same routing alternatives. In some embodiments, routing alternatives may be presented to one or more groups based at least partially on information associated with the one or more groups. Groups can include private collections of entities (e.g., fleets, companies, etc.), public collections of entities (e.g., paying users, free users, etc.), and/or organizations of entities (e.g., like drivers, like ages, like driving attitudes, etc.).

In the example provided in conjunction with FIG. 6, the number of entities in the second section 404B, may be divided into a certain number of entities (e.g., number of entities divided by a non-zero number "A"). These entities may be provided with the first routing instructions, e.g., N1-W15-W16-W11-W05-D, to reach the destination 228E. Another portion (e.g., number of entities divided by a non-zero number "B") of the entities along the second section 404B, may be provided with second routing instructions, e.g., N1-W14-W09-W03-W04-W05-D, to reach the destination 228E. In some embodiments, all of the entities in a single section 404A-D may be provided with the same routing instructions. In any event, the instructions may be provided empirically and/or analytically (e.g., by applying transportation theory algorithms to the traffic problem, etc.). It should be understood that the methods provided herein can provide alternate routes to various entities in the same node section (e.g., 404B) to distribute traffic within the traffic system 100 according to an optimal solution provided via the traffic management module 108. By way of example, two or more of the entities in a same geographical area can be provided with different alternative routes to optimize traffic flow in the traffic system 100. The different alternative routes may be provided to the two or more entities at the same time. Additionally or alternatively, the alternate routes may be provided as a result of a transportation algorithm applied by the traffic management module 108 in real-time, or near-real-time.

In some embodiments, entities may be routed in accordance with driving preferences, recorded driving styles (e.g., historical data, etc.), age of users, and/or other user information. For example, a number of drivers having "slow" driving information (e.g., the drivers are known as being slow drivers) may be provided with alternative routes along a similar path. In a similar fashion, faster drivers may be routed along different alternative routes with other fast drivers. Additionally or alternatively, older drivers may be provided with alternative routes that take longer in time to reach the destination than alternative routes provided to younger drivers. At least one benefit to providing alternative routing to like, or similar, drivers includes providing a consistency and/or predictability in traffic flow along all of the alternate routes. Moreover, allowing like drivers to drive together can provide harmony in the traffic system 100, enjoyment in driving experience, and decreased chances of subsequent disruptions along the alternative routes.

Figure 7:
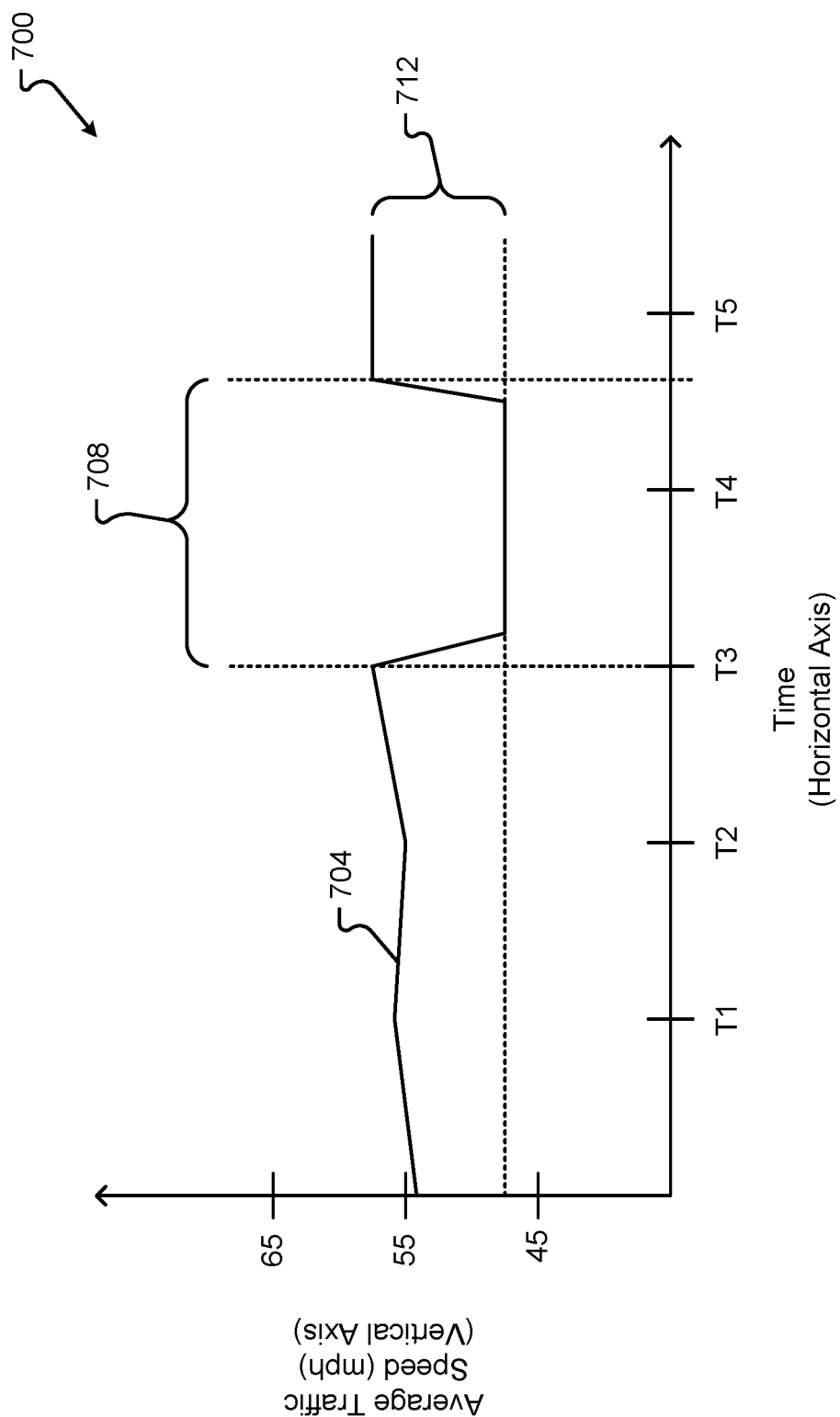
FIG. 7 shows a graphical representation of traffic turbulence detected in a monitored traffic area in accordance with embodiments of the present disclosure.

Referring now to FIG. 7, a graphical representation of traffic turbulence 700 detected in a monitored traffic area is shown in accordance with embodiments of the present disclosure. Traffic turbulence can be generally described as an interruption in monitored traffic information associated with a traffic path 204. In the graphical representation shown, the average speed 704 of one or more entities is measured over time. In this example, between time T3 and T5 708, the average speed 704 of the one or more of the entities drops from approximately 56 miles per hour (mph) to 47 mph. This 9 mph drop 712 may indicate an impending, future, or existing traffic condition 224. In some embodiments, the traffic management module 108 may communicate with a traffic control device 132 (e.g., traffic light, adaptive traffic signals, variable speed limit signs, etc.) or central management system to prevent a possible traffic condition 224. For instance, the traffic management module 108 may reduce the speed limit displayed to variable speed limit signs along the traffic path 204, or send a request to the central management system or other controller, to prevent an accident. As another example, the traffic management module 108 may reroute entities before reaching the point where traffic turbulence was detected.

Figure 8:
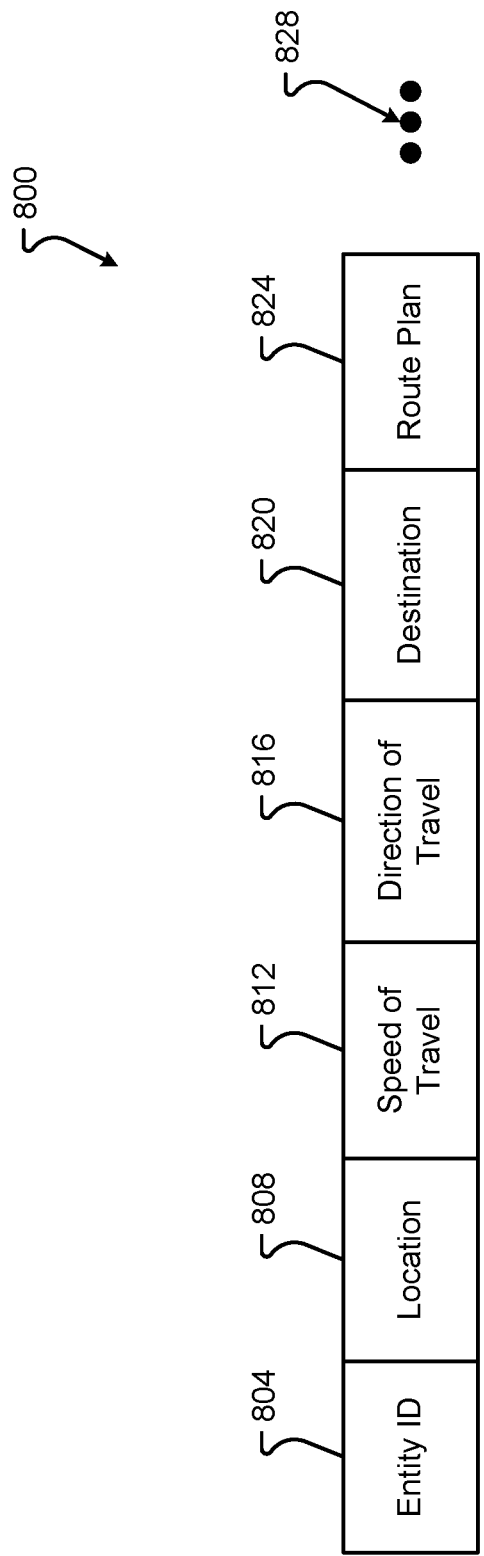
FIG. 8 is a diagram of a data structure for an entity in a traffic management system in accordance with embodiments of the present disclosure.

FIG. 8 is a diagram of a data structure 800 for an entity in a traffic management system 100 in accordance with embodiments of the present disclosure. The data structure 800 may include an entity identification (ID) field 804, a location field 808, a speed of travel field 812, a direction of travel field 816, a destination field 820, a route plan field 824, and more 828.

The entity ID field 804 may comprise data that identifies an entity from another entity. In one embodiment, the data may include a Media Access Control (MAC) address of the communication device 124 associated with the entity. In some embodiments, the data may include a license plate of a vehicle travelling along the traffic path 204. Among other things, the entity ID may comprise data that can be used to differentiate between the entities along a traffic path in the traffic management system 100.

In one embodiment, the entity ID field 804 may include information that associates at least one communication device 124A with another communication device 124B and/or an entity. For example, a driver and a passenger may be traveling together in a vehicle. In this example, both the driver and the passenger may have a communication device 124A, 124B. As can be appreciated, it may be beneficial to determine whether the two communication devices 124A, 124B (e.g., of the driver and the passenger, etc.) are associated with one another and/or with the vehicle before providing an alternative route to either device 124A, 124B. This association may be based on a location of the communication devices 124A, 124B to one another and/or to the vehicle. The location may include a location of the devices 124A, 124B determined over time. For instance, a family travelling together (even in different vehicles) may share similar device location data over time. In this case, the communication devices 124 of the family may be associated with one another, a family vehicle or vehicles, and/or a group. As provided herein, the location information may be stored in the location information field 808. Additionally or alternatively, the association may be based on a registration of the communication devices 124A, 124B with one another and/or with a vehicle. Registration may include, but is not limited to, near field communications (NFC) registration, Bluetooth® registration, proximity detection, signal detection, and the like.

In some embodiments, the entity ID field 804 may comprise information that identifies an entity (e.g., a vehicle, etc.) based on entity characteristics. Examples of entity characteristics may include, but are not limited to, color, type, make, manufacturer, condition, shape, and/or other characteristic associated with the entity. These entity characteristics may be detected via one or more cameras 140 and/or other traffic monitors 130 and may be provided to the traffic management module 108. Additionally or alternatively, the entity characteristics may be provided by one or more users in the traffic system 100. In some cases, the traffic management module 108 may determine the entity characteristics and store the determined entity characteristics in the entity ID field 804.

The location field 808 may comprise data that identifies a location of the entity along the traffic path 204. In one embodiment, the location data may be provided by a Global Positioning System (GPS), or equivalent location information system, associated with the communication device 124 of the entity. In some embodiments, the data may include a position of the entity determined via one or more of the traffic monitors 130. Among other things, the location data may comprise data that can be used to determine at least one alternative route, e.g., via the traffic management module 108.

The speed of travel field 812 may comprise data that identifies a speed the entity is traveling along the traffic path 204. In one embodiment, the speed of travel may be provided by time differences in location data as provided above. In some embodiments, the data may include a speed of the entity determined via one or more of the traffic monitors 130 (e.g., the speed detectors 136, etc.). Among other things, the speed of travel data may comprise data that can be used to determine at least one alternative route, adjustment of adaptive and/or conventional traffic signals, and/or control of variable speed limit signs, e.g., via the traffic management module 108.

The direction of travel field 816 may comprise data that identifies a direction the entity is traveling along the traffic path 204 (e.g., toward or away from the traffic condition 224, etc.). In one embodiment, the direction of travel data may be provided by time and location differences in the location data provided above. In some embodiments, the direction of travel data may include a direction of the entity determined via one or more of the traffic monitors 130 (e.g., cameras 140, etc.). Among other things, the direction of travel data may comprise data that can be used to determine at least one alternative route, adjustment of adaptive and/or conventional traffic signals, and/or control of variable speed limit signs, e.g., via the traffic management module 108.

The destination field 820 may comprise data that identifies a destination to which the entity is traveling along the traffic path 204. In one embodiment, the destination data may be provided based on the direction of travel information provided above. In some embodiments, the destination data may be determined via one or more of the traffic monitors 130 (e.g., cameras 140, etc.). For example, as an entity is traveling along the traffic path 204, the traffic management module 108 may create at least one temporary destination point along the path 204 for the entity. The temporary destination point may include any node along and/or adjacent to the traffic path 204 and can be used (e.g., via the traffic management module 108, etc.) in calculating alternative routing information as described herein. As the entity travels along the path 204, the temporary destination point may change. This temporary destination point data may be stored in the destination field 820. In some cases, the temporary destination point data for an entity may be associated with a time of recordation. The time of recordation may be used by the traffic management module 108 to recalculate alternative routes for entities in a temporal order. As can be appreciated, an entity or user in the system is not required to enter a destination for the system to operate. The routing alternatives may be provided to entities without receiving any entered destination by a user.

In yet another embodiment, the destination of the entity may be retrieved from a mapping application running via the communication device 124. Among other things, the destination data may comprise data that can be used to determine at least one alternative route, e.g., via the traffic management module 108.

Similar to the destination field 824, the route plan field 824 may comprise data that identifies a destination to which the entity is traveling along the traffic path 204. In one embodiment, the route plan data may include specific node-to-node travel instructions. In some embodiments, the route plan data may be stored in a memory of the communication device 124. The route plan may be configured to store at least one alternative route provided by the traffic management module 108. This alternative route may be updated via the traffic management module 108. Among other things, the destination data may comprise data that can be used to determine and/or adjust at least one alternative route, e.g., via the traffic management module 108.

Figure 9A:
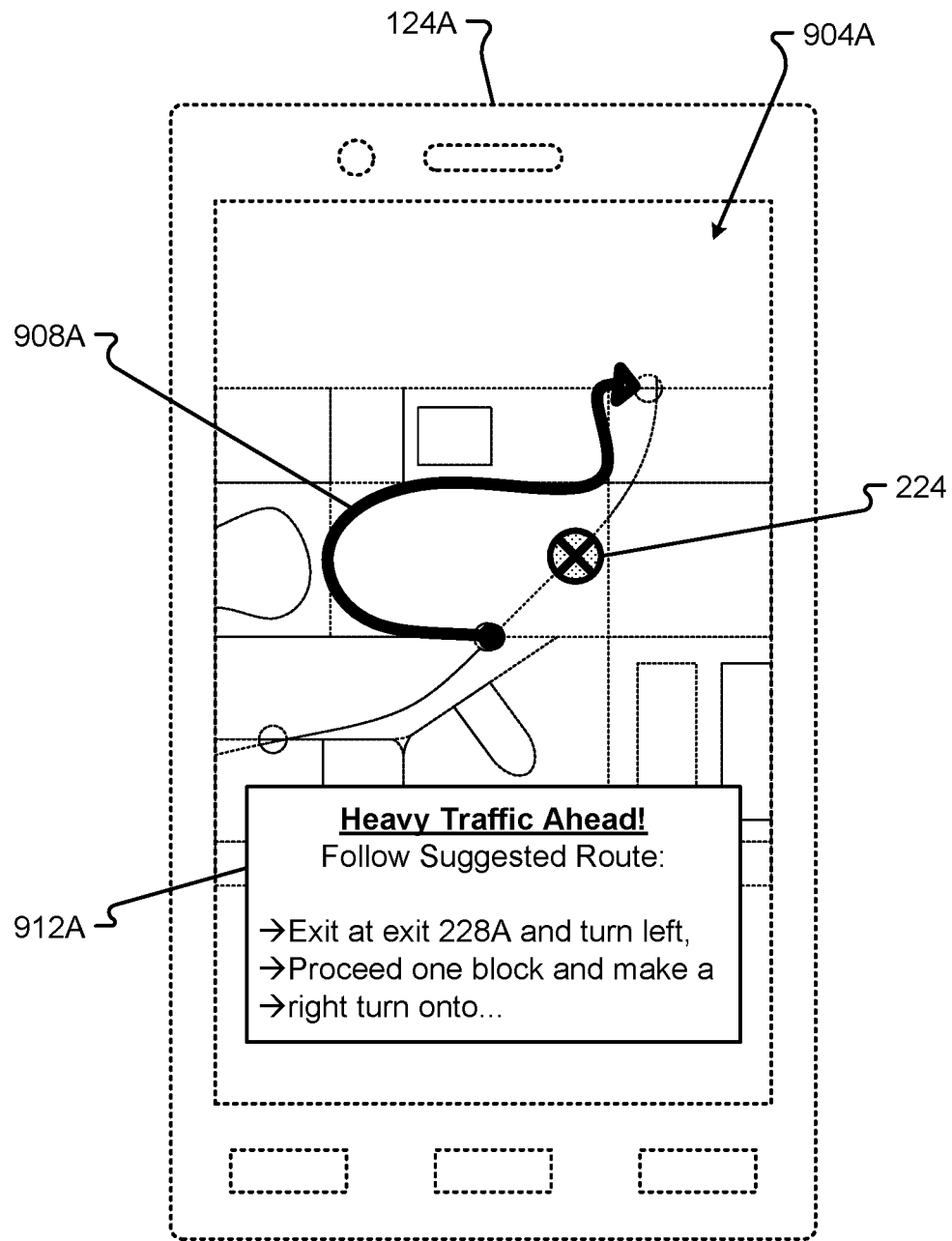
FIG. 9A shows a first route alternative provided to a graphical user interface of a communication device in accordance with embodiments of the present disclosure.
Figure 9B:
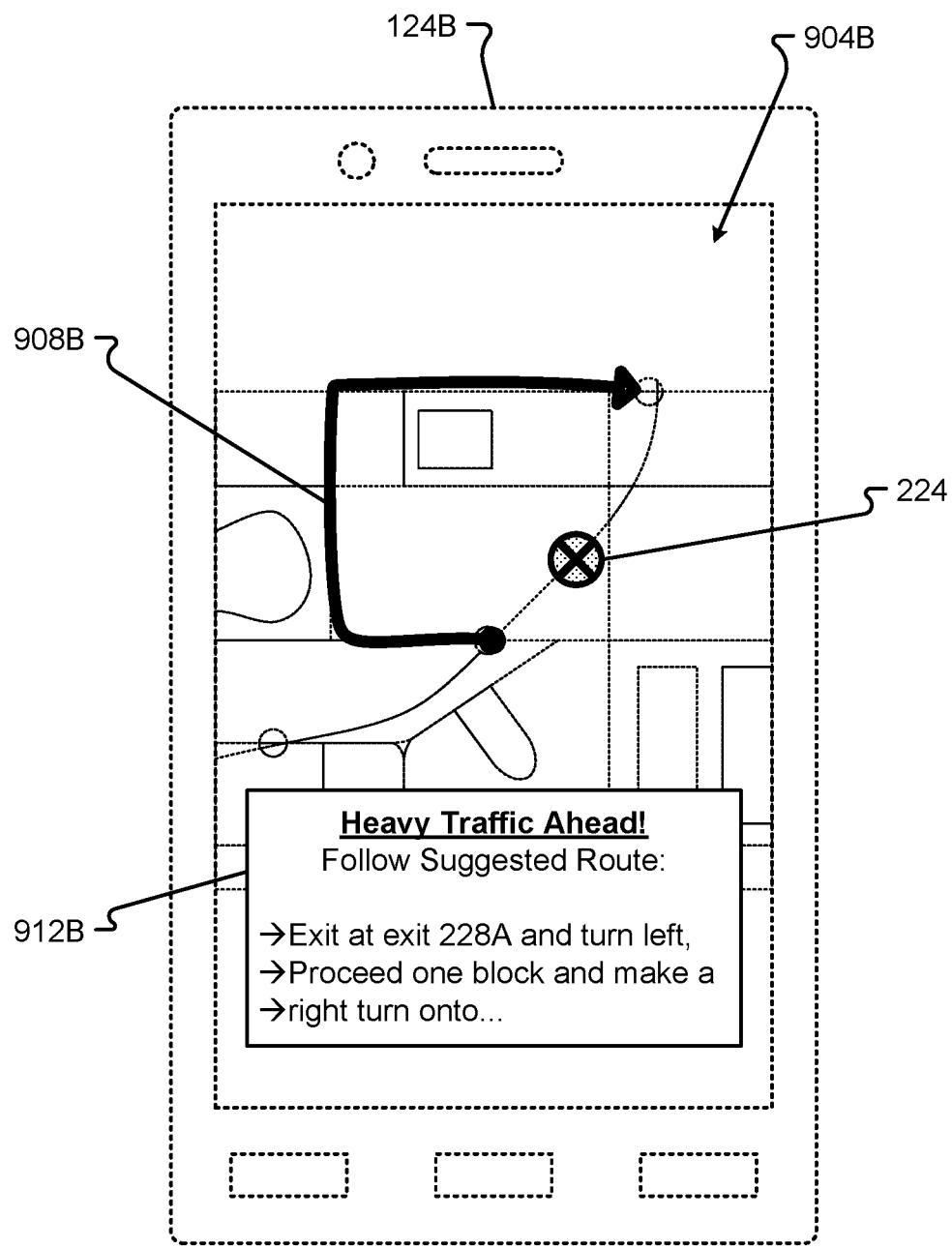
FIG. 9B shows a second route alternative provided to a graphical user interface of a communication device in accordance with embodiments of the present disclosure.

FIGS. 9A-9B show route alternatives provided to the graphical user interface (GUI) associated with various communication devices 124A-B. In particular, FIG. 9A shows a first route alternative provided to a GUI of a communication device 124A for a first group 128A (of one or more entities), while FIG. 9B shows a second route alternative provided to the GUI of a communication device 124B for a second group 128B (of one or more entities). The groups 128A-B may include any of the groups as described above.

In any event, the presentation of the alternate route can include a visual route element 908A-B, a verbal route element 912A-B (e.g., audible and/or displayed to the GUI, etc.), and a map background 904A-B. Among other things, traffic may be routed according to one or more routes, as provided herein, to prevent congestion along alternate paths. In some cases, this routing may require various entities to receive and/or follow different routing instructions. As shown in FIG. 9A, the communication device 124A is presented with a first group route 908A that includes five separate paths. These paths lead from an exit node to a destination node to avoid the traffic condition 224. In FIG. 9B, the communication device 124B is presented with a second group route 908B that includes three separate paths. Similar to the first group route 908A, the paths of the second group route 908B lead from an exit node to a destination node to avoid the traffic condition 224. In this example, the traffic is split between two routes 908A-B. A benefit of splitting the traffic can include alleviating any consequential congestion along the various paths from exit node to destination.

Figure 10:
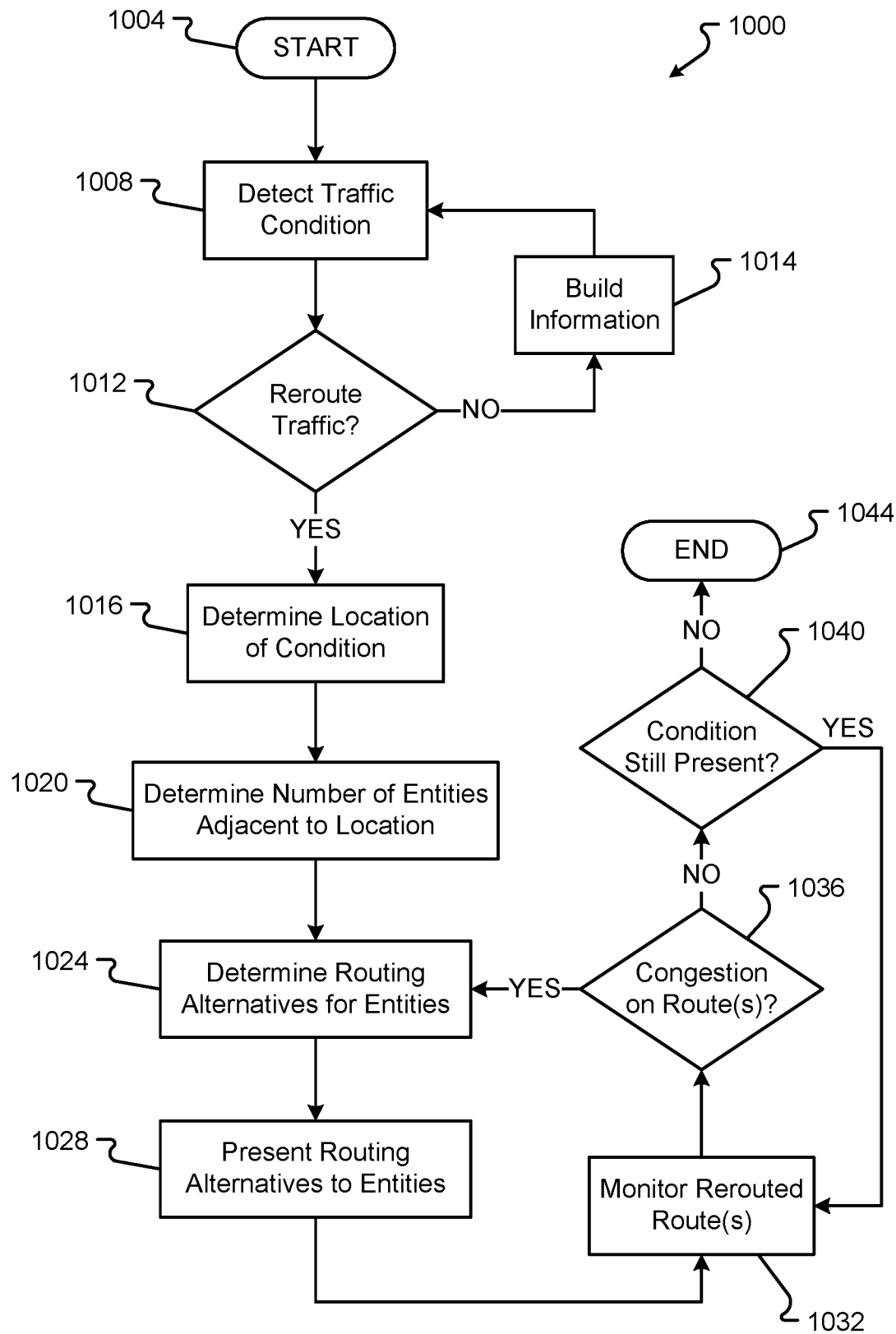
FIG. 10 is a flow chart depicting an operational embodiment of the traffic management system in accordance with one embodiment of the present disclosure.

FIG. 10 is a flow chart depicting an operational embodiment 1000 of the traffic management system 100 in accordance with one embodiment of the present disclosure. While a general order for the steps of the method 1000 is shown in FIG. 10, the method 1000 can include more or fewer steps or can arrange the order of the steps differently than those shown in FIG. 10. Generally, the method 1000 starts with a start operation 1004 and ends with an end operation 1044. The method 1000 can be executed as a set of computer-executable instructions executed by a computer system and encoded or stored on a computer readable medium. Hereinafter, the method 1000 shall be explained with reference to the systems, components, modules, software, data structures, user interfaces, etc. described in conjunction with FIGS. 1-9B.

The method 1000 begins at step 1004 and proceeds by detecting a traffic condition along a travel, or traffic path 204 (step 1008). Detection of the traffic condition 224 may include analyzing data provided by one or more traffic monitors 130. For example, speeds of travel may indicate that traffic in an area is slowing and/or stopped. As another example, the counts of vehicles through a particular intersection and/or monitor point may indicate that a traffic condition 224 is present along a traffic path 204.

In any event, the method 1000 continues by the traffic management module 108 determining whether to reroute traffic in response to the traffic condition 224 detected (step 1012). If the traffic condition 224 detected is minor (e.g., a brief slowing of traffic, a temporary breakdown, at a non-peak hour, etc.), the traffic management module 108 may determine not to reroute traffic and the method 1000 may end at step 1044 or proceed to build information at step 1014 for the traffic system 100. The traffic condition 224 may qualify as more serious, in which case a reroute of traffic may be required. Examples of more serious traffic conditions 224 may include, but are not limited to, pile ups, traffic impeding stalls, high congestion, slow speeds of traffic, peak hour usage, accidents, construction, and the like. Classifications of traffic conditions 224 may be stored in rules 112 of the traffic management module 108. For example, the traffic management module 108 may compare conditions and/or traffic information associated with a traffic condition 224 to determine whether to reroute traffic.

The method 1000 may proceed by building information about the traffic system 100 (step 1014). It should be appreciated that information about the traffic system 100 may be monitored, collected, and/or stored whether the method reroutes traffic or not. Building information may include collecting information about one or more of the traffic system, entities in the traffic system, traffic conditions, weather conditions, characteristics thereof, combinations thereof and the like. In some embodiments, this information may be forwarded to a third party and/or retained in memory.

In the event that the traffic management module 108 determines to reroute traffic, the method 1000 continues by determining the location of the traffic condition 224 (step 1016). The location of the traffic condition may be determined from reported locations and/or speeds of one or more communication devices 124 associated with an entity. In some embodiments, the location of the traffic condition may be reported via one or more traffic monitors 130. The traffic management module 108 may access and/or interpret this information to determine a location of the traffic condition 224.

Next, the method 1000 continues by determining the number of entities adjacent to the location of the traffic condition 224. In some embodiments, the number of entities may be counted along a section 404A-E of the traffic path 204. This number may be provided via reporting from one or more of a communications device 124 associated with an entity, a traffic monitor 130, etc., and combinations thereof.

The method 1000 may proceed by determining at least one alternative route for one or more of the entities (step 1024). As provided herein, the traffic management module 108 may determine various routes for entities based on the position of the entity, the position of the traffic condition, congestion of routes, and/or other information. In some embodiments, the traffic management module 108 may convert a map of the traffic system 100 into a link-node diagram. Using the link-node diagram, the traffic management module 108 may apply one or more transportation theory algorithms to generate at least one alternate route. In one embodiment, the traffic management module 108 may determine to shift traffic from the traffic path 204 to an adjacent path and monitor the adjacent path until it reaches or approaches congestion. In this example, the traffic management module 108 may continue to shift subsequent traffic from path to path. For instance, as an adjacent path approaches congestion, the traffic management module 108 may shift the traffic to another different adjacent path, and so on. In some embodiments, intersecting traffic paths, including paths that intersect with alternate routes, may require an adjustment to traffic flow. In this manner, the traffic management module 108 may be configured to determine optimal operational conditions for an entire system of paths. As can be appreciated, a determination of optimal operational conditions may include altering traffic management devices in the system of paths. For instance, as traffic is routed onto alternate routes, any intersecting routes having left turns onto the alternate routes may be rerouted. In one case, the intersecting routes having left turns may be allowed to have longer left turn traffic signals to allow the multiple flows of traffic to combine. In another case, entities on the intersecting routes having left turns may be rerouted to a route that does not intersect with the alternate route (e.g., minimizing and/or eliminating the combination of traffic along the alternate routes, etc.). In any event, the entire system of adjacent paths may be considered in altering traffic flow. The at least one alternate route may be different for each entity, each group of entities, or each entity in a section or subsection of a traffic path 204.

The traffic management module 108 may then present the at least one alternate route to the one or more entities (step 1028). It is anticipated that the presentation of the alternate route may be provided via a communication device 124 associated with an entity and as described above. Additionally or alternatively, the presentation of the at least one alternate route may be provided by road signs, adaptive traffic signals, variable speed limit signs, website, and/or other informational display.

The method 1000 may continue by monitoring the rerouted routes (step 1032). Monitoring may be performed by the traffic monitors 130, as previously described. Additionally or alternatively, the monitoring may be performed by the communication devices 124 reporting to the traffic management module 108. If congestion on the rerouted routes is detected, the method 1000 may return to step 1024 to determine another alternative route for presentation to one or more entities.

In the event that no congestion is detected on the rerouted routes, the method 1000 may continue by determining whether the traffic condition 224 is still present (step 1040). This determination may be similar, or identical, to that of detecting a traffic condition 224 as described in conjunction with step 1008. If it is determined that the traffic condition is still present the method 1000 returns to step 1032 and continues to monitor the rerouted routes. If it is determined that the traffic condition is no longer present, the method 1000 may end at step 1044.

Figure 11:
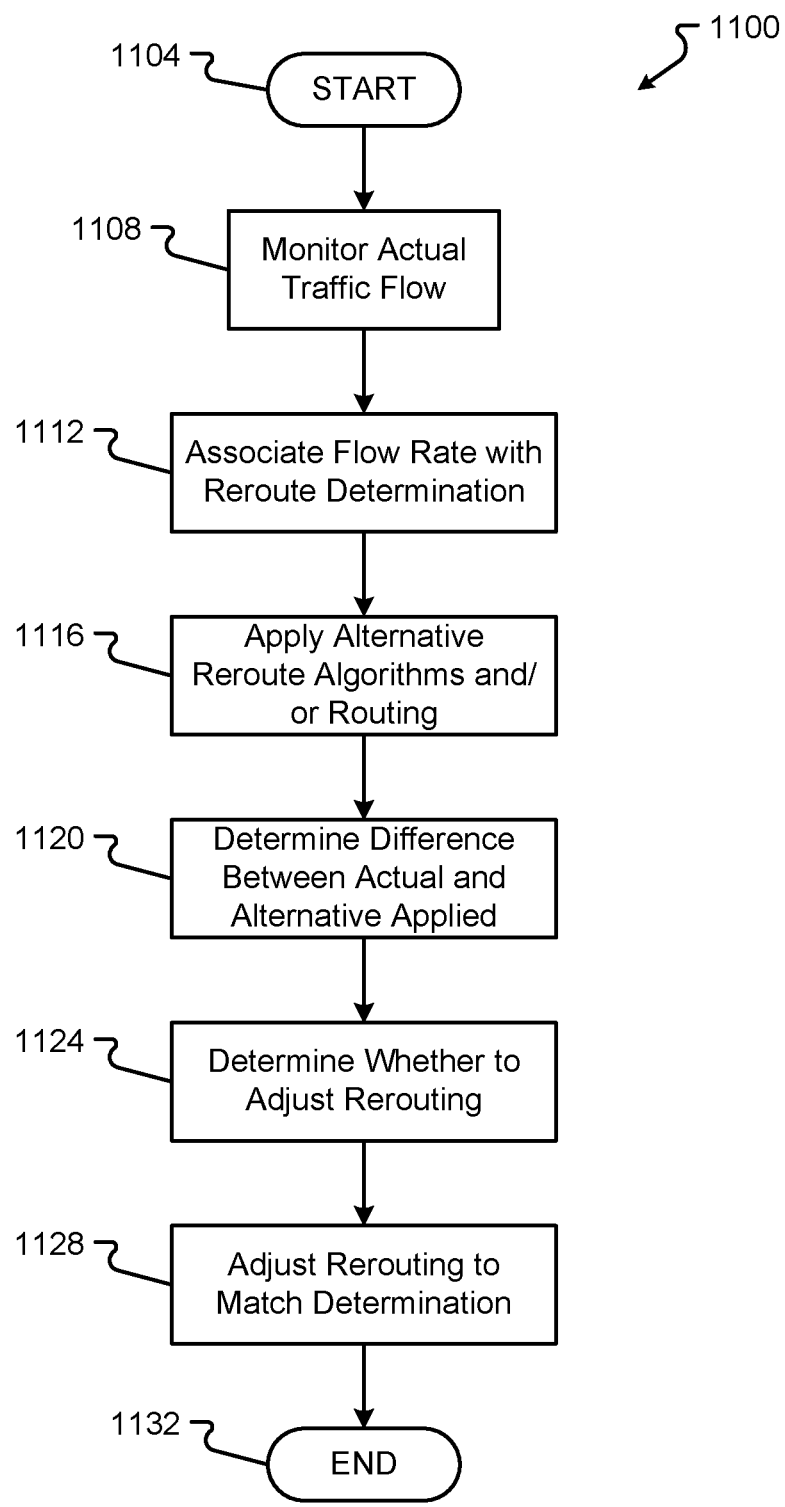
FIG. 11 is a flow chart depicting an operational embodiment of the traffic management system in accordance with one more embodiment of the present disclosure.

Referring now to FIG. 11, a flow chart depicting an operational embodiment 1100 of the traffic management system 100 is shown in accordance with one more embodiment of the present disclosure. While a general order for the steps of the method 1100 is shown in FIG. 11, the method 1100 can include more or fewer steps or can arrange the order of the steps differently than those shown in FIG. 11. Generally, the method 1100 starts with a start operation 1104 and ends with an end operation 1132. The method 1100 can be executed as a set of computer-executable instructions executed by a computer system and encoded or stored on a computer readable medium. Hereinafter, the method 1100 shall be explained with reference to the systems, components, modules, software, data structures, user interfaces, etc. described in conjunction with FIGS. 1-10.

The method 1100 begins at step 1104 and proceeds by monitoring actual traffic flow (step 1108). The actual traffic flow may be monitored along a traffic path 204 and/or at least one alternate route. Monitoring of traffic may include analyzing data provided by one or more traffic monitors 130. For example, speeds of travel may indicate that traffic in an area is slowing and/or stopped. As another example, the counts of vehicles through a particular intersection and/or monitor point may indicate that a traffic condition 224 is present along a traffic path 204 and/or alternate route.

The method 1100 proceeds by associating a flow rate of the traffic with reroute determinations. In other words, where the traffic management module 108 has provided at least one alternate route to an entity, the traffic management module 108 may monitor the traffic flow rate associated with that alternate route. Among other things, this monitoring may determine an effectiveness of the alternate route, validate an algorithm, and/or provide cost/benefit information.

Next, the method 1100 may utilize the actual traffic flow and data collected to apply alternative routing algorithms and/or routing decisions to determine one or more optimal routing algorithms (step 1116). The optimal routing and alternative routes provided by the traffic management module 108 can be based on real-time, and/or near-real-time, traffic data collected. The alternative routing algorithms may be performed in real-time, and/or near-real-time (e.g., as data is collected, etc.). In some embodiments, the application of alternative routing algorithms can be performed offline, after traffic data has been collected, and provide an analysis of the algorithm and/or routing decision made by the traffic management module 108. In some cases, the method 1100 may determine a difference between the actual traffic data collected and a result of the alternative routing algorithms applied (step 1120). For example, it may be determined that an alternative routing algorithm could have reduced traffic congestion on all paths by at least 15%. Additionally or alternatively, it may be determined that the alternative routing algorithm can reduce cost of travel or likelihood of any subsequent traffic conditions by a given percentage. The differences determined may also serve to validate an algorithm or routing decision made (e.g., where alternative algorithms applied to the actual data do not provide any cost, time, or safety benefit, etc.).

In the event that it is determined the alternative routing algorithm offers a benefit over the actual alternative route provided, the method 1100 may continue by determining whether to adjust the rerouting decisions of subsequent alternate route suggestions (step 1128). This determination may include the traffic management module 108 referring to rules 112 that provide whether a benefit of the alternative routing algorithms outweighs any negative effects (e.g., unknown factors, safety, etc.). If the benefits outweigh the negative effects, the method 1100 may adjust the rerouting algorithm accordingly. The method 1100 ends at step 1132.

Figure 12:
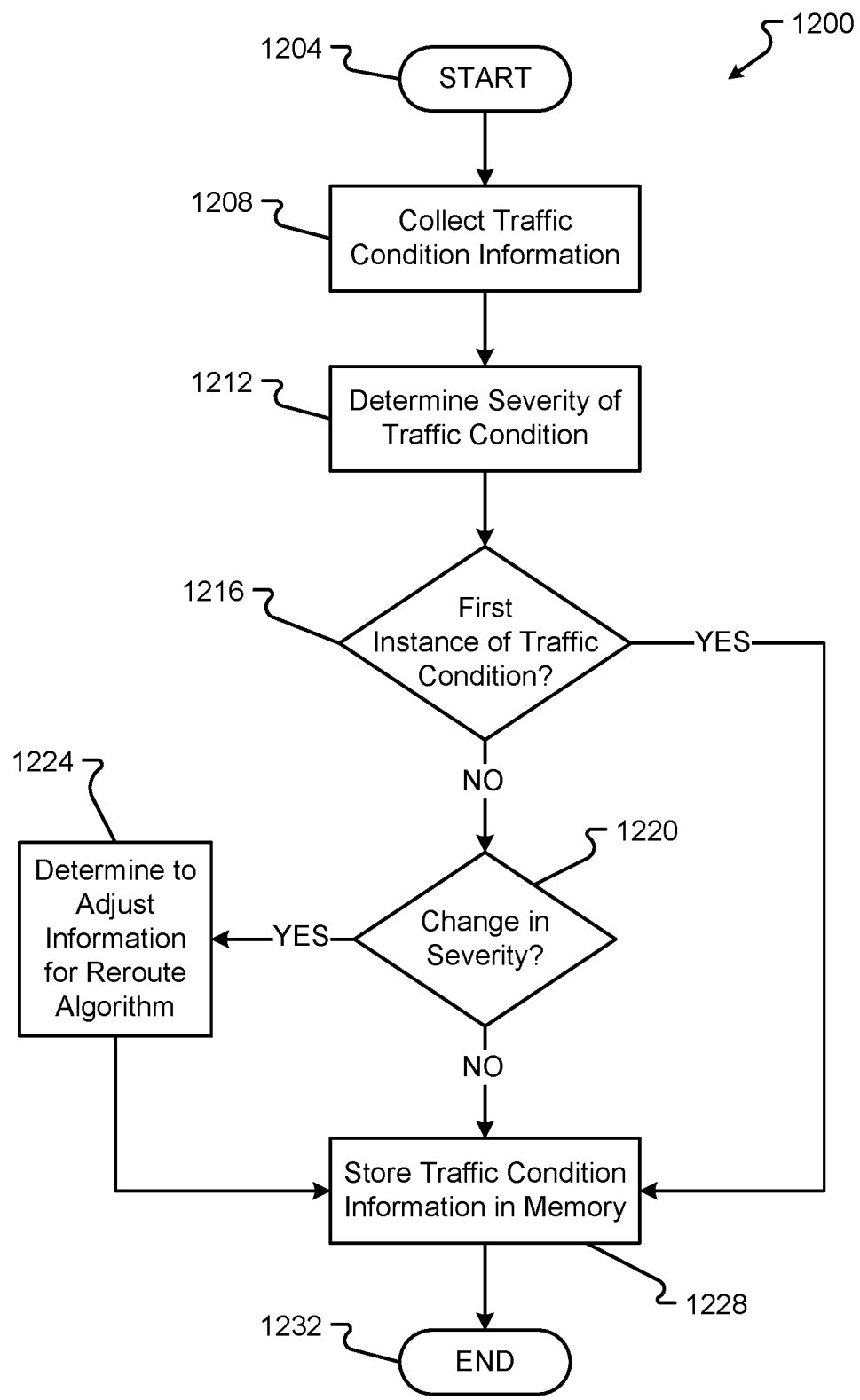
FIG. 12 is a flow chart depicting an operational embodiment of the traffic management system in accordance with one embodiment of the present disclosure.

FIG. 12 is a flow chart depicting an operational embodiment 1200 of the traffic management system 100 in accordance with one embodiment of the present disclosure. While a general order for the steps of the method 1200 is shown in FIG. 12, the method 1200 can include more or fewer steps or can arrange the order of the steps differently than those shown in FIG. 12. Generally, the method 1200 starts with a start operation 1204 and ends with an end operation 1232. The method 1200 can be executed as a set of computer-executable instructions executed by a computer system and encoded or stored on a computer readable medium. Hereinafter, the method 1200 shall be explained with reference to the systems, components, modules, software, data structures, user interfaces, etc. described in conjunction with FIGS. 1-11.

The method 1200 begins at step 1204 and proceeds by collecting traffic condition information (step 1208). Collecting traffic condition information may include collecting information about the traffic system 100. Traffic system information can include, but is in no way limited to, times associated with detected traffic conditions, durations associated with traffic conditions, expiration of traffic conditions, weather conditions, number of vehicles or entities in the traffic system 100 or at least a portion thereof, locations of traffic conditions, locations of vehicles or entities in the traffic system 100 or at least a portion thereof, throughput of entities at one or more locations in a traffic system, times associated therewith, etc., and/or combinations thereof. In some embodiments, this collection may be used by the traffic management module 108 to build information about a traffic system 100. This building of information may be similar, if not identical, to the building information disclosed in conjunction with step 1014 of FIG. 10.

Next, the method 1200 may continue by determining a severity of one or more traffic conditions in the traffic system 100 (step 1212). Severity of a traffic condition may be measured against a predetermined threshold and/or rules stored in memory. For example, the traffic management module 108 may compare the collected traffic condition information against baseline traffic conditions and thresholds stored in memory. As a result of the comparison, the traffic management module 108 may determine a severity value for the traffic condition. In some embodiments, the baseline traffic conditions and thresholds may be periodically updated based on the collected traffic condition information and/or in response to one or more of determining alternative routes, receiving feedback based on provided alternative routes, and the like.

The method 1200 may proceed by determining whether the traffic condition detected is the first instance or a repeat instance of the traffic condition (step 1216). For example, a detected traffic condition may have occurred at a first time having a first severity. As can be appreciated, the traffic condition may change over time, for example, by improving or worsening. This change in the traffic condition may be used by the traffic management module 108 and/or server to further refine predictive algorithms in identifying problematic traffic conditions at the onset of a detected traffic condition. Additionally or alternatively, the change in the traffic condition may be used by the traffic management module 108 and/or server to further refine predictive algorithms in ignoring minor traffic conditions at the onset of a detected traffic condition. It should be appreciated that alternative routing algorithms may be improved in real-time (e.g., while a traffic condition is occurring, etc.), in near-real-time, and/or in non-real-time (e.g., after a traffic condition has occurred, etc.). If it is determined that the traffic condition detected is the first instance of the traffic condition, the method 1200 may proceed to step 1228 and store the traffic condition and/or traffic system information in memory. This memory may be associated with the traffic management module 108 or any other memory associated with the traffic system 100.

In the event that the traffic condition is determined to be a repeat event, the method 1200 may continue by determining whether there is any change in severity for the traffic condition (step 1220). The severity of a traffic condition may indicate that an event is improving, worsening, or remaining the same. For instance, a traffic condition may correspond to a construction project underway on a path, the project interrupting a normal flow of traffic for at least one section along the path. In this case, the severity of the traffic condition may be measured by determining any increase or decrease to traffic density, number of entities involved, or traffic speed, congestion in adjacent areas or sections, etc., from baseline measurements or thresholds. If no change in severity is determined, the method 1200 continues by storing traffic condition information in memory (step 1228). This information may include traffic condition information, traffic system information, entity information, location information, time information, any other information related to the traffic system or condition, and/or combinations thereof. In some embodiments, this information may be forwarded to a third party, governmental entity (e.g., law enforcement agency, federal institution, state organization, etc.), department (e.g., department of transportation, department of regulatory agencies, etc.), or other party. Additionally or alternatively, this information may be used in constructing transportation models, designing roadways, generating transportation reports, transportation and/or city planning, providing efficient and/or optimal routing alternatives for the traffic system 100, determining traffic control schemes, combinations thereof and the like.

In some embodiments, the method 1200 may continue by determining whether to adjust information for the rerouting algorithm (step 1224). In one embodiment, this determination may be made in response to determining that a severity associated with the detected traffic condition has changed. It should be appreciated, however, that determining whether to adjust information for the rerouting algorithm may be made when no change in severity has been determined. In any event, adjusting information for one or more alternative, or reroute, algorithms can include changing one or more constants, variables, functions, or other values, used by the traffic management module 108 in providing or determining to provide alternative routing to one or more entities.

For example, a first traffic condition may provide a first severity value of "low" at a first time based on a low number of entities involved (e.g., when compared to baseline information, etc.), a minor reduction in traffic speeds (e.g., when compared to baseline information, etc.), and/or some other traffic system information, etc. Continuing this example, the first traffic condition may increase in severity (e.g., to medium, or high, etc.) based on a detected increase in the number of entities affected by the traffic condition, a reduction in traffic speeds, etc. Using the collected information regarding the traffic condition and based on the change in severity, the information used in generating alternative routing may be adjusted. Among other things, this adjustment may account for, or accurately predict, future traffic conditions having similar, or identical, traffic condition information to the traffic condition information collected. The traffic condition information is stored in memory at step 1228 and the method 1200 ends at step 1232.

In some embodiments, the methods and systems described herein may reduce the instances of accidents along a path and even mitigate accidents that may occur. For instance, it is an aspect of the present disclosure that the traffic system may be allowed to operate in a partially-adapted state providing safer recovery from the occurrence of one or more incidents along a path. The partially-adapted state of the traffic system may provide routing of certain vehicular traffic away from detected turbulence or incident while routing other vehicular traffic toward the detected turbulence or incident. In some embodiments, the methods and systems may determine to move an incident from a particular area, or point, along a path to a different zone to control the negative effect on traffic flow and/or reduce the likelihood of secondary incidents (e.g., secondary traffic conditions, etc.) from occurring at, or near, the point of the incident.

In some embodiments, the methods and systems described herein may route first responders (e.g., responder vehicles, etc.) toward a detected turbulence/incident along a path (e.g. travel path 204, etc.) while clearing the route to the incident of other traffic. For instance, the traffic management module 108 may determine to route entities, other than first responders, away from the detected turbulence/incident. This routing may include sending traffic control instructions to one or more roadside traffic control devices (e.g., signs, traffic lights, lane barriers, etc.) that cause the roadside traffic control devices to control traffic along the route (e.g., stopping all traffic on the route, stopping intersecting traffic along the route, moving traffic to a holding area, directing traffic away from the route, turning lights green along the route for the first responder, etc.) ahead of the first responder.

In some embodiments, clearing a path may include directing entities and/or vehicles disposed along a path having the turbulence to move to a particular lane/position and/or move from a particular lane/position. This direction may be sent from the traffic management module 108 and/or the dispatch server 160 to communication devices 124 in the traffic management system 100. In one embodiment, the direction may be sent to one or more roadside devices (e.g., information signs, traffic control signs, adaptive speed limit signs, etc.) to inform people along a path to move to, or from, a particular lane or path. It is an aspect of the present disclosure that the directions may include a request for those having one or more communication devices 124 to communicate the message to other vehicles disposed along the path, or in the lane, to move therefrom. For example, a truck driver may possess a communication device 124 be equipped with an application configured to receive notifications from the traffic management module 108 and/or the dispatch server 160 regarding traffic conditions and/or turbulence. In this example, the message sent to the truck driver may be accompanied by a request to repeat the message, or broadcast, along one or more alternative communication channels (e.g., radio, citizens band (CB) radio, text message, etc.) to other vehicles traveling along or adjacent to the path. In some embodiments, this repeated message may be broadcast to vehicles in proximity to the detected turbulence.

As provided above, the routing of vehicles in the traffic system may be based on a priority associated with a particular vehicle. In one embodiment, the priority of a vehicle may be based on whether the vehicle is associated with a first responder and/or other characteristics. A first responder may be any type of response person and vehicle that attends to incidents, accidents, and/or traffic issues. Examples of first responders (e.g., people and vehicles, etc.) may include, but are in no way limited to, law enforcement resources (e.g., city police, sheriff, state police, military, etc.), fire department, emergency management services (EMS), emergency medical technician (EMT), coroner, ambulance, towing, public works, department of transportation, etc., other resources, and/or combinations thereof. In some embodiments, the routing may be provided to those first responders who have registered with a dispatch server 160 and/or other first responder database. In one embodiment, off-duty responder vehicles may be allowed to reach the incident before others if they elect to assist in providing first response services.

In some embodiments, an operating environment may be controlled to be favorable to first responders. For instance, the traffic management system 100 may determine to control traffic control devices 132 (e.g., traffic lights, adaptive traffic signals, variable speed limit signs, etc.) such that the route from a first responder to a detected turbulence and/or incident is free of obstruction. By way of example, the traffic management system 100 may change all of the traffic lights along a route to the detected turbulence and/or incident to green. In one embodiment, the traffic management system 100 may remove the competition for space by routing other vehicles, other than first responders, away from the detected turbulence and/or incident. This routing may include routing hazardous vehicles from the location where the incident was detected. In some embodiments, the routing may direct busses (e.g., school busses, etc.) and/or other mass transit vehicles to move from the path having the turbulence or incident, to minimize risk of harm to vulnerable parties, multiple parties, etc.

In one embodiment, a dispatch server 160 and/or a traffic management system 100 may select the best first responder, or group of first responders, to handle the incident based on one or more of location of the first responder to the incident, expected response time, registration status, vetting (e.g., qualifications/certifications associated with a first response vehicle, etc.), operating boundaries, responder type (e.g., fire, coroner, law enforcement, towing, ambulance, etc.), public or private entity status, on-duty/off-duty status (willing to accept work off-duty), etc., and/or combinations thereof.

In some cases, a first responder group may include a combination of public and private responders (e.g., EMS w/F.D. plus private ambulance, etc.). In one embodiment, a first responder may be registered with a dispatch server 160, etc., but may be unavailable (e.g., out of service, training, service, temporary driver, etc.) to attend to the traffic condition 224. The first responder may be selected based on expected response time (e.g., best time wins the service contract). Additionally or alternatively, responders in a particular area, or boundary, may be restricted from responding to an incident based on an anticipated incident that is closer to one or more other responders (e.g., due to detected turbulence close to the participant, etc.). In some embodiments, the dispatch server 160 and/or traffic management module 108 may select to expand the jurisdiction from which to draw potential responders (e.g., neighboring boundaries to receive invitation to service incident).

It is an aspect of the present disclosure that routing decisions may be made based on risk determination. For example, routing instructions may be provided to first responders to move an incident from a path to a controlled zone (e.g., associated with the path or another path) to prevent secondary incidents. As can be appreciated, this routing may include anticipating an incident, or secondary incident, based on observed turbulence. Once the expected risk of a secondary incident reaches a predetermined likelihood (e.g., threshold value of confidence, etc.) the traffic management module 108 and/or the dispatch server 160 may determine and reserve a controlled zone/staging area to which the incident can be safely relocated.

In some embodiments, the present disclosure describes taking proactive measures to reduce or mitigate turbulence in one or more areas in a traffic management system 100. For instance, using the various sensors and traffic monitors 130 in the traffic management system 100, the traffic management module 108 may continually monitor traffic in the system. If a turbulence is detected, as described herein, by the traffic management module 108, the traffic management module 108 may issue traffic notifications, and/or control traffic devices 132 (e.g., traffic light, adaptive traffic signals, variable speed limit signs, etc.) to provide anticipatory routing to entities and/or a modification of operational settings in the system. In some instances the duration, or timing associated with traffic signals, lights, etc., may be changed to alter a flow rate, or other aspect of traffic flow, etc. Additionally or alternatively, detecting a turbulence in the system 100 may include notifying additional first responders than are currently notified of a particular condition and/or assigning more first responders to a particular location or area in the system, in some cases, before an incident occurs (e.g., based on detecting a predetermined level of turbulence, etc.).

In one embodiment, potential first responders, may be reassigned from routine or non-emergency tasks (e.g., writing speeding tickets, providing roadside assistance, etc.) to attend to, or be available for routing to, the area having turbulence. In some embodiments, the reassignment may require confirmation from the first responder attending to the routine or non-emergency task before the first responder can be reassigned to the turbulence. For example, a first responder may have stopped a speeding vehicle and, upon running the information for the vehicle against a law enforcement database, may find the vehicle has been stolen. In this instance the first responder would not need to accept reassignment due to the serious nature of the stop and may reject the reassignment and/or be excluded from reassignment by the traffic management module 108 and/or the dispatch server 160.

The reservation of a controlled area, or zone, may include routing traffic away from the controlled zone prior to the incident and/or sometime after the incident occurs. The determination may be based on determining a risk to first responders and/or entities involved in the incident to any secondary incidents. In any event, the traffic management system 100 may determine to route traffic away from the path having turbulence/incident (e.g., the traffic condition 224).

In some embodiments, a level of risk (e.g., of incident, further turbulence, etc.) associated with the path having turbulence may be determined based on a statistical likelihood of secondary incidents along the path. This information may take into account historical data, recorded instances of incidents, current traffic conditions, etc.

In some embodiments, it may be less risky to route traffic to an "overcapacity" path, and/or place an alternative path into an "overcapacity" condition than allow traffic to continue to route along other paths. In this instance, the traffic management system 100 may determine a capacity of one or more paths adjacent to the path having the traffic condition 224. Overcapacity paths may be evaluated for an associated risk of incident (e.g., based at least on one or more of the previously described characteristics, etc.) and compare the risk to that of routing traffic along other adjacent paths. Where the risk of routing traffic to an overcapacity path is less than acceptable alternatives, the traffic management system 100 may proceed to direct and/or route traffic to the overcapacity path. In some embodiments, the evaluation of safety/risk of a path may be based on one or more criteria including, but in no way limited to, the speed of the path, a capacity of the path, whether the path is currently under, at, or overcapacity, a historical record of incidents along the path, etc., and/or combinations thereof.

Figure 13A:
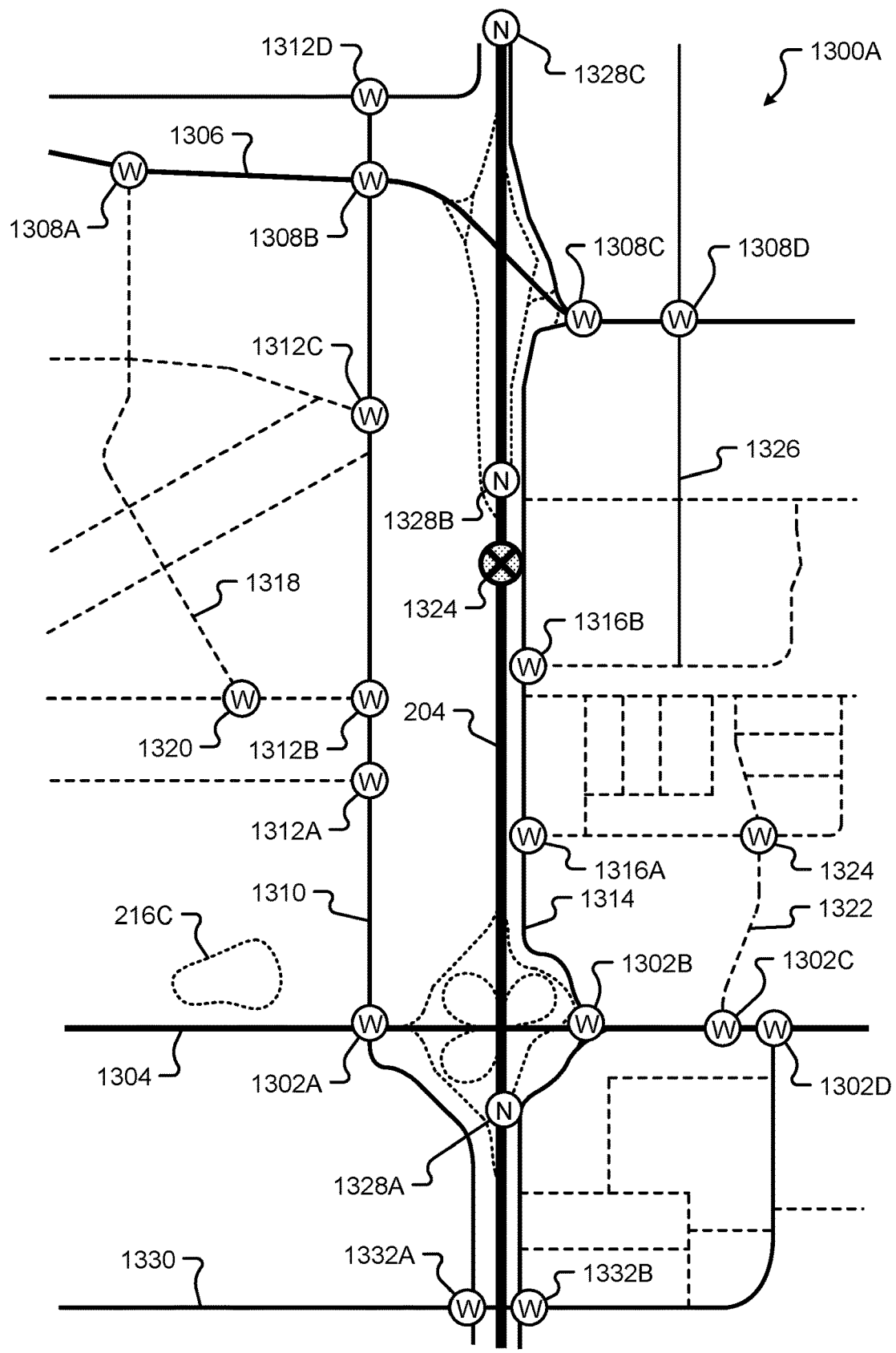
FIG. 13A shows a map of a traffic area having a travel path and alternative routes in accordance with embodiments of the present disclosure.
Figure 13B:
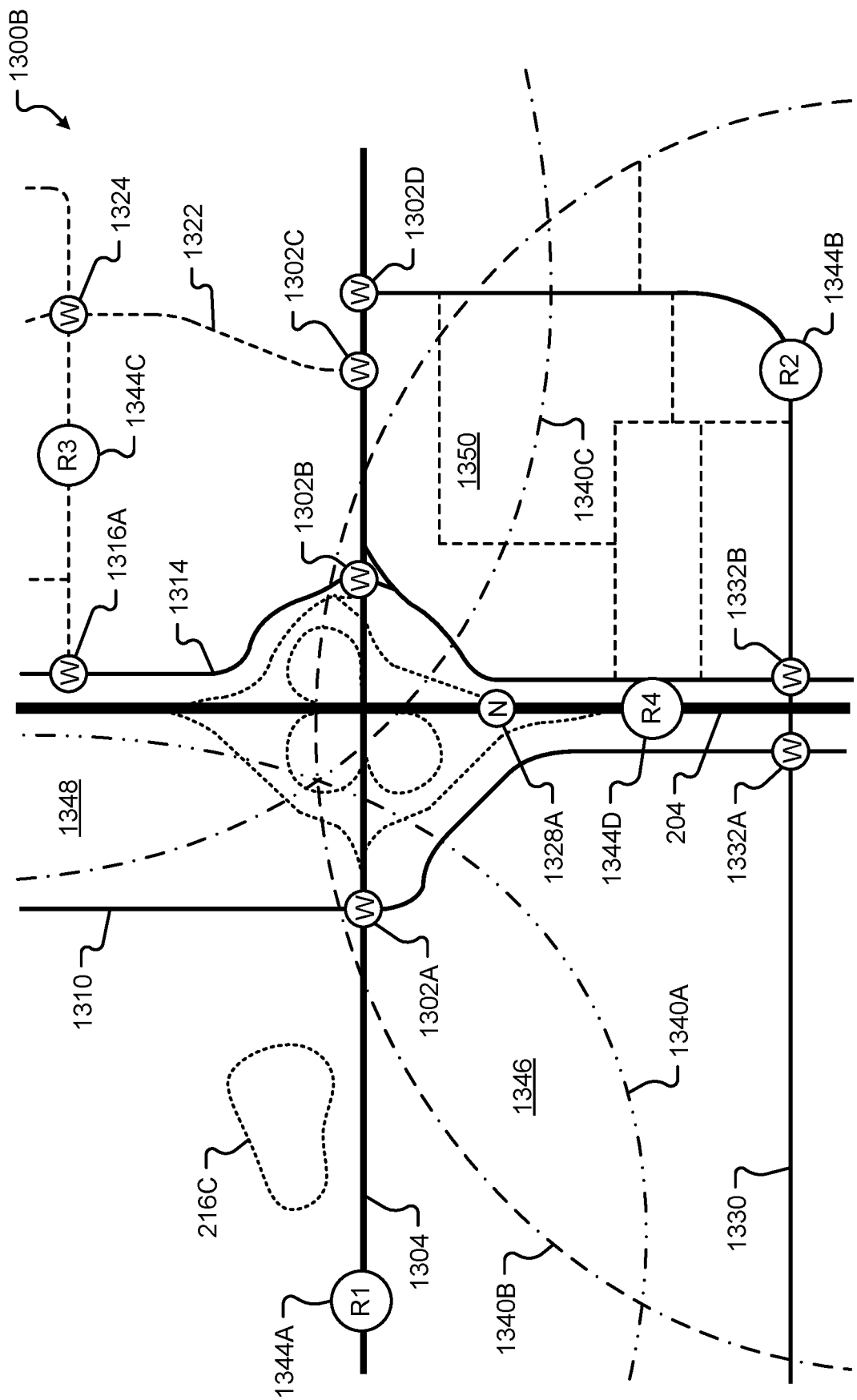
FIG. 13B shows a first detail map area of the traffic area shown in FIG. 13A.
Figure 13C:
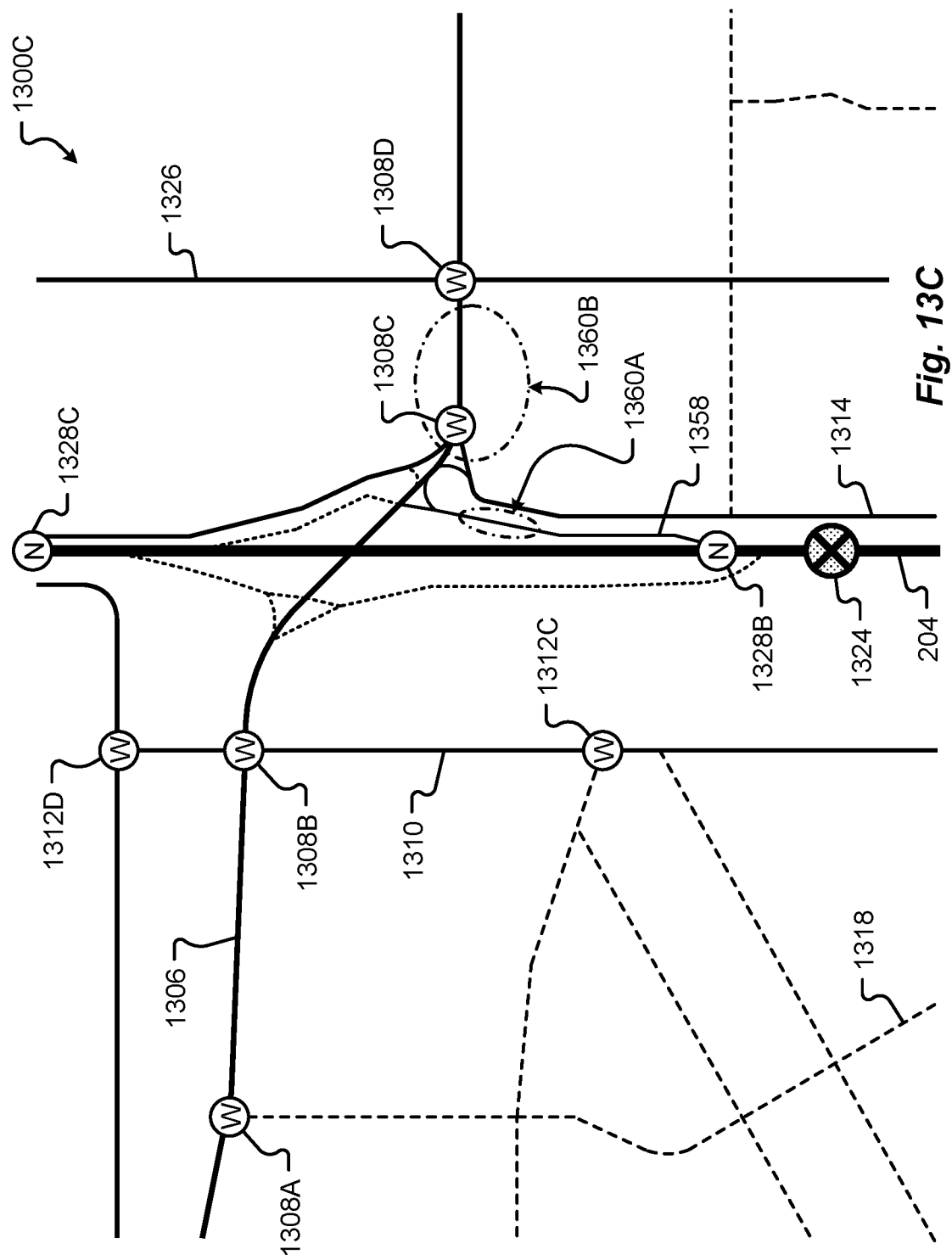
FIG. 13C shows a second detail map area of the traffic area shown in FIG. 13A.

FIGS. 13A-13C show various views and details of a map of a traffic area 1300A in accordance with embodiments of the present disclosure. The traffic area 1300A includes a travel path 204 with a traffic condition 1324 disposed along a length of the travel path 204. In some embodiments, the travel path 204 may be the same path as described in conjunction with FIG. 2, an extension thereof, or a detail thereof. In any event, a traffic condition 1324 (e.g., turbulence, incident, etc.) is shown disposed between first and second traffic nodes 1328A, 1328B. As described herein, the traffic nodes 1328A-C disposed along the travel path 204 may correspond to exit nodes from the travel path 204 (e.g., off-ramps, exits, and/or connections with other paths, etc.). In some embodiments, each of the nodes shown in the traffic area 1300A may be associated with roadside traffic control devices, traffic lights, roadside traffic monitoring devices, etc. The various features associated with the map of the traffic area 1300A, described in conjunction with FIGS. 13A-C, may be similar, if not identical, to the features described in conjunction with FIGS. 2-4, and/or vice versa.

As shown in FIGS. 13A-C, the traffic area 1300A includes a main route, or travel path 204, traversing from the bottom to the top of the page, and vice versa. As can be appreciated, the travel path 204 may comprise different lanes allowing vehicles to travel in opposite directions. In some embodiments, the traffic area 1300A may include a number of intersecting paths 1304, 1306, 1330. For example, and as shown in FIG. 13A, a first path 1304 may intersect with the travel path 204 between travel nodes 1328A, 1328B. The second path 1306 may intersect with the travel path 204 between travel nodes 1328B and 1328C. The intersecting paths 1304, 1306, 1330 may interconnect with the travel path 204 via one or more on-ramps, off-ramps, exits, lanes, etc., and/or combinations thereof.

In addition to these intersecting paths 1304, 1306, 1330, the traffic area 1300A may include a number of alternate paths 1310, 1314, 1318, 1322, 1326 that may run in a similar direction to the travel path 204 and/or serve as connecting routes between one or more of the alternate paths 1310, 1314, 1318, 1322, 1326, the travel path 204, and/or any other path or combination of paths shown in the traffic area 1300A. In any event, the routing provided by the traffic management module 108 and/or the dispatch server 160, etc., may be made using one or more of the paths, nodes, connection points, etc., as described herein.

As shown in FIG. 13A, a traffic condition 1324 is shown on the map of the traffic area 1300A detected between travel nodes 1328A and 1328B. The traffic condition 1324 may be a detected turbulence in the flow of traffic (e.g., as described in conjunction with FIG. 7, etc.) or some other incident (e.g., an accident, stoppage of traffic, etc.) associated with the flow of traffic along the travel path 204. The traffic condition 1324 along the travel path 204 may be observed via one or more of the traffic monitors 130 described in conjunction with FIG. 1. For instance, one or more traffic monitors 130 may be disposed along the travel path 204 and configured to detect a speed of traffic, a flow of traffic, and/or some other characteristic of the traffic along the travel path 204.

Referring now to FIG. 13B, a first detail area 1300B of the traffic area 1300A is shown in accordance with embodiments of the present disclosure. In some embodiments, the first detail area 1300B may correspond to the lower portion of the map of the traffic area 1300A shown in FIG. 13A. As shown in FIG. 13B, one or more registered responders, R1-R4, 1344A-D, may be operating (e.g., working, driving, stationed, etc.) in different regions of the traffic area 1300A. For example, a first registered responder 1344A, is shown on first path 1304 in a first operating boundary 1340A. A second registered responder 1344B is shown on a lowermost path 1330 in a second operating boundary 1340B. A third registered responder 1344C is shown on a side road in the traffic area 1300A between path nodes 1316A and 1324 in a third operating boundary 1340C.

In some embodiments, one or more registered responders 1344A-D may be restricted to operating, responding to calls, and/or servicing a specific designated operating boundary 1340A-C. For instance, the registered responders 1344A-D may be restricted from being dispatched, called, and/or allowed to operate outside of their designated operating boundary 1340A-C. In one embodiment, this restriction may be based on governmental jurisdiction boundaries, service agreements, defined service areas, etc., and/or other agreements. As can be appreciated, these agreements may be automatically expanded and/or altered during times of emergency, demand, and/or in response to some other condition.

Depending on the traffic system and the level of control over various resources in the traffic system, the one or more registered responders 1344A-D may be "self-dispatched" by a dispatch center that is separate from the dispatch server 160. This dispatch center may be associated with a region, responder type, and/or entity that controls dispatching of first responders to events, calls, destinations, etc., and/or combinations thereof. It is an aspect of the present disclosure that the dispatch server 160 described herein may notify the one or more registered responders 1344A-D and/or the dispatch center (e.g., via sending one or more messages, etc.) by providing dispatch instructions including, but in no way limited to, a number of predetermined responders for a particular scenario or condition, a type of responder(s) predetermined for a particular scenario or condition, and/or other information associated with the dispatch instructions. In some cases, the predetermined number of responders and/or type of responders may be based on one or more detected conditions, patterns, learned behaviors, or other traffic scenarios associated with a particular criteria or set of criteria (e.g., one or more traffic conditions, speeds, traffic flow rate, traffic queues, capacity, weather, time of day, season, visual confirmation, etc.).

As some dispatch centers may dispatch first responders independent of the instructions provided by the dispatch server 160, the dispatch server 160 may inform (e.g., via a message and/or notification sent across a communications network 104, etc.) the dispatch center that a number of registered responders 1344A-D have been requested for an incident, are in-route to the incident, and/or have arrived at and are handling the incident. Among other things, this approach may allow the dispatch center, and/or the dispatch server 160, to recall dispatched first responders, reallocate resources (e.g., such as the first responders, etc.), reserve a number of first responders for other potential and/or secondary incidents, and/or otherwise more effectively manage the dispatch of first responders in the traffic system 100.

In some embodiments, a registered responder 1344A-D may be unrestricted to a particular operating boundary 1340A-C. As shown in FIG. 13B, a fourth registered responder 1344D is shown traveling along travel path 204 in a direction toward path node 1328A. This fourth registered responder 1344D may be the equivalent of a "free agent" responder who is capable of operating in any one or more of the operating boundaries 1340A-C. Typical free agent responders may include, but are in no way limited to, secret service vehicles, law enforcement vehicles, federal vehicles, ambulances, fire vehicles, tow trucks, insurance vehicles, public works vehicles, department of transportation vehicles, etc., and the like.

The operating boundaries 1340A-C are shown as an area inside the concave side of the distinct arcuate dash-dot lines shown in FIG. 13B. As illustrated, the first operating boundary 1340A may prohibit the first registered responder 1344A from operating outside of the concave region of the dash-dot line associated with the first operating boundary 1340A. For instance, the first registered responder 1344A would not typically be allowed to respond to an incident that occurs in an area between node paths 1316A and 1324, 1302C and 1302D, and so on. In some embodiments, the operating boundaries 1340A-C may overlap at one or more regions in the traffic area 1300A. A first overlap is shown at first intersecting area 1346. This first intersecting area 1346 corresponds to an overlapping operating region for the first operating boundary 1340A and the second operating boundary 1340B. A second intersecting area 1348 is shown between the first operating boundary 1340A and the third operating boundary 1340C. A third intersecting area 1350 is shown between the second operating boundary 1340B and the third operating boundary 1340C. In these intersecting areas 1346, 1348, 1350, two or more of the registered responders 1344A-D may be allowed to operate.

FIG. 13C shows a second detail map area 1300C of the traffic area 1300A shown in FIG. 13A in accordance with embodiments of the present disclosure. In particular, the second traffic area detail 1300C shows a traffic condition 1324 disposed along a travel path 204 adjacent to a path node 1328B. Path node 1328B may be associated with an exit from the travel path 204. In one embodiment, the traffic condition 1324 may occur along the travel path 204 in a lane having a traffic flow direction moving from path node 1328B toward path node 1328C.

As described above, the traffic management module 108 and/or the dispatch server 160 may determine to move a traffic condition 1324, or an accident, from the travel path 204 to a controlled area 1360A-B. This determination may be based at least partially on a determined risk of secondary incident on the travel path 204 (e.g., at or near the location of the accident, etc.). A secondary incident may correspond to a risk of harm to one or more of the registered responders 1344A-D attending to the traffic condition 1324, a risk of harm to one or more entities involved in the traffic condition 1324, a risk of harm to one or more entities traveling along the travel path 204, and/or a risk of harm to some other person or vehicle as a result of the traffic condition 1324.

In some embodiments, the risk of a secondary incident occurring may depend on one or more of current traffic conditions (e.g., via information provided by one or more traffic monitors 130, etc.), historical occurrences of secondary incidents along the travel path 204, a severity of the traffic condition 1324, a location of the traffic condition 1324, a number of lanes available to route traffic at the location, visibility of the traffic condition 1324 from various lanes adjacent to the traffic condition 1324, etc. For instance, a traffic condition 1324 along a travel path 204 having a high speed limit (e.g., 55 miles per hour or above, etc.) may provide a greater risk than a path having a low speed limit (e.g., less than 55 miles per hour, etc.). Further, an icy road may provide a greater risk of secondary incident than a dry road. An accident that blocks two of three available lanes (e.g., greater than 50% of the capacity blocked, etc.) may provide a greater risk than an accident blocking only one of three available lanes (e.g., less than 50% of the capacity of the path being blocked, etc.). As another example, an accident that occurs on a path disposed in view from at least one other lane of the travel path 204 may provide a greater risk of secondary incident than an accident that occurs out of sight from at least one other lane of the travel path 204. As yet another example, an accident that occurs on a travel path 204 with a high rate of past incidents (e.g., recorded and stored in a traffic data memory 148, monitor data memory 152, and/or some other memory of the traffic management system 100) may provide a greater risk than a path having a low rate, or no, past incidents. In some embodiments, the severity of the accident may determine the number of required registered responders 1344A-D to attend to the traffic condition 1324. In this example, a more severe traffic condition 1324 (e.g., an accident including one or more fatalities, trapped people, fires, hazardous material leaks, overturned vehicles, etc.) will require a greater number of registered responders 1344A-D than a less severe traffic condition 1324 (e.g., a simple collision, no injured parties, a vehicle breakdown, a disabled vehicle, etc.).

In any event, when the risk, or likelihood, of a potential secondary incident is determined to be high (e.g., based on one or more of the factors considered above), the traffic management system 100 may determine to alter routing along the travel path 204 accordingly. In one embodiment, the traffic management system 100 may restrict a number of vehicles traveling along the travel path 204. In some embodiments, the traffic management system 100 may determine to move the incident from the travel path 204 to an alternative location having a lower risk, or likelihood, of secondary incidents. This alternative location may correspond to a controlled area 1360A-B in the traffic system. As can be appreciated, a risk of secondary incident may be determined for one or more controlled areas 1360A-B based on similar, if not identical, factors as those associated with the determination of risk for the secondary incident along the travel path 204. Additionally or alternatively, the traffic management system 100 may determine a risk of harm to those involved in the traffic condition 1324 in moving an incident from a travel path 204 to a controlled area 1360A-

B. Some incidents (e.g., sever incidents/accidents) cannot be moved from the travel path 204. For example, attempting to move an accident involving one or more possible fatalities, severe injuries, trapped people, fires, hazardous material leaks, etc., could further harm those parties who are injured and/or contaminate a larger area of the traffic system. In these cases, the traffic in the system would be routed, via the traffic management module 108, around the traffic condition 1324. This rerouting of traffic may prevent and/or mitigate the likelihood of a secondary incident.

When the various components of the traffic management system 100 determine that the risk of moving an incident (e.g., the risk of harm to those involved in the incident, etc.) from a travel path 204 to a controlled area 1360A-B is less than the risk of a secondary incident, the traffic management system 100 may provide routing instructions to the one or more registered responders 1344A-D attending to the traffic condition 1324 to move the incident to a particular controlled area 1360A-B. In some embodiments, prior to providing the instructions to move the incident, the components of the traffic management system 100 may determine a best controlled area 1360A-B (e.g., based on lowest risk of secondary incident, location to the incident, and/or other factors as described herein, etc.) to reserve for moving the incident. The reservation may include routing traffic away from the reserved controlled areas 1360A-B, until the traffic condition 1324 is over. Among other things, this reservation clears the controlled areas 1360A-B ahead of time from unnecessary traffic and provides an unobstructed path for moving the incident. If the incident is not moved, the reservation may be released and the controlled areas 1360A-B may again be included in routing decisions.

As shown in FIG. 13C, a first controlled area 1360A is shown along an exit path 1358, or off-ramp, of the travel path 204. A second controlled area 1360B is shown adjacent to path nodes 1308A and 1308D along the second path 1306. In the event that the incident is moved from the location of the traffic condition 1324 on the travel path 204 to the first controlled area 1360A, traffic may be allowed to route along the travel path 204, but may be restricted (e.g., not allowed) from exiting the travel path 204 via exit path 1358. In this example, the traffic would be routed around the exit associated with path node 1328B. In some embodiments, the traffic management module 108 and/or the dispatch server 160 may determine that the exit path 1358 must remain open to traffic (e.g., based on other system routing, efficiency, total traffic flow, access to the incident, etc.) and that the incident would be better moved to the second controlled area 1360B. In this case, the traffic flowing along travel path 204 would be allowed to exit the off-ramp exit path 1358. However, traffic flowing along the second path 1306 in at least one direction may be restricted from entering the second controlled area 1360B. In some cases, the traffic may be allowed to enter the controlled areas 1360A-B where a total risk of secondary incidents for the traffic system is determined to less by including the controlled areas 1360A-B in traffic routing decisions than excluding the controlled areas 1360A-B from the traffic routing decisions.

FIG. 14 is a diagram of a data structure 1400 associated with registered responders 1344A-D in a traffic management system in accordance with embodiments of the present disclosure. The data structure 1400 may include a responder identification (ID) field 1404, a registration status field 1408, a responder type field 1412, a public/private field 1416, a qualifications/certifications field 1420, an operating boundary field 1424, an operating status field 1428, and more 1432.

The responder ID field 1404 may comprise data that identifies one registered responder 1344A-D from another registered responder 1344A-D in the system. In some embodiments, the responder ID field 1404 may be a unique identification associated with a particular registered responder 1344A-D. In one embodiment, the data may include a Media Access Control (MAC) address of a communication device 124 associated with the registered responder 1344A-D. In some embodiments, the data may include license plate information for a vehicle associated with the registered responder 1344A-D traveling in the traffic area 1300A. Among other things, the responder ID field 1404 may comprise data that can be used to identify a registered responder 1344A-D traveling along any traffic path in the traffic management system 100 and/or traffic area 1300A. The responder ID field 1404 may include similar, if not identical, data as described in conjunction with the entity ID field 804 of the data structure 800 of FIG. 8.

The registration status field 1408 may include information describing whether the registered responder 1344A-D is registered with a particular dispatch server 160 in the traffic management system 100. In some embodiments, the registration status field 1408 may be used to identify whether a registered responder 1344A-D is available for dispatch to a particular traffic condition 224, 1324 in a traffic area 200, 1300A.

The responder type field 1412 may include information identifying a particular type of service and/or classification of the registered responder 1344A-D. Examples of types of responders stored in the responder type field 1412 may include, but are in no way limited to, law enforcement departments or agencies, emergency medical technician (EMT), ambulance, fire department, coroner, towing, hazardous material (HazMat), secret service, accident investigator, military police, FBI, and the like. The responder type field 1412 may identify a governmental agency, vehicle type, person, affiliation, and/or capability. As can be appreciated, the dispatch server 160 may rely, at least partially, on the information stored in the responder type field 1412 in making one or more dispatch decisions.

The public/private field 1416 may include data identifying the registered responder 1344A-D as a public entity or a private entity. In some embodiments, public entities may be required to respond to dispatch instructions issued by a dispatch server 160, while private entities may not. In some cases, the dispatch server 160, using the information stored in the public/private field 1416 may recruit combinations of public and private entities (e.g., registered responders 1344A-D, etc.) to respond to a traffic condition 224, 1324.

The qualifications/certifications field 1420 may include information pertaining to skills and/or abilities of the registered responder 1344A-D. In some embodiments, the qualifications/certifications field 1420 may pertain to the skills and/or abilities of one or more person, vehicle, and/or combination thereof associated with a particular registered responder 1344A-D. Examples of these skills/abilities may include, but are in no way limited to, special weapons and tactics (SWAT) training, accident response training and/or experience, cardiopulmonary resuscitation (CPR) training and/or experience, automated external defibrillator (AED) on board, military training and/or experience, HazMat response training and/or equipment, chemical burn treatment training and/or equipment, hostage negotiation training, terrorism response training, temporary traffic control (e.g., cones, signs, tilt-up arrow boards, and/or the like), etc., and/or combinations thereof. The dispatch server 160 may refer to the information stored in the qualifications/certifications field 1420 when dispatching an appropriate registered responder 1344A-D or team of registered responders 1344A-D to attend to a traffic condition 224, 1324 in the traffic area 200, 1300A.

The operating boundary field 1424 may include information defining a particular operating boundary, or boundaries, for each registered responder 1344A-D. In some cases, the boundaries may be defined by GPS coordinates, map quadrants, cross-streets, addresses, other geographical region identification, etc., and/or combinations thereof. Examples of operating boundaries 1340A-C are described in conjunction with FIG. 13B above. In some embodiments, the operating boundary field 1424 may include information identifying a particular registered responder 1344A-D as not confined to a specific operating boundary. As described in conjunction with FIG. 13B, these unrestricted responders (e.g., fourth registered responder 1344D, etc.) may be referred to as "free agent" responders. In one embodiment, the operating boundary for a "free agent" responder may be based on a current location of the responder (e.g., GPS location, etc.) and a possible working range for the responder from the current location. In some embodiments, the range may be based on a distance from the responder to a location of the traffic condition 224, 1324. The current location of the free agent responder, and/or any other registered responders 1344A-D, may be provided by a GPS device, or equivalent location information system, associated with one or more communication devices 124 of the responders 1344A-D. Additionally or alternatively, the current location of the free agent responder, and/or any other registered responders 1344A-D, may be provided by one or more of the traffic monitors 130.

The operating status field 1428 may include information describing a working status of one or more registered responders 1344A-D. The operating or working status may indicate whether a particular responder 1344A-D is on-duty or off-duty. An on-duty registered responder 1344A-D may be willing to accept dispatch instructions from a dispatch server 160 and/or attend to one or more traffic condition 224, 1324 as they occur. An on-duty operating status may indicate that a registered responder 1344A-D is on-duty at a time an inquiry is made of available registered responders 1344A-D in a traffic area 200, 1300A. In some embodiments, the inquiry may be sent from the dispatch server 160 (e.g., via the communications module 172, etc.) across a communication network 104 to one or more communication devices 124 associated with the registered responders 1344A-D. An off-duty operating status may indicate that a registered responder 1344A-D is off-duty, or not working, at a time the inquiry is made of available registered responders 1344A-D in a traffic area 200, 1300A. In one embodiment, the operating status field 1428 may include information identifying whether an off-duty registered responder 1344A-D is willing to accept dispatch instructions or not. For instance, some EMT responders may wish to assist with an accident any time they are needed. In this case, even when the EMT may be off-duty at the time of an inquiry, they may still elect to receive dispatch instructions.

FIG. 15 shows a diagram of a data structure 1500 for storing information about registered responders 1344A-D in accordance with embodiments of the present disclosure. The information may be stored in a memory 168 of the dispatch server 160. As described above, the dispatch server 160 may inquire as to a status of registered responders 1344A-D in a traffic area 200, 1300A at a first point in time. The inquiry may be sent from the traffic management module 108 and/or the dispatch server 160 in the form of a request message sent across the communication network 104 to a communication device 124 associated with one or more of the registered responders 1344A-D. In one embodiment, the inquiry may be made only to those registered responders 1344A-D that have previously registered with the dispatch server 160. As shown in FIG. 15, the information from data structure 1400 may be included in the data structure 1500.

For instance, "Responder 1" is shown as a "law enforcement" responder type (e.g., obtained from the responder type field 1412), a "public" entity (e.g., obtained from the public/private field 1416), having SWAT and accident response training and/or experience (e.g., obtained from the qualifications/certifications field 1420), operating in map quadrants C1-3, and D1-2 of the traffic area 1300A (e.g., taken from the operating boundary field 1424), currently "on-duty" (e.g., obtained from the operating status field 1428 of data structure 1400). As another example, "Responder 4" is shown as an "ambulance" responder type (e.g., obtained from the responder type field 1412), a "private" entity (e.g., obtained from the public/private field 1416), having EMT and chemical burn treatment training and/or equipment (e.g., obtained from the qualifications/certifications field 1420), operating as a "free agent" based on a GPS location and a defined range of operation (e.g., taken from the operating boundary field 1424), currently "off-duty" (e.g., obtained from the operating status field 1428 of data structure 1400) and not accepting dispatch instructions signified by the "(N)" suffix. In contrast, "Responder 2" in the data structure 1500 is also shown as "off-duty" but willing to accept dispatch instructions, signified by the "(A)" suffix in the operating status column. As described above, the dispatch server 160 may review the information in the data structure 1500 to determine the best registered responders 1344A-D to dispatch to a traffic condition 1324 along a travel path 204.

Figure 16:
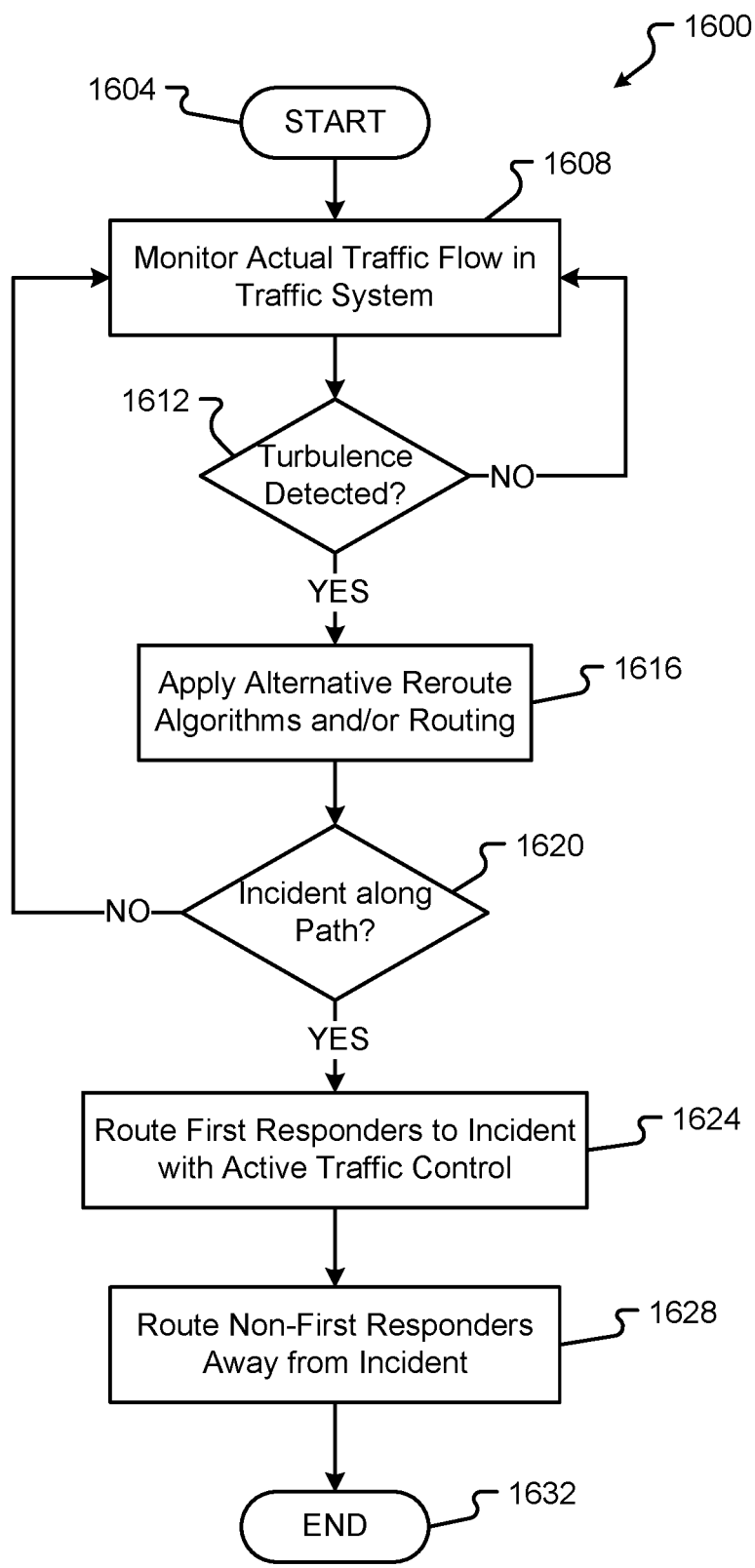
FIG. 16 a flow diagram of a method of routing traffic in accordance with embodiments of the present disclosure.

Referring to FIG. 16, a flow diagram of a method 1600 of routing traffic in a traffic area 1300A is shown in accordance with embodiments of the present disclosure. While a general order for the steps of the method 1600 is shown in FIG. 16, the method 1600 can include more or fewer steps or can arrange the order of the steps differently than those shown in FIG. 16. Generally, the method 1600 starts with a start operation 1604 and ends with an end operation 1632. The method 1600 can be executed as a set of computer-executable instructions executed by a computer system (e.g., the traffic management module 108, the dispatch server 160, and/or other component of the traffic management system 100) and encoded or stored on a computer readable medium (e.g., the memory 120, memory 168, and/or other memory in the traffic management system 100). Hereinafter, the method 1600 shall be explained with reference to the systems, components, modules, maps, software, data structures, user interfaces, etc. described in conjunction with FIGS. 1-15.

The method 1600 may begin at step 1604 and proceed by monitoring traffic flow in the traffic system, or the traffic area 1300A (step 1608). The traffic flow may be monitored along a traffic path 204 and/or along at least one alternate route. Monitoring of traffic may include analyzing data provided by one or more traffic monitors 130. For example, speeds of travel may indicate that traffic in an area is slowing and/or stopped in one or more locations. As another example, the count of vehicles through a particular intersection and/or monitor point may indicate that a traffic condition 1324 is present along a traffic path 204 and/or an alternate route.

Next, the method 1600 may proceed by determining whether turbulence in traffic is detected along the travel path 204 (step 1612). As provided above, turbulence may correspond to an interruption in monitored traffic information associated with the travel path 204. Turbulence is described in greater detail in conjunction with FIG. 7. In some embodiments, the turbulence may include a complete stoppage of traffic flow along a portion of the travel path 204. The turbulence may be observed via one or more traffic monitors 130 working in conjunction with the traffic management module 108 and/or other components in the traffic management system 100. If no turbulence is detected, the method 1600 may return to step 1608 and continue to monitor traffic flow in the system.

As described herein, detecting turbulence in traffic may be based on a number of factors and/or data received from a traffic management system 100. In some embodiments, measures may be taken to proactively reduce and/or mitigate turbulence. It is an aspect of the present disclosure, that the traffic management module 108 may receive real-time traffic data from a number of traffic control devices 132 distributed in the traffic management system 100. Moreover, this traffic data may be stored in a monitor data memory 152 of the traffic management system 100. In some embodiments, the traffic data may be used to establish baselines, determine normal operating behavior, and/or deviations in operating conditions in the traffic management system 100. Machine learning may be employed by the various processors, servers, and modules disclosed herein, to recognize potential incidents before they occur (e.g., based on recognized or learned behaviors associated with turbulence, traffic flow, etc.) and, in some cases, take action to prevent or mitigate a severity of the incident.

Recognizing a potential incident based on historical and real-time information may include, determining links between turbulent traffic flow events (e.g., systematic slowing, braking, swerving, erratic vehicle behavior, etc.) and resultant accidents that may have occurred after an observation of the recorded turbulent traffic flow event. Using this data, a machine learning algorithm may be trained to identify when an incident has occurred, or is about to occur. In some embodiments, the identification of an incident, or a potential incident, may be made without requiring a verification of the incident (e.g., via a camera, on-site confirmation, etc.). For instance, aspects of the present disclosure may include monitoring traffic information (e.g., via one or more traffic monitors 130, etc.), detecting a turbulence in the system, and based on the data monitored, determining that an incident has occurred, or will occur. Continuing this example, some areas may not be equipped with cameras, recording equipment, or resources capable of providing verification of an incident. Embodiments of the present disclosure describe a traffic management system 100 that collects information associated with a detected turbulence (e.g., from one or more traffic monitors 130), determines that the detected turbulence has reached a predetermined threshold requiring intervention (e.g., control, etc.), and instructs devices (e.g., traffic control devices 132, etc.) to mitigate an effect of the turbulence on the traffic management system 100 without requiring confirmation of the turbulence or a resulting incident from one or more cameras 140 in the traffic management system 100. Mitigating observed turbulence may include, but is in no way limited to, providing information of the turbulence on roadside signs (e.g., along a path, or path leading to the path, of the turbulence, etc.) providing anticipatory routing to entities along the path having the turbulence, modifying operational settings in the system (e.g., altering a timing and/or duration associated with one or more traffic signals, changing a posted speed limit in real-time or near-real-team, etc.), notifying first responders (e.g., one or more sets, expanded sets, etc.) of the observed turbulence and/or a potential incident along a path, and/or dispatching one or more registered responders 1344A-D to attend to the area having the turbulence (e.g., to engage in traffic control, act as a deterrent to potential speeding or follow-on accidents, be prepared to handle a potential incident, etc.).

In the event that turbulence is detected in step 1612, the method 1600 may continue by applying one or more alternative rerouting algorithms and/or providing routing instructions to one or more communication devices 124 in the traffic management system 100 (step 1616). In particular, the traffic management system 100 may determine to route (e.g., via sending routing instructions to communication devices 124 in the system 100, sending control commands to traffic control devices 132 in the system, etc., and/or combinations thereof) vehicles traveling in the system 100 taking into account the detected turbulence. This routing may be similar, if not identical, to the routing described in conjunction with step 1116 of FIG. 11.

In some embodiments, the traffic management module 108 and/or other component in the traffic management system 100 may determine that the turbulence detected along a travel path 204 qualifies as an incident, or accident (step 1620). For instance, the traffic monitors 130 may determine a complete stoppage in the traffic flow associated with at least one lane in the travel path 204. Additionally or alternatively, one or more components in the traffic management system 100 may receive information indicating that an emergency call has been associated with the location having the detected turbulence. In some cases, this information may include a call to emergency services, which may then be directed to at least one dispatch server 160 in the traffic management system 100. In some embodiments, the traffic monitors 130 may observe an accident, breakdown, or other incident occur (e.g., via cameras 140, speed detectors 136, and/or other traffic monitors 130, etc.) and send information of the incident to the traffic management module 108 and/or the dispatch server 160. If no incident is detected, the method 1600 may return to step 1608 and continue to monitor the flow of traffic along the travel path 204 and in the system 100.

Upon detecting an incident, the method 1600 may proceed by routing one or more registered responders 1344A-D to the location of the incident and/or turbulence (step 1624). The routing may be based on a number of factors, as discussed above. The routing may be made by the traffic management module 108 working in conjunction with the dispatch server 160 of the traffic management system 100. In some embodiments, the routing may include an active traffic control component. For example, the traffic management system 100 may determine a response route from one or more of the registered responders 1344A-D to the location of the incident and selectively control the traffic control devices 132 along the response route. Continuing this example, the traffic management system 100 may turn all of the traffic lights along the response route to green, in advance, for the registered responders 1344A-D to reach the site, or location of the incident quickly. In some cases, this control of the traffic control devices 132 may be made before the registered responders 1344A-D reach an intersection. For instance, the traffic control instructions may be sent at substantially the same time the response route is determined for the registered responders 1344A-D.

While the traffic management system 100 may route registered responders 1344A-D toward the incident, providing a fastest path to the incident, the system 100 may route others (e.g., non-first responders, etc.) away from the incident and/or out of the way of approaching registered responders 1344A-D (step 1628). In some cases, this routing may include routing one or more non-responder vehicles away from their intended destination, to a safe zone, a holding area (e.g., where the non-responder must remain until the registered responders 1344A-D have passed, etc.), and/or in a direction opposite their estimated and/or intended destination. The destination of a non-responder vehicle may be determined as described at least in conjunction with FIGS. 1-9 above. This routing of non-responders may clear the way for one or more registered responders 1344A-D to reach the incident without significant obstruction.

In some embodiments, the non-responders may be directed to move from a path upon detection of turbulence (e.g., indicating a potential incident may occur) in a traffic area 1300A and/or when an incident has been determined to have occurred in the traffic area 1300A. In any event, entities and/or vehicles disposed along a path having the turbulence and/or incident may be instructed or directed to move out of a particular lane/position along the path. As provided above, this direction may be sent from the traffic management module 108 and/or the dispatch server 160 to one or more communication devices 124 in the traffic management system 100. Additionally or alternatively, the direction may be sent to one or more roadside devices (e.g., information signs, traffic control signs, adaptive speed limit signs, etc.) along or adjacent to the path to inform people to move from a particular lane or take another path. In some embodiments, the direction may be sent as a broadcast signal (e.g., radio signal, emergency response message, law enforcement alert, etc.) to a region or zone in the traffic area 1300A informing entities that a particular road or lane along a path will be used by emergency responders and should be made clear (e.g., by moving out of the road or lane, etc.). In one embodiment, vehicles in a response route may be directed to move to a shoulder, off-road, holding location, and/or other area to provide a clear navigable path for emergency response vehicles and/or other registered responders 1344A-D.

In one embodiment directing traffic to provide a clear navigable path for emergency response vehicles and/or other registered responders 1344A-D may include, but is in no way limited to, sending instructions to traffic control devices 132 to alter a timing, duration, sequence, and/or other elements of control of traffic patterns for the traffic control devices 132 in advance of the arrival of the emergency response vehicles and/or registered responders 1344A-D. These instructions may be sent from the dispatch server 160 and/or the traffic management module 108 across the communication network 104 to the traffic control devices 132. Rather than a vehicle sending a signal to a traffic control device 132 in proximity to the vehicle, the present disclosure describes sending instructions from a remote server to the traffic control device 132. Among other things, this approach can allow the instructions to be sent to the traffic control device 132 proactively and before the emergency response vehicles and/or other registered responders 1344A-D arrive in proximity to the traffic control device 132. In one embodiment, the instructions may be sent before a particular emergency response vehicle and/or other registered responder 1344A-D is even dispatched or notified of a detected turbulence.

By way of example, a turbulence may be detected along a path indicating a particular incident may have occurred at a point along the path. In response, the traffic management module 108 and/or the dispatch server 160 may determine to create a clear (i.e., substantially unobstructed) path for one or more registered responders 1344A-D to use in traveling to the area having the detected turbulence. In this example, the traffic management module 108 and/or the dispatch server 160 may determine that a left lane of a one-way road may provide the clearest path for the one or more registered responders 1344A-D to use for traveling to the point of incident. In response, the traffic management module 108 and/or dispatch server 160 may control one or more traffic lights (e.g., traffic control devices 132, etc.) along the path to increase a "green" left-turn light duration (e.g., increasing a green light timing from 10 to 30 seconds, or more, etc.) to, among other things, process more traffic out of the left-lane along the path. By clearing traffic out of a path or lane, the traffic management module 108 and/or the dispatch server 160 may provide a substantially unobstructed path for registered responders 1344A-D to use. Additionally or alternatively, the traffic management module 108 and/or the dispatch server 160 may alter other lane signal timing durations, or directions associated with the same or different traffic control devices 132 along the path. As can be appreciated, this approach may be used alone or in combination with any other notification, routing, control of traffic control devices 132, and/or dispatch as described herein.

In some embodiments, a non-responder may be routed based on information associated with that non-responder. For instance, a non-responder in an emergency (e.g., driving to the hospital, suffering a heart attack, etc.), may be allowed to maintain a course to an intended destination that may include traveling along the same path as the response route, for at least some time. The method 1600 ends at step 1632.

Figure 17:
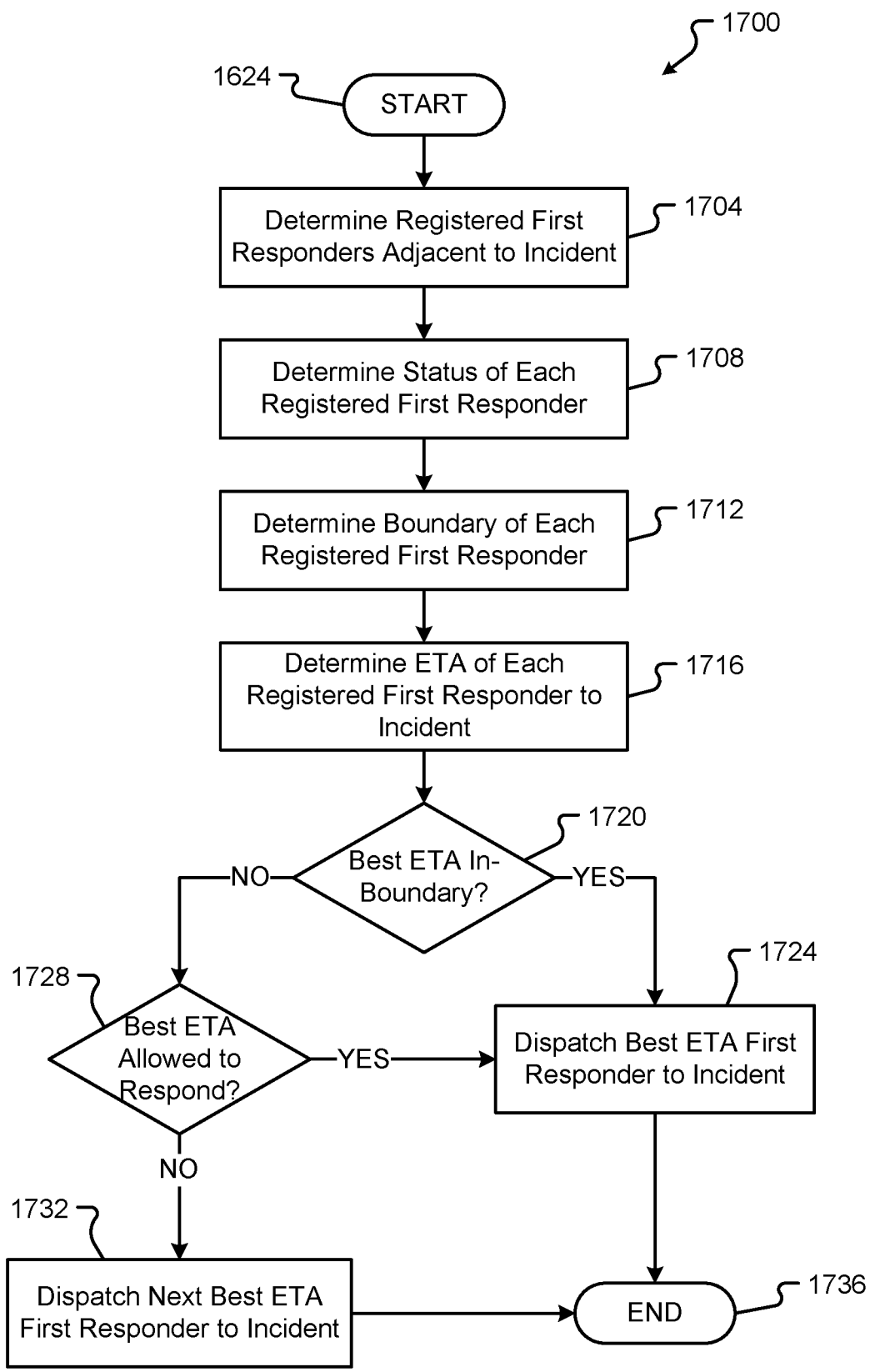
FIG. 17 a flow diagram of a method of dispatching responders in accordance with embodiments of the present disclosure.

FIG. 17 a flow diagram of a method 1700 of dispatching one or more registered responders registered responders 1344A-D in accordance with embodiments of the present disclosure. While a general order for the steps of the method 1700 is shown in FIG. 17, the method 1700 can include more or fewer steps or can arrange the order of the steps differently than those shown in FIG. 17. Generally, the method 1700 starts with a start operation (e.g., step 1624) and ends with an end operation 1736. The method 1700 can be executed as a set of computer-executable instructions executed by a computer system (e.g., the traffic management module 108, the dispatch server 160, and/or other component of the traffic management system 100) and encoded or stored on a computer readable medium (e.g., the memory 120, memory 168, and/or other memory in the traffic management system 100). Hereinafter, the method 1700 shall be explained with reference to the systems, components, modules, maps, software, data structures, user interfaces, etc. described in conjunction with FIGS. 1-16.

In some embodiments, the method 1700 may start at step 1624 (e.g., by routing one or more registered responders 1344A-D to the location of the incident and/or turbulence, etc.) and/or describe the method of routing the registered responders 1344A-D toward the incident detected at step 1620 above. Next, the method 1700 may determine the registered responders 1344A-D that are located close to the detected incident (step 1704). In some embodiments, the dispatch server 160 may send a request for position of each registered responder 1344A-D in the traffic area 1300A having the detected incident (e.g., the traffic condition 1324, etc.). In response to receiving the request from the dispatch server 160, each registered responder 1344A-D in the traffic area 1300A may send a GPS location, or other location information for the registered responders 1344A-D, to the dispatch server 160. In some cases, this information may be requested by the dispatch server 160 sending an inquiry to the traffic monitors 130, and the traffic monitors 130 may provide the location information for each registered responder 1344A-D detected in the traffic area 1300A.

The method 1700 may refer to at least one data structure 1400, 1500 to determine a status of each of the registered responders 1344A-D determined from step 1704 (step 1708). The status may correspond to the information stored in the operating status field 1428 of data structure 1400 and/or the operating status column of data structure 1500. As described above, the status may identify which of the registered responders 1344A-D will be routed to the incident and/or are capable of receiving dispatch instructions from the dispatch server 160.

Next, the method 1700 may proceed by determining an operating boundary for each of the available and routable (e.g., based on the information in the operating status field 1428, etc.) registered responders 1344A-D determined from steps 1704 and 1708 (step 1712). The operating boundary may be stored in the operating boundary field 1424 of data structure 1400 and/or in the operating boundary column of data structure 1500. In some embodiments, the operating boundary may define the limits of where each of the registered responders 1344A-D may operate and/or where each of the registered responders 1344A-D may and/or may not be dispatched to.

Based on the location of each available and routable (e.g., based on the information in the operating status field 1428, etc.) registered responders 1344A-D determined above and the location of the detected incident, the method 1700 may proceed by determining an estimated time of arrival (ETA), or response time, for each of the registered responders 1344A-D (step 1716). This determination of ETA may be made with or without the use of active traffic control.

The method 1700 may continue by determining whether the incident is within the operating boundary (e.g., in-bounds) of the one or more of the registered responders 1344A-D having the best ETA, or response time. If the incident is determined to be within the operating boundary determined in step 1712 for the registered responder(s) 1344A-D having the best ETA, the method 1700 may proceed to dispatch the "best" registered responder(s) 1344A-D to respond to the incident. Dispatching registered responders 1344A-D may include sending routing instructions (e.g., via the traffic management module 108, the dispatch server 160, and/or other components in the traffic management system 100) to a selected registered responder 1344A-D, altering traffic signals, information signs, and/or other traffic guides for the registered responder 1344A-D along the response route to the incident.

In some embodiments, the incident may be located outside of the operating boundary (e.g., out-of-bounds) of the registered responder 1344A-D having the best ETA determined above. In one embodiment, the method 1700 may determine whether the best registered responder(s) 1344A-D is allowed to attend to the incident (step 1728). This determination may include determining one or more of the severity of the incident, contractual obligations, demand for registered responders 1344A-D in one or more of the boundaries, number of available registered responders 1344A-D, and/or the like. In some cases, a fast response time may be more important than predetermined operating boundaries. For example, in severe accidents, the time of a response may be critical to saving lives. In this case, the out-of-bounds registered responder 1344A-D having the best ETA may be allowed to attend, and be dispatched, to the incident (e.g., step 1724). However, for minor incidents (e.g., vehicle breakdown, small accident with no injuries, etc.), the method 1700 may determine that the registered responder 1344A-D having the best ETA is not allowed to respond (e.g., attend, and/or be dispatched, to the incident).

In the event that the registered responder 1344A-D having the best ETA is not allowed to respond, the method 1700 may proceed by determining the registered responder 1344A-D having the "next best" ETA. In one embodiment, the method 1700 may repeat at step 1720 determining whether the "next best" ETA registered responder 1344A-D is in-bounds. Once the determination is complete, the registered responder(s) 1344A-D having the next best ETA may be dispatched to the incident (step 1732). The method 1700 ends at step 1736.

Figure 18:
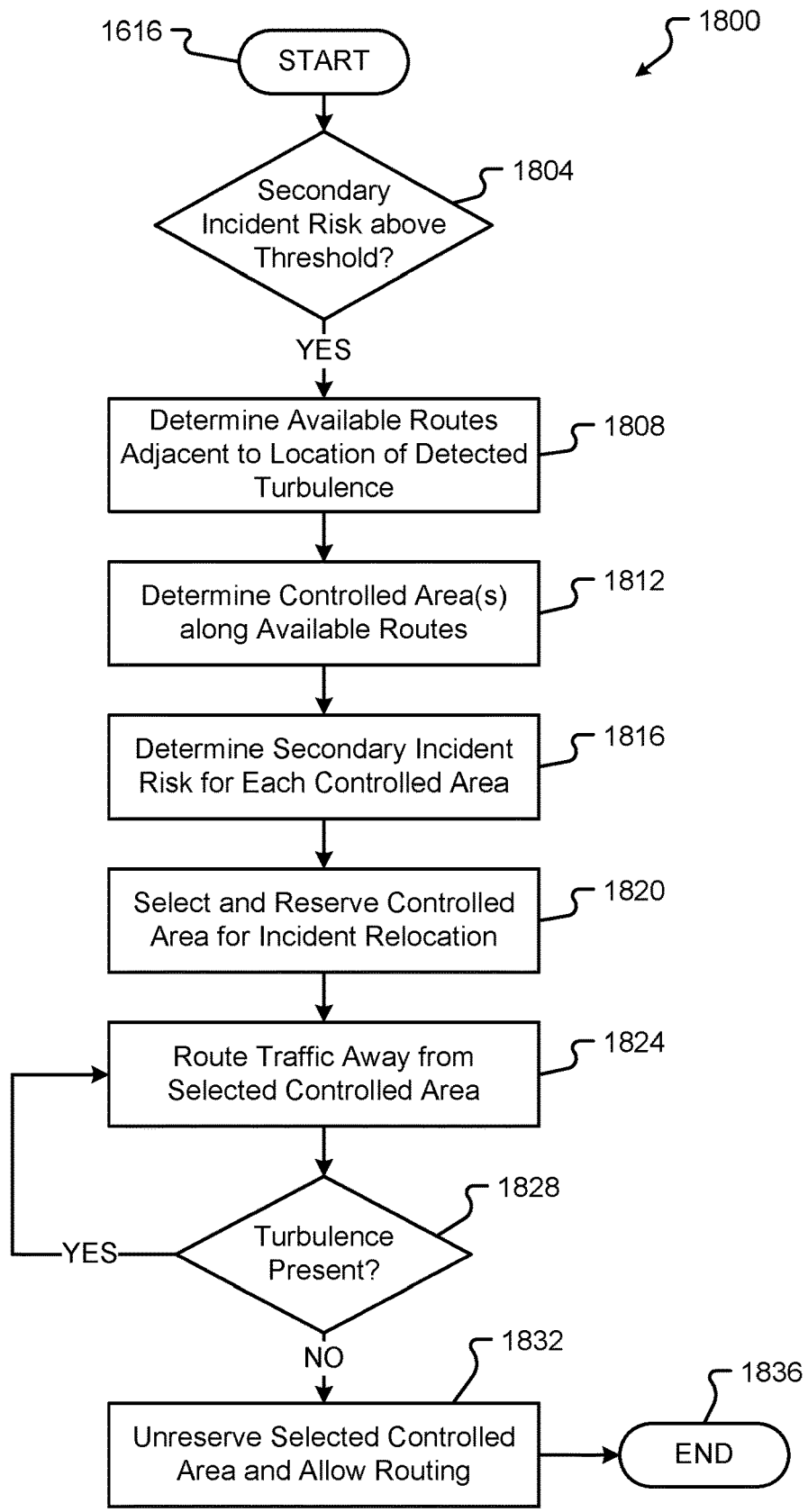
FIG. 18 a flow diagram of a method of routing traffic around reserved controlled areas in accordance with embodiments of the present disclosure.

FIG. 18 a flow diagram of a method 1800 of routing traffic around reserved controlled areas 1360A-B in accordance with embodiments of the present disclosure. While a general order for the steps of the method 1800 is shown in FIG. 18, the method 1800 can include more or fewer steps or can arrange the order of the steps differently than those shown in FIG. 18. Generally, the method 1800 starts with a start operation (e.g., step 1616) and ends with an end operation 1836. The method 1800 can be executed as a set of computer-executable instructions executed by a computer system (e.g., the traffic management module 108, the dispatch server 160, and/or other component of the traffic management system 100) and encoded or stored on a computer readable medium (e.g., the memory 120, memory 168, and/or other memory in the traffic management system 100). Hereinafter, the method 1800 shall be explained with reference to the systems, components, modules, maps, software, data structures, user interfaces, etc. described in conjunction with FIGS. 1-17.

In some embodiments, the method 1800 may start at step 1616 (e.g., by applying one or more alternative rerouting algorithms and/or providing routing instructions to one or more communication devices 124 in the traffic management system 100, etc.) and/or describe the method of routing entities around one or more reserved controlled areas 1360A-B. The method 1800 may determine whether a turbulence detected (e.g., in step 1612, etc.) and/or incident poses a risk of secondary incident above a predetermined threshold (e.g., at or near the location of the turbulence and/or incident, etc.) (step 1804). The risk of secondary incident may be determined based on a statistical likelihood of secondary incidents along a path having the turbulence. This information may take into account historical data, recorded instances of incidents, current traffic conditions, etc., as described herein. The predetermined threshold may be exceeded when it is more likely than not that a responder attending to the traffic incident/condition would be harmed by a subsequent incident or accident.

The method 1800 may proceed by determining available routes adjacent to the location of the detected turbulence (step 1808). The available routes may be used to route traffic around the location of the detected turbulence and/or provide a path to a controlled area 1360A-B. Next, the method 1800 may determine one or more controlled areas 1360A-B along the determined available routes (step 1812). The controlled areas 1360A-B may be determined based on location, safety, distance, current traffic flow, expected traffic flow, ease of rerouting traffic, isolation, etc., and/or combinations thereof.

In some embodiments, the method 1800 may determine the risk of secondary incident for each of the controlled areas 1360A-B (step 1816). This determination may be similar, if not identical, to the determination of risk made in step 1804.

The method 1800 may select and reserve one or more controlled area 1360A-B for relocation of an incident, where the secondary incident risk for the controlled area 1360A-B is lower than the risk for the travel path 204 having the detected turbulence (step 1820). This reservation may be made before an incident occurs based on an observed characteristic associated with the detected turbulence. Reserving a controlled area 1360A-B may prevent the one or more controlled areas 1360A-B from being included in routing by the traffic management module 108. For example, the controlled areas 1360A-B may not be allowed to receive traffic, or only receive minimal traffic, while reserved.

In some embodiments, reserving a controlled area(s) 1360A-B may include determining if the turbulence and/or incident compromises any other route in the traffic system 100. For instance, the traffic management module 108 and/or the dispatch server 160 may determine if reserving the controlled area(s) 1360A-B could negatively affect a path for other first responders that may be dispatched to alternative incidents in the traffic system 100 or area 1300A. This determination may be based on a likelihood of secondary incident occurring around, or away, from the turbulence and/or incident. In one embodiment, the determination may be based on historical data (e.g., past accidents that occurred at particular times and/or locations in the traffic system 100 or area 1300A, etc.), a number and rank of alternative routes that exist, or are available, to efficiently and/or reliably reach nodes or waypoints in the traffic area 1300A (e.g., when the controlled area 1360A-B is removed from consideration in routing, etc.), and/or the like.

Most, if not all, traffic will be routed away from a selected and reserved controlled area 1360A-B (step 1824). In some embodiments, this step may include the traffic management module 108 and/or the dispatch server 160 determining to allow only emergency traffic through the selected and reserved controlled area 1360A-B. Continuing the example above, where the reservation of a controlled area 1360A-B could negatively affect effective dispatch and/or routing of other registered responders 1344A-D in the traffic area 1300A, the method 1800 may only allow these other registered responders 1344A-D to route through the selected and reserved controlled area 1360A-B. Among other things, this approach allows the traffic system 100 to operate effectively, while simultaneously mitigating risk of secondary incident or injury to responders 1344A-D attending to an incident in a reserved controlled area 1360A-B (e.g., by limiting traffic to dispatched experienced registered responders 1344A-D passing through the area 1360A-B, and restricting access to non-first responders, etc.).

As long as turbulence is still detected or present along the travel path 204, the method 1800 may continue to route traffic away from the reserved controlled area 1360A-B (step 1828). However, if the turbulence is not still present along the travel path 204, the method 1800 may proceed to unreserve the selected controlled area 1360A-B and allow routing per unrestricted routing behavior (step 1832). The method 1800 ends at step 1836.

Figure 19:
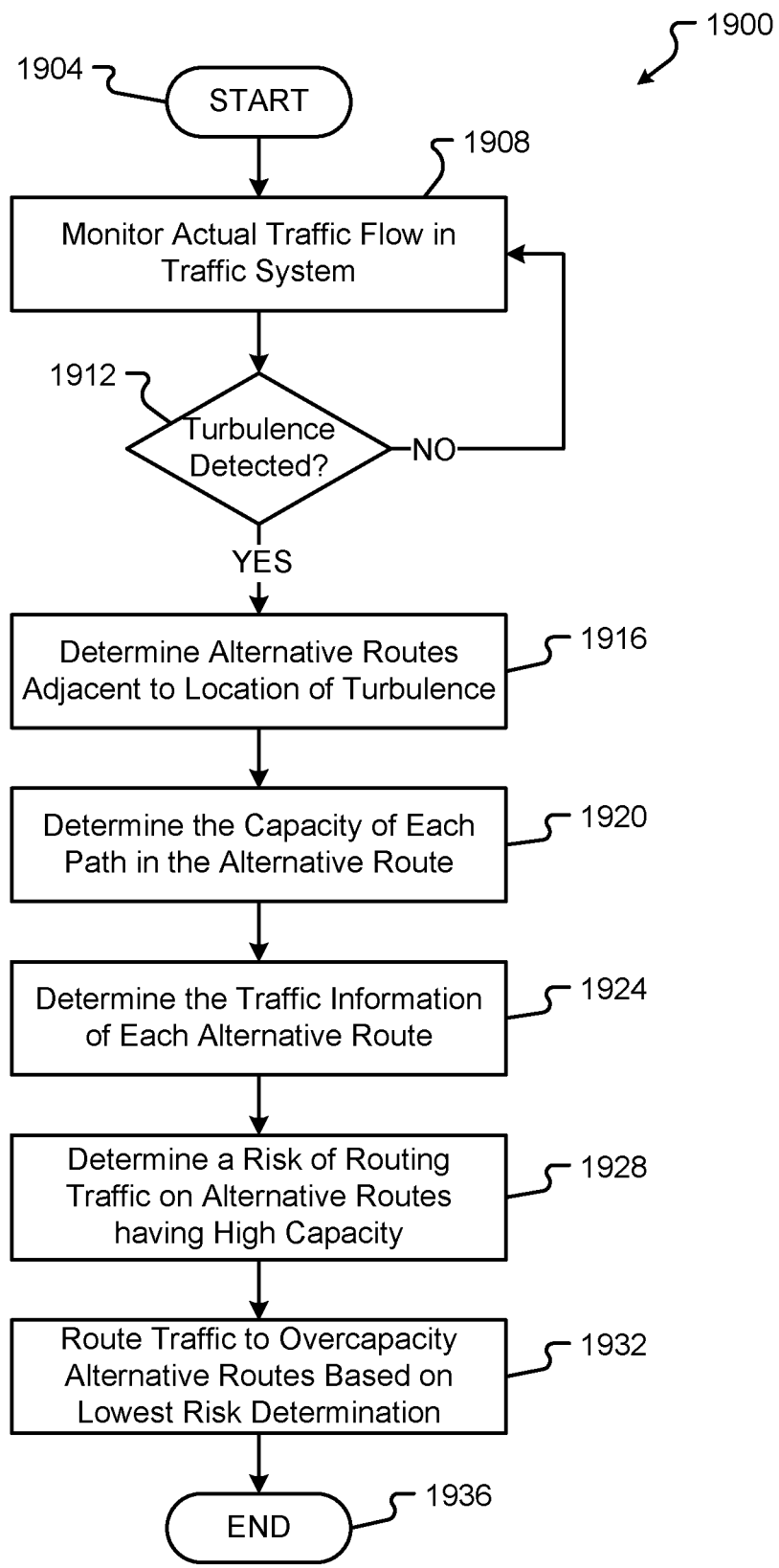
FIG. 19 a flow diagram of a method of routing traffic to safe overcapacity routes in accordance with embodiments of the present disclosure.

FIG. 19 a flow diagram of a method 1900 of routing traffic to safe overcapacity routes in accordance with embodiments of the present disclosure. While a general order for the steps of the method 1900 is shown in FIG. 19, the method 1900 can include more or fewer steps or can arrange the order of the steps differently than those shown in FIG. 19. Generally, the method 1900 starts with a start operation 1904 and ends with an end operation 1936. The method 1900 can be executed as a set of computer-executable instructions executed by a computer system (e.g., the traffic management module 108, the dispatch server 160, and/or other component of the traffic management system 100) and encoded or stored on a computer readable medium (e.g., the memory 120, memory 168, and/or other memory in the traffic management system 100). Hereinafter, the method 1900 shall be explained with reference to the systems, components, modules, maps, software, data structures, user interfaces, etc. described in conjunction with FIGS. 1-18.

The method 1900 may begin at step 1904 and proceed by monitoring traffic flow in the traffic system, or the traffic area 1300A (step 1908). The traffic flow may be monitored along a traffic path 204 and/or along at least one alternate route. Monitoring of traffic may include analyzing data provided by one or more traffic monitors 130. For example, speeds of travel may indicate that traffic in an area is slowing and/or stopped in one or more locations. As another example, the count of vehicles through a particular intersection and/or monitor point may indicate that a traffic condition 1324 is present along a traffic path 204 and/or an alternate route.

Next, the method 1900 may proceed by determining whether turbulence in traffic is detected along the travel path 204 (step 1912). As provided above, turbulence may correspond to an interruption in monitored traffic information associated with the travel path 204. Turbulence is described in greater detail in conjunction with FIG. 7. In some embodiments, the turbulence may include a complete stoppage of traffic flow along a portion of the travel path 204. The turbulence may be observed via one or more traffic monitors 130 working in conjunction with the traffic management module 108 and/or other components in the traffic management system 100. If no turbulence is detected, the method 1900 may return to step 1908 and continue to monitor traffic flow in the system 100.

The method 1900 may continue by determining a number of alternate routes adjacent to the location of the detected turbulence (step 1916). These alternate routes may be selected by the traffic management module 108 in routing one or more entities around the location of the detected turbulence. In some embodiments, the alternate routes may include one or more paths making up the route. Next, the method 1900 proceeds by determining a capacity of each path in the alternate routes. The capacity of a path may correspond to an amount of traffic that a particular path can accommodate. In some cases, the capacity may be based on optimal traffic flow, adjusted traffic flow, busy traffic flow, and/or at least a non-zero traffic flow (e.g., keeping traffic flowing although under optimal conditions, etc.). A path may operate at designed standards when at capacity. On the other hand, a path may operate (e.g., allowing a flow of traffic) at substandard performance at an over-capacity state.

The method 1900 may proceed to determine traffic information associated with each alternate route (step 1924). The traffic information may include preset information associated with paths along the alternate route (e.g., number of lanes, speed limits, traffic lights, intersections, etc.) and/or current information associated with paths along the alternate route (e.g., current speed of traffic, road conditions, number of entities traveling along the paths, etc.). As can be appreciated, this traffic information may be received (e.g., via the traffic management module 108, etc.) from traffic monitors 130 and/or stored data (e.g., in memory traffic data memory 148, monitor data memory 152, etc.).

Based on the traffic information associated with the alternate routes determined in step 1916, the method 1900 may determine a risk of routing traffic to alternate routes placing the paths in those routes in an over-capacity state (step 1928). In some cases, it may be safer to route more traffic along paths at-capacity or over-capacity than routing traffic to certain paths that are under-capacity. For instance, traffic routed to an over-capacity path having a top speed of 30 miles per hour is less likely to produce secondary incidents than routing traffic to an at-capacity, or under-capacity, path having a top speed of 70 miles per hour. In one embodiment, the risk of secondary incident may include determining a potential severity of the secondary incident that may occur along a path. For example, high speed paths (e.g., having listed speed limits greater than 55 miles per hour, etc.) may have a greater chance (e.g., based on historical data, etc.) of a fatal accident occurring than low speed paths (e.g., having listed speed limits of less than 55 miles per hour, etc.).

In any event, once the lowest risk path is determined (e.g., the path least likely to cause a secondary incident, etc.) the traffic management module 108 may route traffic based on the risk determination (step 1932). In some embodiments, this may include routing traffic to over-capacity paths, or placing paths in an over-capacity state by routing to the path, where the traffic management module 108 determines the risk of secondary incidents occurring along the over-capacity path is less than other routing decisions. The method 1900 ends at step 1936.

The exemplary systems and methods of this disclosure have been described in relation to traffic management systems and methods. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method of efficiently routing emergency response vehicles to a location of detected turbulence along a pathway in a traffic system, comprising: receiving, via a processor, information from a roadside traffic monitoring device disposed along a pathway in a traffic system, wherein the roadside traffic monitoring device collects traffic flow information for a location along the pathway; determining, via the processor, that the information received from the roadside traffic monitoring device indicates a decrease in traffic flow adjacent to the location, wherein the decrease in traffic flow corresponds to turbulence along the pathway at the location; determining, via the processor, a first responder vehicle in the traffic system available to dispatch to the location; determining, via the processor, a response route from the first responder vehicle to the location; sending, via the processor, dispatch routing instructions across a communication network to a communication device associated with the first responder vehicle, wherein the dispatch routing instructions include directions and the response route to the location from the first responder vehicle; and sending, via the processor, traffic control instructions to roadside traffic control devices disposed along the response route in the traffic system, wherein the traffic control instructions cause the roadside traffic control devices to render indications configured to facilitate movement of vehicles disposed along the response route in a direction away from the first responder vehicle.

Aspects of the above method include wherein determining the first responder vehicle in the traffic system available to dispatch to the location further comprises: sending, via the processor, a request message to all registered first responder vehicles in the traffic system; and receiving, via the processor, a response message from one or more of the registered first responder vehicles in the traffic system including information about one or more of the registered first responder vehicles. Aspects of the above method include wherein the information about the one or more of the registered first responder vehicles includes a current geographical location and operating status of each of the one or more of the registered first responder vehicles in the traffic system. Aspects of the above method include wherein the first responder vehicle is selected as available to dispatch to the location from the one or more of the registered first responder vehicles when the first responder vehicle is determined by the processor to be geographically closest to the location. Aspects of the above method include wherein the traffic control instructions are sent via the processor at a substantially same time the response route is determined. Aspects of the above method include wherein the traffic control instructions cause the roadside traffic control devices to render indications configured to direct vehicles out of at least one lane along the response route. Aspects of the above method further comprising: determining, via the processor and based on the information received from the roadside traffic monitoring device, a type of the turbulence along the pathway at the location; determining, via the processor and based on the type of the turbulence, to mark a controlled area adjacent to the location as reserved; and sending, via the processor, routing instructions to communication devices associated with vehicles adjacent to and disposed along the pathway, the routing instructions configured to provide routes for the vehicles away from the location and the controlled area while the controlled area is marked as reserved. Aspects of the above method further comprising: receiving, via the processor, subsequent information from the roadside traffic monitoring device disposed along the pathway in the traffic system, indicating an increase in traffic flow adjacent to the location; determining, via the processor and based on the increase in traffic flow, to remove the mark of the controlled area as reserved; and sending, via the processor, routing instructions to communication devices associated with vehicles adjacent to and disposed along the pathway, the routing instructions configured to provide routes for the vehicles including the location and the controlled area. Aspects of the above method further comprising: determining, via the processor and based on the type of the turbulence, a likelihood of secondary incident at or adjacent to the location based on subsequent information received from the roadside traffic monitoring device; and sending, via the processor, dispatch routing instructions across the communication network to the communication device associated with the first responder vehicle, wherein the dispatch routing instructions include directions to move to the controlled area. Aspects of the above method include wherein the type of turbulence is an accident including at least one vehicle along the pathway at the location, and wherein the controlled area is located along a path off the pathway.

Embodiments include a traffic management system, comprising: a processor; and a computer readable storage medium having stored thereon instructions that, when executed by the processor, cause the processor to: receive information from a roadside traffic monitoring device disposed along a pathway in a traffic system, wherein the roadside traffic monitoring device collects traffic flow information for a location along the pathway; determine that the information received from the roadside traffic monitoring device indicates a decrease in traffic flow adjacent to the location, wherein the decrease in traffic flow corresponds to turbulence along the pathway at the location; determine a first responder vehicle in the traffic system available to dispatch to the location; determine a response route from the first responder vehicle to the location; send dispatch routing instructions across a communication network to a communication device associated with the first responder vehicle, wherein the dispatch routing instructions include directions and the response route to the location from the first responder vehicle; and send traffic control instructions to roadside traffic control devices disposed along the response route in the traffic system, wherein the traffic control instructions cause the roadside traffic control devices to render indications configured to facilitate movement of vehicles disposed along the response route in a direction away from the first responder vehicle.

Aspects of the above traffic management system include wherein determining the first responder vehicle in the traffic system available to dispatch to the location includes instructions that, when executed by the processor, further cause the processor to: send a request message to all registered first responder vehicles in the traffic system; and receive a response message from one or more of the registered first responder vehicles in the traffic system including information about one or more of the registered first responder vehicles. Aspects of the above traffic management system include wherein the information about the one or more of the registered first responder vehicles includes a current geographical location and operating status of each of the one or more of the registered first responder vehicles in the traffic system. Aspects of the above traffic management system include wherein the first responder vehicle is selected as available to dispatch to the location from the one or more of the registered first responder vehicles when the first responder vehicle is determined by the processor to be geographically closest to the location. Aspects of the above traffic management system include wherein the traffic control instructions are sent via the processor at a substantially same time the response route is determined. Aspects of the above traffic management system include wherein the traffic control instructions cause the roadside traffic control devices to render indications configured to direct vehicles out of at least one lane along the response route. Aspects of the above traffic management system including instructions that, when executed by the processor, further cause the processor to: determine, based on the information received from the roadside traffic monitoring device, a type of the turbulence along the pathway at the location; determine, based on the type of the turbulence, to mark a controlled area adjacent to the location as reserved; and send routing instructions to communication devices associated with vehicles adjacent to and disposed along the pathway, the routing instructions configured to provide routes for the vehicles away from the location and the controlled area while the controlled area is marked as reserved. Aspects of the above traffic management system including instructions that, when executed by the processor, further cause the processor to: receive subsequent information from the roadside traffic monitoring device disposed along the pathway in the traffic system, indicating an increase in traffic flow adjacent to the location; determine, based on the increase in traffic flow, to remove the mark of the controlled area as reserved; and send routing instructions to communication devices associated with vehicles adjacent to and disposed along the pathway, the routing instructions configured to provide routes for the vehicles including the location and the controlled area. Aspects of the above traffic management system including instructions that, when executed by the processor, further cause the processor to: determine, based on the type of the turbulence, a likelihood of secondary incident at or adjacent to the location based on subsequent information received from the roadside traffic monitoring device; and send dispatch routing instructions across the communication network to the communication device associated with the first responder vehicle, wherein the dispatch routing instructions include directions to move to the controlled area.

Embodiments include a method of clearing traffic from a portion of a path having a traffic incident for emergency response access, comprising: receiving, via a processor, traffic flow information for points along the path from a plurality of roadside traffic monitoring devices disposed along the path in a traffic system; determining, via the processor and based on the traffic information received, that a traffic flow at a location along the path is below a predetermined threshold traffic flow rate indicating that the traffic incident at the location requires emergency response attention; determining, via the processor, a response route for a selected first responder, wherein the response route includes an emergency response path from a location of the first responder to the location; and sending, via the processor and based on the determined response route, traffic control instructions to roadside traffic control devices disposed along the emergency response path, wherein the traffic control instructions cause the roadside traffic control devices to render indications configured to facilitate movement of vehicles out of a lane in the emergency response path clearing the lane along a length of the emergency response route for the selected first responder.

Aspects of the above method include wherein prior to determining the response route for the selected first responder, the method further comprises: sending, via the processor, a status request message across a communication network to communication devices associated with first responders in the traffic system; receiving, via the processor and in response to sending the status request message, response messages from the communication devices associated with the first responders, wherein the response message includes an operating status and a geographical location of each first responder in the first responders; determining, via the processor, an estimated response time for each of the first responders based on the geographical location of each first responder and the location of the incident; determining, via the processor, the selected first responder based on the shortest estimated response time determined; and sending, via the processor, dispatch instructions across a communication network to a communication device associated with the selected first responder, wherein the dispatch instructions notify the first responder of the incident and the location of the incident.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

What is claimed is:

1. A method of efficiently routing emergency response vehicles to a controlled area adjacent to a location of detected turbulence along a pathway in a traffic system, comprising:
    receiving, via a processor, information from a roadside traffic monitoring device disposed along the pathway in the traffic system, wherein the roadside traffic monitoring device collects traffic flow information for the location along the pathway;
    determining, via the processor, that the information received from the roadside traffic monitoring device indicates a decrease in traffic flow adjacent to the location, wherein the decrease in traffic flow corresponds to turbulence along the pathway at the location;
    determining, via the processor, a first responder vehicle in the traffic system available to dispatch to the location,
    determining, via the processor, a response route from the first responder vehicle to the location;
    sending, via the processor, first dispatch routing instructions across a communication network to a communication device associated with the first responder vehicle, wherein the first dispatch routing instructions include directions and the response route to the location from the first responder vehicle;
    sending, via the processor, traffic control instructions to roadside traffic control devices disposed along the response route in the traffic system, wherein the traffic control instructions cause the roadside traffic control devices to render indications configured to facilitate movement of vehicles disposed along the response route in a direction away from the first responder vehicle;
    determining, via the processor and based on the information received from the roadside traffic monitoring device, a type of the turbulence along the pathway at the location;
    determining, via the processor and based on the type of the turbulence, the controlled area, adjacent to the location to mark as reserved;
    sending, via the processor, routing instructions to communication devices associated with vehicles adjacent to and disposed along the pathway, the routing instructions configured to provide routes for the vehicles adjacent to and disposed along the pathway away from the location and the controlled area while the controlled area is marked as reserved;
    determining, via the processor and based on the type of the turbulence, a likelihood of a secondary incident at or adjacent to the location based on subsequent information received from the roadside traffic monitoring device; and
    sending, via the processor, second dispatch routing instructions across the communication network to the communication device associated with the first responder vehicle, wherein the second dispatch routing instructions include directions to move the first responder vehicle to the controlled area.

2. The method of claim 1; wherein determining the first responder vehicle in the traffic system available to dispatch to the location further comprises:
    sending, via the processor, a request message to al registered first responder vehicles in the traffic system; and
    receiving, via the processor, a response message from one or more of the registered first responder vehicles in the traffic system including information about the one or more of the registered first responder vehicles.

3. The method of claim 2, wherein the information about the one or more of the registered first responder vehicles includes a current geographical location and an operating status of each of the one or more of the registered first responder vehicles in the traffic system.

4. The method of claim 3, wherein the first responder vehicle is selected as available to dispatch to the location from the one or more of the registered first responder vehicles when the first responder vehicle is determined by the processor to be geographically closest to the location.

5. The method of claim 3, wherein the traffic control instructions are sent via the processor when the response route is determined.

6. The method claim 3, wherein the traffic control instructions cause the roadside traffic control devices to render indications configured to direct the vehicles disposed along the response route out of at least one lane along the response route.

7. The method of claim 1, wherein the type of the turbulence is an accident including at least one vehicle along the pathway at the location, and wherein the controlled area is located along a different path off the pathway.

8. The method of claim 1, further comprising:
    determining, via the processor, an increase in traffic flow adjacent to the location; and
    removing, via the processor and based on the increase in traffic flow, the mark of the controlled area as reserved.

9. A traffic management system, comprising:
    a processor; and
    a computer readable storage medium having stored thereon instructions that, when executed by the processor, cause the processor to;
        receive information from a roadside traffic monitoring device disposed along a pathway in a traffic system, wherein the roadside traffic monitoring device collects traffic flow information for a location along the pathway;
        determine that the information received from the roadside traffic monitoring device indicates a decrease in traffic flow adjacent to the location, wherein the decrease in traffic flow corresponds to turbulence along the pathway at the location;
        determine a first responder vehicle in the traffic system available to dispatch to the location;
        determine a response route from the first responder vehicle to the location;
        send first dispatch routing instructions across a communication network to a communication device associated with the first responder vehicle, wherein the first dispatch routing instructions include directions and the response route to the location from the first responder vehicle;

send traffic control instructions to roadside traffic control devices disposed along the response route in the traffic system, wherein the traffic control instructions cause the roadside traffic control devices to render indications configured to facilitate movement of vehicles disposed along the response route in a direction away from the first responder vehicle;

determine, based on the information received from the roadside traffic monitoring device, a type of the turbulence along the pathway at the location;

determine, based on the type of the turbulence, a controlled area adjacent to the location to mark as reserved;

send routing instructions to communication devices associated with vehicles adjacent to and disposed along the pathway, the routing instructions configured to provide routes for the vehicles adjacent to and disposed along the pathway away from the location and the controlled area while the controlled area is marked as reserved;

determine, based on the type of the turbulence, a likelihood of a secondary incident at or adjacent to the location based on subsequent information received from the roadside traffic monitoring device; and send second dispatch routing instructions across the communication network to the communication device associated with the first responder vehicle, wherein the second dispatch routing instructions include directions to move the first responder vehicle to the controlled area.

10. The traffic management system of claim 9, wherein determining the first responder vehicle in the traffic system available to dispatch to the location includes instructions that, when executed by the processor, further cause the processor to:

send a request message to all registered first responder vehicles in the traffic system; and receive a response message from one or more of the registered first responder vehicles in the traffic system including information about one or more of the registered first responder vehicles.

11. The traffic management system of claim 10, wherein the information about the one or more of the registered first responder vehicles includes a current geographical location and an operating status of each of the one or more of the registered first responder vehicles in the traffic system.

12. The traffic management system of claim 11, wherein the first responder vehicle is selected as available to dispatch to the location from the one or more of the registered first responder vehicles when the first responder vehicle is determined by the processor to be geographically closest to the location.

13. The traffic management system of claim 11, wherein the traffic control instructions cause the roadside traffic control devices to render indications configured to direct the vehicles disposed along the response route out of at least one lane along the response route.

14. The traffic management system of claim 9, including instructions that, when executed by the processor, further cause the processor to:

determine an increase in traffic flow adjacent to the location; and remove, based on the increase in traffic flow, the mark of the controlled area as reserved.

15. A method of clearing traffic from a portion of a path having a traffic incident for emergency response access, comprising:

receiving, via a processor, traffic flow information for points along the path from a plurality of roadside traffic monitoring devices disposed along the path in a traffic system;

determining, via the processor and based on the traffic flow information received, that a traffic flow at a location along the path is below a predetermined threshold traffic flow rate indicating that the traffic incident at the location requires emergency response attention;

determining, via the processor, a response route for a selected first responder, wherein the response route includes an emergency response path from the selected first responder to the location;

sending, via the processor and based on the emergency response path, traffic control instructions to roadside traffic control devices disposed along the emergency response path, wherein the traffic control instructions cause the roadside traffic control devices to render indications configured to facilitate movement of vehicles out of a lane in the emergency response path clearing the lane along the portion of the emergency response path for the selected first responder;

receiving, via the processor, subsequent traffic flow information for the location;

determining, via the processor and based on the subsequent traffic flow information, a type of turbulence at the location;

determining, via the processor and based on the type of turbulence, a likelihood of a secondary incident at or adjacent to the location and a controlled area adjacent to the location; and sending, via the processor, dispatch routing instructions across a communication network to a communication device associated with the selected first responder, wherein the dispatch routing instructions include directions to move the selected first responder to the controlled area.

16. The method of claim 15, wherein prior to determining the response route for the selected first responder, the method further comprises:

sending, via the processor, a status request message across the communication network to communication devices associated with all registered first responders in the traffic system;

receiving, via the processor and in response to sending the status request message, response messages from the communication devices associated with the registered first responders, wherein each response message include an operating status and a geographical location of each registered first responder of all the registered first responders;

determining, via the processor, an estimated response time for each of the registered first responders based on the geographical location of each registered first responder and the location of the traffic incident;

determining, via the processor, the selected first responder based on the shortest estimated response time determined; and sending, via the processor, initial dispatch instructions across the communication network to the communication device associated with the selected first responder, wherein the initial dispatch instructions notify the selected first responder of the traffic incident and the location of the traffic incident.

17. The method of claim 15, further comprising:
marking, via the processor, the controlled area adjacent to the location as reserved; and
sending, via the processor, routing instructions to communication devices associated with vehicles adjacent to and disposed along the path, the routing instructions configured to provide routes for the vehicles away from the location and the controlled area while the controlled area is marked as reserved.

18. The method of claim 17, wherein the type of turbulence is an accident including at least one vehicle along the path at the location, and wherein the controlled area is located along a different path off the path.

19. The method of claim 17, further comprising:
determining, via the processor, an increase in traffic flow adjacent to the location; and
removing, via the processor and based on the increase in traffic flow, the mark of the controlled area as reserved.

20. The method of claim 19, further comprising:
sending, via the processor, subsequent routing instructions to the communication devices associated with vehicles adjacent to and disposed along the path, the subsequent routing instructions configured to provide routes for the vehicles including the location and the controlled area.

* * * * *